United States Patent
Hong et al.

(10) Patent No.: US 9,967,100 B2
(45) Date of Patent: May 8, 2018

(54) METHOD OF CONTROLLING POWER SUPPLY FOR FINGERPRINT SENSOR, FINGERPRINT PROCESSING DEVICE, AND ELECTRONIC DEVICE PERFORMING THE SAME

(71) Applicant: Samsung Electronics Co., Ltd., Gyeonggi-do (KR)

(72) Inventors: Hyun Ju Hong, Gyeonggi-do (KR); Seung Ki Choi, Gyeonggi-do (KR); Su Ha Yoon, Seoul (KR); Su Young Park, Gyeonggi-do (KR); Eui Chang Jung, Seoul (KR); Sung Hyuk Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 258 days.

(21) Appl. No.: 14/533,799

(22) Filed: Nov. 5, 2014

(65) Prior Publication Data
US 2015/0127965 A1    May 7, 2015

(30) Foreign Application Priority Data

Nov. 5, 2013 (KR) .......................... 10-2013-0133438
Nov. 6, 2013 (KR) .......................... 10-2013-0134124
Oct. 31, 2014 (KR) .......................... 10-2014-0149786

(51) Int. Cl.
| H04L 9/32 | (2006.01) |
| G06F 3/01 | (2006.01) |
| G06F 1/16 | (2006.01) |
| G06F 1/32 | (2006.01) |
| G06K 9/00 | (2006.01) |

(52) U.S. Cl.
CPC .......... *H04L 9/3231* (2013.01); *G06F 1/1694* (2013.01); *G06F 1/325* (2013.01); *G06F 3/017* (2013.01); *G06F 2200/1637* (2013.01); *G06K 9/00013* (2013.01)

(58) Field of Classification Search
CPC ................... G06F 1/1694; G06F 1/325; G06F 2200/1637; G06F 3/017; G06K 9/00013; H04L 9/3231
See application file for complete search history.

(56) References Cited

U.S. PATENT DOCUMENTS

| 6,088,585 A | 6/2000 | Schmitt et al. |
| 7,613,446 B2 | 11/2009 | Engstrom et al. |
| 7,831,070 B1 | 11/2010 | Cheng et al. |
| 8,006,099 B2 | 8/2011 | Aoyama et al. |
| 8,311,514 B2 | 11/2012 | Bandyopadhyay et al. |

(Continued)

*Primary Examiner* — Terrell S Johnson
(74) *Attorney, Agent, or Firm* — The Farrell Law Firm, P.C.

(57) ABSTRACT

A method of controlling power supply for a fingerprint sensor is provided. The method includes receiving sensor data obtained from the fingerprint sensor; determining whether the received sensor data is a fingerprint form of data; if the received sensor data is the fingerprint form of data, determining an amount of change in sensor data received over a predetermined time is greater than or equal to a predetermined value; and if the received sensor data is not the fingerprint form of data or if the received sensor data is the fingerprint form of data but an amount of change in the received sensor data is less than the predetermined value, allowing the fingerprint sensor to enter a power saving mode.

19 Claims, 27 Drawing Sheets

(56) References Cited

U.S. PATENT DOCUMENTS

| | | | | |
|---|---|---|---|---|
| 2004/0155752 | A1* | 8/2004 | Radke | G06K 9/00013 340/5.53 |
| 2005/0144464 | A1* | 6/2005 | Chiu | G06F 21/32 713/186 |
| 2005/0226479 | A1* | 10/2005 | Takahashi | G06K 9/00026 382/124 |
| 2010/0176823 | A1* | 7/2010 | Thompson | G06K 9/00026 324/676 |
| 2010/0313050 | A1* | 12/2010 | Harrat | G06F 1/3203 713/323 |
| 2012/0071149 | A1* | 3/2012 | Bandyopadhyay | G06F 1/1643 455/418 |
| 2013/0129162 | A1* | 5/2013 | Cheng | G06F 21/32 382/124 |
| 2013/0129163 | A1* | 5/2013 | Chung | G06K 9/228 382/124 |
| 2013/0288647 | A1* | 10/2013 | Turgeman | H04W 12/06 455/411 |

* cited by examiner

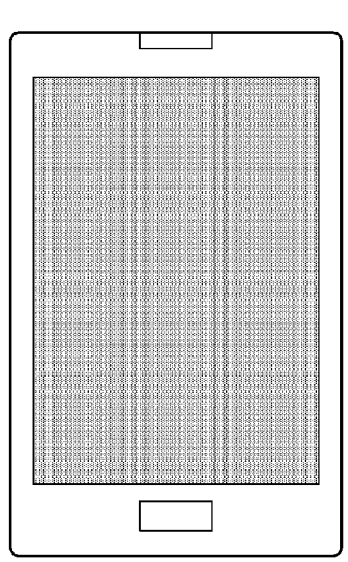
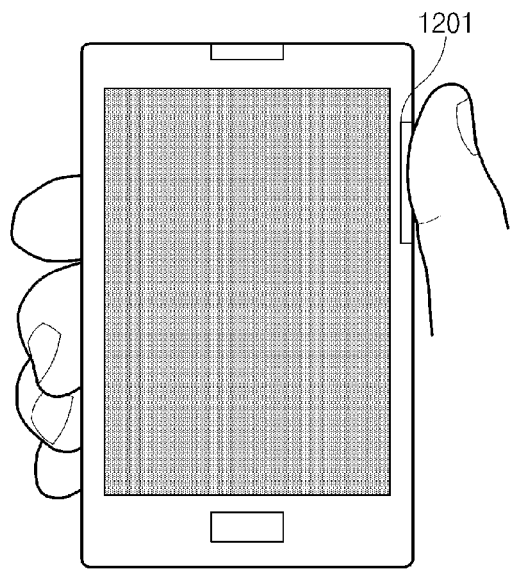
Fig.12A        Fig.12B
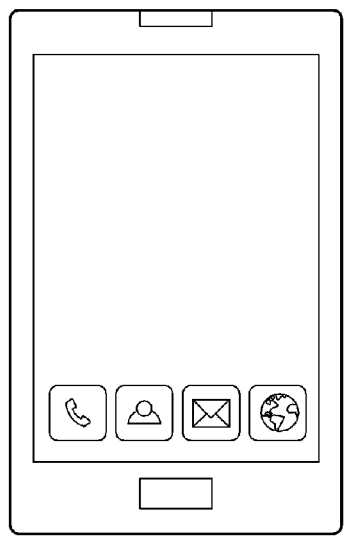
Fig.12C

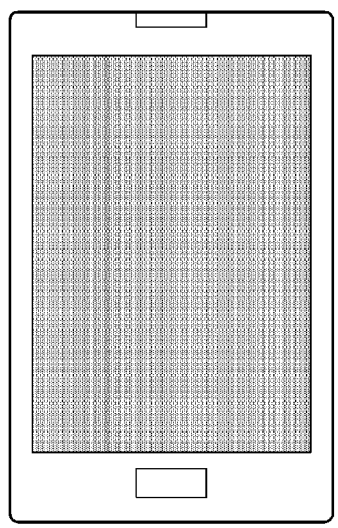
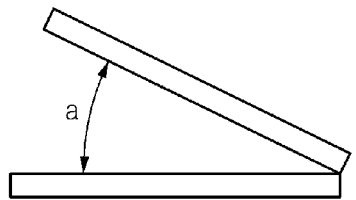
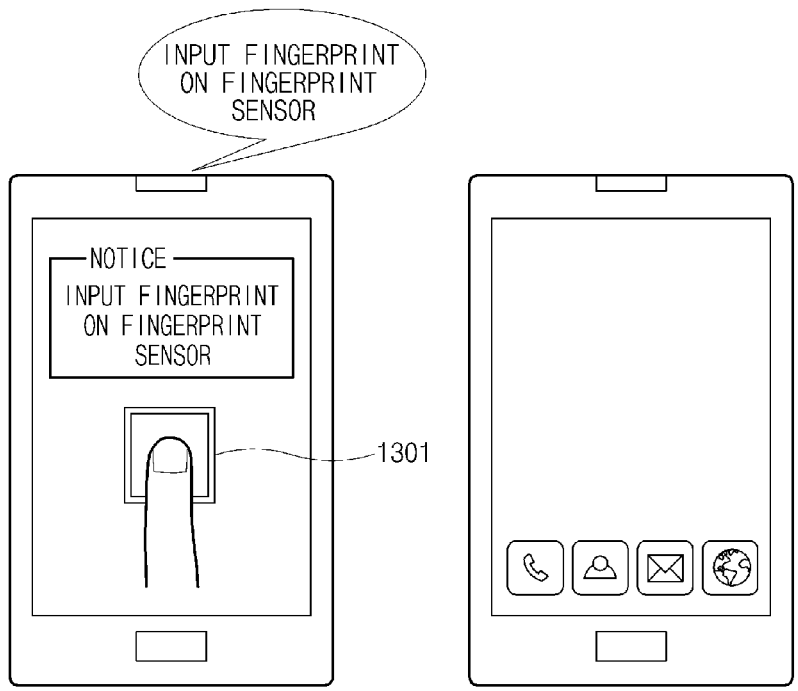
Fig.13A   Fig.13B
Fig.13C   Fig.13D

METHOD OF CONTROLLING POWER SUPPLY FOR FINGERPRINT SENSOR, FINGERPRINT PROCESSING DEVICE, AND ELECTRONIC DEVICE PERFORMING THE SAME

PRIORITY

The present invention claims priority under 35 U.S.C. § 119(a) to a Korean Patent Application filed in the Korean Intellectual Property Office on Nov. 5, 2013 and assigned serial No. 10-2013-0133438, a Korean Patent Application filed in the Korean Intellectual Property Office on Nov. 6, 2013 and assigned serial No. 10-2013-0134124, and a Korean Patent Application filed in the Korean Intellectual Property Office on Oct. 31, 2014 and assigned serial No. 10-2014-0149786, the entire disclosure of each of which is incorporated herein by reference.

BACKGROUND OF THE INVENTION

1. Field of the Invention

The present invention generally relates to a method of controlling power supply for a fingerprint sensor, a fingerprint processing device, and an electronic device performing the same.

2. Background of the Invention

With the increase in personal portable terminals, such as notebook personal computers (PCs) and smart phones, the importance of information security is being emphasized. various biometrics technologies to portable terminals. From among the various biometrics technologies, fingerprint recognition technology may obtain high security at low cost and fingerprint sensors may be miniaturized. Therefore, the fingerprint recognition technology is widely used.

Moreover, with the development of smart phones, various functions of portable terminals are provided. Thus, there have been various efforts to minimize power consumption by components in a portable terminal. Accordingly, a power control method for minimizing power consumption by a fingerprint sensor equipped in a portable terminal is required.

SUMMARY OF THE INVENTION

The present invention has been made to address at least the above problems and disadvantages and to provide at least the advantages described below. Accordingly, an aspect of the present invention provides a method of controlling power supply for a fingerprint sensor, a fingerprint processing device and electronic device performing the same.

According to an aspect of the present invention, a method of controlling power supply for a fingerprint sensor is provided. The method includes receiving sensor data obtained from the fingerprint sensor; determining whether the received sensor data is a fingerprint form of data; if the received sensor data is the fingerprint form of data, determining an amount of change in sensor data received over a predetermined time is greater than or equal to a predetermined value; and if the received sensor data is not the fingerprint form of data or if the received sensor data is the fingerprint form of data but an amount of change in the received sensor data is less than the predetermined value, allowing the fingerprint sensor to a power saving mode.

According to another aspect of the present invention, a computer-readable recording medium having a program recorded thereon is provided, which, when executed by a computer, implements a method of controlling power supply for a fingerprint sensor, the method including receiving sensor data obtained from the fingerprint sensor; determining whether the received sensor data is a fingerprint form of data; if the received sensor data is the fingerprint form of data, determining if an amount of change in sensor data received over a predetermined time is greater than or equal to a predetermined value; and if the received sensor data is not the fingerprint form of data or if the received sensor data is the fingerprint form of data but an amount of change in the received sensor data is less than the predetermined value, allowing the fingerprint sensor to enter a power saving mode.

According to another aspect of the present invention, an electronic device includes a fingerprint sensor, when a target having a predetermined permittivity is detected, configured to obtain sensor data by performing a sensing operation on the target and transmitting the obtained sensor data to a fingerprint processing device; a power control unit configured to control power supply for the fingerprint sensor; and the fingerprint processing device configured to receive sensor data from the fingerprint sensor, reconfigure the received sensor data as an image, determine whether the sensor data is a pseudo input by using the reconfigured image, output a control signal to the power control unit to allow the fingerprint sensor to enter a power saving mode if the sensor data is determined as the pseudo input, and determine a fingerprint corresponding to a fingerprint from the sensor data is registered if the sensor data is not determined as the pseudo input.

According to another aspect of the present invention, an electronic device includes a sensor module configured to detect a specified operation; a fingerprint sensor, when the specified operation is detected, configured to monitor fingerprint input; and a first processor configured to release a lock of the electronic device and switching the electronic device from a sleep state to a wake-up state if a fingerprint input through the fingerprint sensor corresponds to a registered fingerprint.

BRIEF DESCRIPTION OF THE DRAWINGS

The above and other aspects, features, and advantages of the present invention will be more apparent from the following detailed description taken in conjunction with the accompanying drawings, in which:

FIGS. 12A to 12C illustrate an electronic device detecting a specified operation according to an embodiment of the present invention;

FIGS. 13A to 13D illustrate an electronic device detecting a specified operation according to another embodiment of the present invention;

DETAILED DESCRIPTION OF EMBODIMENTS OF THE PRESENT INVENTION

Figure 1:
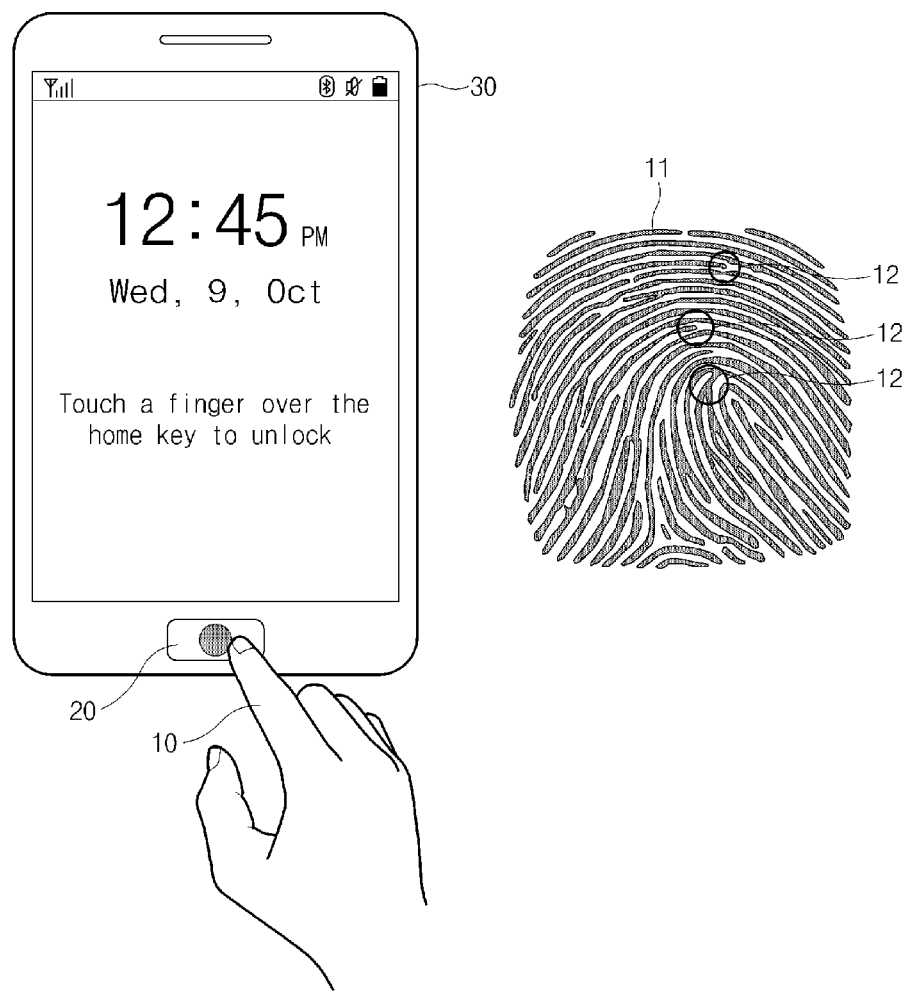
FIG. 1 is a view illustrating a method of performing a fingerprint authentication by using a fingerprint sensor according to an embodiment of the present invention.

Hereinafter, various embodiments of the present invention will be described in more detail with reference to the accompanying drawings. At this point, like reference numerals refer to like elements in the accompanying drawings. Additionally, detailed descriptions of already known functions and/or configurations are not included. In the content disclosed below, parts necessary for understanding operations according to various embodiments of the present invention are described in detail and descriptions of elements which may obscure the concept of the present invention are not included.

Additionally, some components in the drawings may be exaggerated, not included, or schematically illustrated. The depicted sizes of the respective components do not completely reflect the actual sizes of the components, and thus, the relative sizes of the components or the gaps therebetween that are depicted in each drawing do not limit the description set forth herein.

An electronic device according to the present invention may be a device including a communication function. For example, the electronic device may one or a combination of two or more of various devices such as a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, an electronic bracelet, an electronic necklace, an electronic appcessory, a camera, a wearable device, an electronic clock, a wrist watch, a smart white appliance (ex: a refrigerator, an air conditioner, a cleaner, an artificial intelligence robot, a TV, a Digital Versatile Disc (DVD) player, an audio, an oven, an electronic range, a washing machine, an air purifier, an electronic frame, etc.), various medical devices (ex: Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an Event Data Recorder (EDR), a Flight Data Recorder (FDR), a set-top box, a TV box (for example, SamSung HomeSync®, Apple TV®, or a Google TV®), an electronic dictionary, an automobile infotainment device, electronic equipment for ship (for example, a navigation device for ship, a gyro compass, etc.), avionics, a security device, electronic clothes, an electronic key, a camcorder, game consoles, a Head-Mounted Display (HMD), a flat panel display device, an electronic album, a furniture or a portion of a building/structure including a communication function, an electronic board, an electronic signature receiving device, or a projector, etc. It is obvious to a person of ordinary skill in the art that an electronic device according to the present invention is not limited to the above-mentioned devices.

FIG. 1 is a view illustrating a method of performing a fingerprint authentication by using a fingerprint sensor according to an embodiment of the present invention.

A mobile terminal 30 including a fingerprint sensor 20 is shown in FIG. 1. The mobile terminal 30 may include a mobile phone, a smart phone, a notebook computer, a digital broadcasting terminal, a digital camera, a portable game console, a Personal Digital Assistant (PDA), a Portable Multimedia Player (PMP), a navigation device, and a tablet Personal Computer (PC). However, the present invention is not limited thereto and thus the mobile terminal 30 of FIG. 1 may be one of any electronic device requiring a security function including a fingerprint sensor 20. An electronic device may include an information communication device, a multimedia device, and an application device corresponding thereto.

When a target 10 having a predetermined permittivity is detected, the fingerprint sensor 20 performs a sensing operation on the target 10. For example, if the target 10 is an object having a human permittivity, the fingerprint sensor 20 performs a sensing operation regardless of whether the target 10 is a fingerprint. However, if the target 10 is an object having a permittivity other than a human permittivity, the fingerprint sensor 20 does not sense the target 10.

A fingerprint has the form of ridges and valleys between ridges as shown in the image 11. The fingerprint sensor 20 senses the form of ridges and valleys between ridges of a fingerprint. Sensor data obtained through a sensing operation is in the form of a signal. The sensor data may be generated as the image 11 through image processing.

Methods of sensing the target 10 using the fingerprint sensor 20 include a swipe method and a touch method. In the swipe method, after the surface of a finger having a fingerprint is positioned on the fingerprint sensor 20, the finger is swiped in a predetermined direction. In the touch method, the surface of a finger contacts the fingerprint sensor 20 for a predetermined time. Although the fingerprint sensor 20 employing the touch method is shown in FIG. 1, the fingerprint sensor 20 employing the swipe method may be used according to an embodiment of the present invention.

The fingerprint sensor 20 enters a power saving mode if there is no input for a predetermined time. The power saving mode indicates that power consumed in the fingerprint sensor 20 is minimized. The power saving mode may be referred to as a sleep mode or a sleep state.

According to various embodiments of the present invention, the mobile terminal 30 determines whether fingerprint input of the fingerprint sensor 20 is a pseudo input for allowing the fingerprint sensor 20 to enter the power save mode quickly, or controls the fingerprint sensor 20 to sense fingerprint input only if there is a user's intention of fingerprint input, thereby reducing power consumption due to an unintended fingerprint input effectively.

Figure 2:
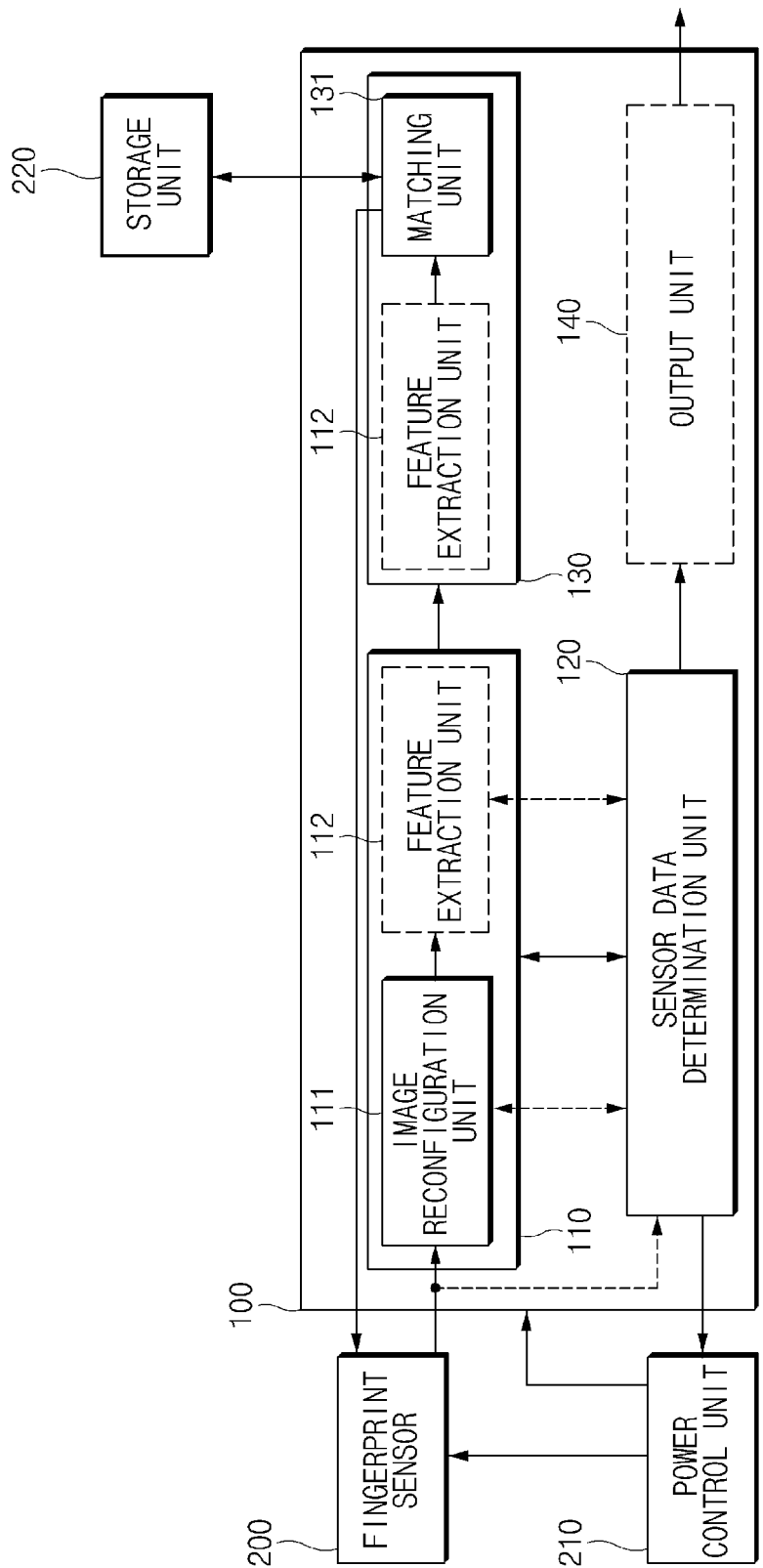
FIG. 2 is a block diagram illustrating a fingerprint processing device according to an embodiment of the present invention.

The fingerprint sensor 20 transmits the obtained sensor data to a fingerprint processing device 100, such as shown in FIG. 2, in order for image processing and fingerprint authentication. The image processing is used for generating sensor data such as the image 11, and the fingerprint authentication is used for determining whether a sensed fingerprint corresponds to a registered fingerprint. According to an embodiment of the present invention, it is determined whether the sensed fingerprint corresponds to the registered fingerprint by using the features 12 extracted from the image 11. The feature 12 may include minutiae. As shown in FIG. 1, a branch point of a ridge and an end point of a ridge may be used as the feature 12. According to another embodiment of the present invention, the fingerprint processing device 100 compares the image of the registered fingerprint with the image 11 of the sensed fingerprint to determine whether the sensed fingerprint corresponds to the registered fingerprint. In addition, the fingerprint processing device 100 determines whether the sensed fingerprint corresponds to the registered fingerprint by using various fingerprint authentication methods.

The fingerprint processing device 100 may be integrated with the fingerprint sensor 20. Hereinafter, for convenience of understanding, the fingerprint sensor 20 is described as obtaining sensor data by sensing the target 10, and the fingerprint processing device 100 is described as performing image processing and fingerprint authentication of the sensor data. Detailed description relating to the fingerprint processing device 100 will be made with reference to FIG. 2.

Although the fingerprint sensor 20 at a home button of the mobile terminal 300 is shown in FIG. 1, the present invention is not limited thereto. The fingerprint sensor 20 may be positioned at the rear or side of the mobile terminal 30 or may be integrated with a screen.

FIG. 2 is a block diagram illustrating a fingerprint processing device according to an embodiment of the present invention. Referring to FIG. 2, the fingerprint processing device 100 is configured with an image processing unit 110, a sensor data determination unit 120, and a fingerprint authentication unit 130. The fingerprint processing device 100, a fingerprint sensor 200, a power control unit 210, and a storage unit 220 of FIG. 2 may be included in one electronic device.

The fingerprint processing device 100 receives sensor data detected from the fingerprint sensor 200, reconfigures the received sensor data as an image, and performs fingerprint processing by using the reconfigured image. The fingerprint processing device 100 may correspond to at least one processor or may include more than one processor. Accordingly, the fingerprint processing device 100 may be included and driven in a general purpose computer system (not shown) or a device similar thereto.

The image processing unit 110 receives sensor data obtained from the fingerprint sensor 200 and reconfigures the received sensor data as an image. The image processing unit 110 transmits the reconfigured image to the sensor data determination unit 120.

The image processing unit 110 transmits the reconfigured image to the fingerprint authentication unit 130 according to a determination result of the sensor data determination unit 120. At this point, if the sensor data determination unit 120 determines that a fingerprint authentication does not need to be performed on the received sensor data, the image processing unit 110 does not transmit the reconfigured image to the fingerprint authentication unit 130. Furthermore, the image processing unit 110 then discards the reconfigured image.

According to an embodiment of the present invention, the image processing unit 110 includes with an image reconfiguration unit 111 and a feature extraction unit 112. The image reconfiguration unit 111 reconfigures an image by using sensor data. The feature extraction unit 112 extracts a feature by using the reconfigured image. Accordingly, the image processing unit 110 transmits the reconfigured image or the extracted feature to the sensor data determination unit 120. The sensor data determination unit 120 determines whether to perform power control and fingerprint authentication of the fingerprint sensor 200 on the basis of the reconfigured image or extracted feature.

According to another embodiment of the present invention, the image processing unit 110 may be configured with only the image reconfiguration unit 111. According to this embodiment, the sensor data determination unit 120 determines whether the sensor data requires a fingerprint authentication by using the sensor data or the reconfigured image. Therefore, according to a determination result of the sensor data determination unit 120, the image processing unit 110 transmits the reconfigured image of the sensor data for which fingerprint authentication is determined necessary to the fingerprint authentication unit 130. The fingerprint authentication unit 130 performs fingerprint processing by using the received reconfigured image.

The sensor data determination unit 120 determines whether the sensor data is a pseudo input on which a fingerprint authentication does not need to be performed. The pseudo input is a fake or false input i.e., a user does not touch the fingerprint sensor 200 with a finger with the intent of a fingerprint authentication. For example, another part of the body instead of a fingerprint may be sensed by the fingerprint sensor 200 or even if a fingerprint is sensed by the fingerprint sensor 200, an unintentional contact may have occurred during an operation for another function. Detailed description relating thereto is made with reference to FIGS. 10 and 11.

The sensor data determination unit 120 determines whether sensor data is a pseudo input by using an image reconfigured by the image reconfiguration unit 111, or by using a feature extracted from an image reconfigured by the feature extraction unit 112. Also, the sensor data determination unit 120 may determine whether there is a pseudo input by using sensor data received from the fingerprint sensor 200.

According to such an embodiment, the sensor data determination unit 120 may be configured to directly receive sensor data from the fingerprint sensor 200, receive a reconfigured image from the image reconfiguration unit 111, or receive a feature from the feature extraction unit 112. Hereinafter, for convenience of description, the sensor data determination unit 120 determines whether sensor data is a pseudo input by using an image reconfigured by the image reconfiguration unit 111.

The sensor data determination unit 120 determines whether sensor data is a pseudo input on which a fingerprint authentication does not need to be performed. According to a determination result of the sensor data determination unit 120, if the received sensor data is determined as a pseudo input, a fingerprint authentication is not performed on the received sensor data of the sensor data determination unit 120 and a control signal is outputted to the power control unit 210 to switch the fingerprint sensor 200 to a power saving mode. The received sensor data is then discarded.

A power saving mode indicates that power consumed in the fingerprint sensor 200 is minimized by not applying power to units not used when there is no input to the fingerprint sensor 200. The power saving mode may be referred to as a sleep mode. The fingerprint sensor 200 enters the power saving mode if there is no input for a predetermined time. If an input is maintained on the fingerprint sensor 200, the fingerprint sensor 200 does not enter the power saving mode and continuously maintains an active mode state.

According to an embodiment of the present invention, the sensor data determination unit 120 may output a control signal to the power control unit 210 so that the fingerprint processing device 100, in addition to the fingerprint sensor 200, enters the power saving mode.

According to a determination result of the sensor data determination unit 120, if the received sensor data is not determined to be a pseudo input, the sensor data determination unit 120 outputs a control signal to the image processing unit 110 so as to perform a fingerprint authentication on the received sensor data. The image processing unit 110 outputs a reconfigured image or a feature to the fingerprint authentication unit 130.

The sensor data determination unit 120 determines whether the received sensor data is a pseudo input on the basis of at least one of whether sensor data is a fingerprint form of data, whether the amount of change in the received sensor data for a predetermined time is a predetermined value or more, and whether a direction of a fingerprint in the received sensor data corresponds to a direction set for fingerprint authentication. The direction of a fingerprint may refer to the direction that the finger is oriented on the fingerprint sensor 200.

When a target 10 is not a fingerprint and has the permittivity of a human contacts the fingerprint sensor 200 continuously for a predetermined time, the fingerprint sensor 200 senses the target 10 continuously. Accordingly, the fingerprint sensor 200 does not enter the power saving mode and performs unnecessary continuous sensing. For example, when a human body part such as a cheek (during a telephone call) or an arm, contacts the fingerprint sensor 200, the fingerprint sensor 200 senses the body part and then transmits obtained sensor data to the fingerprint processing device 100. However, the skin of a cheek or an arm does not have a fingerprint and corresponds to a pseudo input that does not require a fingerprint authentication.

The sensor data determination unit 120 determines whether the received sensor data is a fingerprint form of data such that it may determine whether the received sensor data is a pseudo input. The fingerprint form is one in which ridges and valleys repeat as shown in FIG. 1. Accordingly, the sensor data determination unit 120 determines that the received sensor data is not a fingerprint form of data if there are no ridges and valleys in the received sensor data, or if an interval between ridges or a width between a ridge and a valley is greater than or equal to a predetermined value. However, the present invention is not limited thereto and the sensor data determination unit 120 may use various methods of determining a fingerprint form of data on the basis of the sensor data signal form or the number of features, for example.

If it is unclear whether the received sensor data is a fingerprint form of data on the basis of a determination result of the sensor data determination unit 120, the sensor data determination unit 120 estimates that the received sensor data is a fingerprint form of data.

The sensor data determination unit 120 determines whether the amount of change in received sensor data for a predetermined time is greater than or equal to a predetermined value such that it may determine whether the received sensor data is a pseudo input. For example, if there is no change in the sensor data for more than one minute or the change is very slight, the sensor data may not be determined as an input for fingerprint authentication. The predetermined time may be set differently depending on whether the method of operating the fingerprint sensor 200 is the touch method or the swipe method. After the predetermined time, further fingerprint authentication may not be performed. The predetermined value may be determined by a value having almost no change.

The sensor data determination unit 120 determines whether a direction of a fingerprint in received sensor data corresponds to a direction set for fingerprint authentication such that it may determine whether the received sensor data is a pseudo input. For example, if a direction of a fingerprint in sensor data is different from a direction set for fingerprint authentication by a predetermined angle, the input is determined as a pseudo input, that is, as a finger having contacted the fingerprint sensor 200 without the intent of fingerprint authentication. The direction of the fingerprint, as shown in FIG. 1, may be seen as a horizontal direction in which ridges and valleys extend. Accordingly, if a direction that the ridges and valleys of a fingerprint in received sensor data extend is not a horizontal direction, the sensor data determination unit 120 determines this as a pseudo input.

According to a determination result of the sensor data determination unit 120, the fingerprint authentication unit 130 performs fingerprint processing on sensor data requiring fingerprint authentication. The fingerprint authentication unit 130 determines whether a fingerprint corresponding to a fingerprint of sensor data is registered so as to perform fingerprint processing. The fingerprint processing indicates a series of operations processed for performing a fingerprint authentication.

According to an embodiment of the present invention, the fingerprint authentication unit 130 may be configured with a feature extraction unit 112 and a matching unit 131. The fingerprint authentication unit 130 receives a reconfigured image from the image processing unit 110 and the feature extraction unit 112 extracts a feature from the reconfigured image. The matching unit 131 determines whether a registered fingerprint stored in the storage unit 220 corresponds to a fingerprint in the sensor data. The fingerprint authentication unit 130 transmits a determination result of the matching unit 131 to the fingerprint sensor 200.

According to another embodiment of the present invention, the fingerprint authentication unit 130 may be configured with the matching unit 131. The fingerprint authentication unit 130 receives a feature or an image from the image processing unit 110 and the matching unit 131 determines whether a registered fingerprint corresponds to a fingerprint in sensor data on the basis of the received feature or image.

According to various embodiments, when a specified operation is detected through a geomagnetic sensor, an acceleration sensor, a gyro sensor, a proximity sensor, a gesture sensor, etc., the sensor data determination unit 120 may make the fingerprint sensor 200 to perform sensing of the target 10 (for example, monitoring of a fingerprint input). However, while a specified operation is not input, the sensor data determination unit 120 may control the fingerprint sensor 200 not to obtain sensor data. Detailed description relating thereto is made with reference to FIG. 6.

The fingerprint processing device 100 further includes an output unit 140 for outputting a determination result of the sensor data determination unit 120. The output unit 140 may output a determination result of the sensor data determination unit 120 in a voice, vibration, text, picture or video format. However, the present invention is not limited thereto, and the output unit 140 may output a determination result of the sensor data determination unit 120 in other various formats.

The fingerprint processing device 100 according to various embodiments of the present invention may include an image processing unit 110 configured to receive sensor data obtained from the fingerprint sensor 200 and reconfigure the received sensor data as an image, an fingerprint authentication unit 130 configured to authenticate a fingerprint by performing a fingerprint processing operation for determining whether a fingerprint corresponding to a fingerprint from the sensor data is registered by using the reconfigured image, and a sensor data determination unit 120 configured to determine whether the sensor data is a pseudo input by using the reconfigured image and, if the sensor data is determined as the pseudo input, output a control signal to allow the fingerprint sensor 200 to enter a power saving mode without performing the fingerprint processing of the sensor data.

According to various embodiments of the present invention, the sensor data determination unit 120 determines whether the sensor data is a pseudo input on the basis of whether the sensor data is a fingerprint form of data and whether an amount of change in sensor data received over a predetermined time is greater than or equal to a predetermined value.

According to various embodiments of the present invention, the fingerprint processing device 100 further comprises an output unit 140 outputting a determination result of the sensor data determination unit 120.

Figure 3:
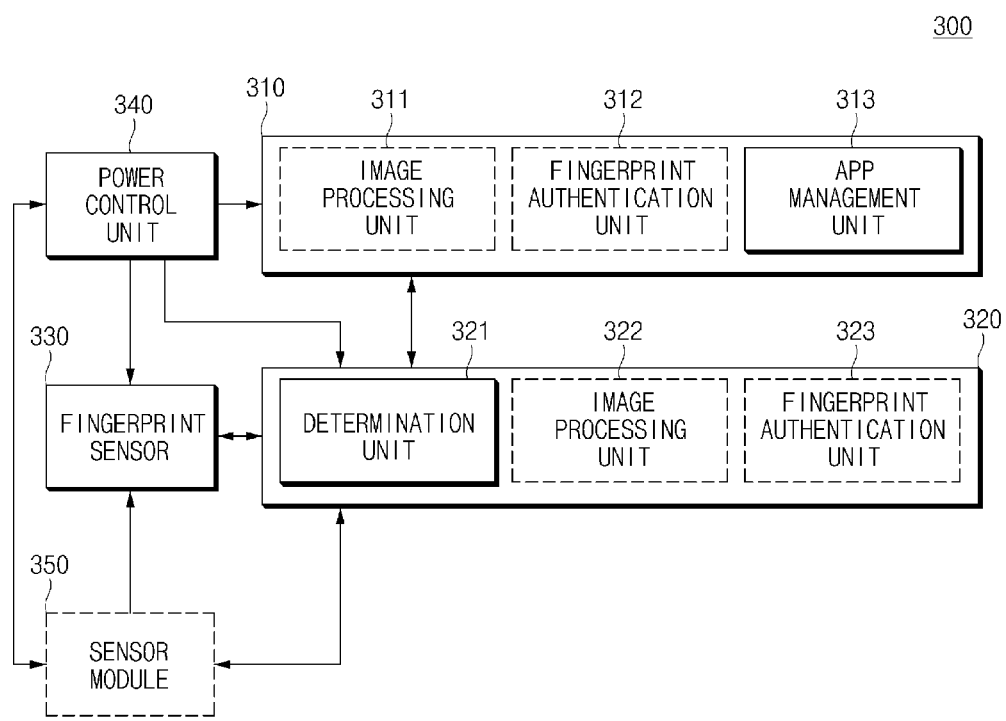
FIG. 3 is a block diagram illustrating an electronic device according to another embodiment of the present invention.

FIG. 3 is a block diagram illustrating an electronic device according to an embodiment of the present invention. Referring to FIG. 3, the electronic device 300 may include a first processor 310, a second processor 320, fingerprint sensor 330, a power control unit 340, and a sensor module 350. The first processor 310 and the second processor 320 may constitute the fingerprint processing apparatus described above.

In this specification, only components relating to this embodiment are described in order not to obscure features thereof. Accordingly, those skilled in the art will understand that other general-purpose components other than the components shown in FIG. 3 may be further included.

Only when it is detected that there is a user's intention of fingerprint input, the fingerprint sensor 330 may monitor a fingerprint input. The electronic device 300 may determine whether there is a user's intention of fingerprint input using the sensor module 350. If it is determined that there is a user's intention of fingerprint input using the sensor module 350, the fingerprint sensor 330 may monitor a fingerprint input from the user. The electronic device 300 may perform user authentication on the basis of input fingerprint data using the second processor 320, keeping other elements of the electronic device 300 in a sleep state except for the second processor 320.

In an embodiment, the second processor 320 may be an additional processor for processing fingerprint data of the fingerprint sensor 330, and illustrated separately with the first processor 310. However, the present invention is not limited thereto; the first processor 310 and the second processor 320 may operate separately on separate portions of one processor. In another embodiment, the second processor 320 may be included in a sensor hub for processing sensor data with the sensor module 350.

The first processor 310 may control operations of the electronic device 300. For example, the first processor 310 may correspond to an application processor (AP). The first processor 310 may include a fingerprint authentication unit 312 and an app management unit 313. According to the various embodiments, the first processor 310 may further include an image processing unit 311. In addition, the first processor 310 may further other elements for controlling operations of the electronic device 300.

The second processor 320 may perform user authentication using input fingerprint data, thereby maintaining the first processor 310 in a sleep state until the user is authenticated. However, if the second processor 320 does not have a data processing capability for determining that the input fingerprint data corresponds to a registered fingerprint data, the first processor 310 may receive the input fingerprint data from the second processor 320, and determine validity of the input fingerprint data instead of the second processor 320. The validity of fingerprint data may represent whether to authenticate the fingerprint data. The first processor 310 or the second processor 320 may determine whether to accept the validity of fingerprint data depending on matching degree between the input fingerprint data and the registered fingerprint data, or how similar the input fingerprint data is to the registered fingerprint data. According to one embodiment, although the validity of input fingerprint data is not accepted, whose matching degree is under a first reference, the first processor 310 or the second processor 320 may determine a next ranking validity. Even though the input fingerprint does not correspond to the registered fingerprint, if the matching degree or converted value from the matching degree is greater than or equal to a second reference value, the next ranking validity may be accepted. According to acceptance of the validity or the next ranking validity of input fingerprint data, that is, depending on the matching degree between input fingerprint and registered fingerprint, authority to use the electronic device 300 may be differentiated.

The first processor 310 may determine the validity of the fingerprint data keeping some portions of the first processor 310 in a wake-up state and other portions of the first processor 310 in a sleep state. For example, when determining the validity of the fingerprint data, the first processor 310 may keep only the image processing unit 311 or the fingerprint authentication unit 312 in the wake-up state. The image processing unit 311 or the fingerprint authentication unit 312 may be positioned on the security region illustrated in FIG. 4.

The image processing unit 311 may reconfigure the fingerprint data as a fingerprint image through image processing. Alternatively, the image processing unit 311 may extract minutiae from the fingerprint image.

The fingerprint authentication unit 312 may determine the validity of input fingerprint data using sensor data, reconfigured fingerprint image, or minutiae data, etc. For example, the fingerprint authentication unit 312 may compare the fingerprint image generated in the image processing unit 311 with the registered fingerprint image to determine the validity of the input fingerprint data. Alternatively, the fingerprint authentication unit 312 may compare the minutiae data of input fingerprint obtained in the image processing unit 311 with minutiae data of the registered fingerprint to determine the validity of the input fingerprint data. In addition, the fingerprint authentication unit 311 may determine the validity of fingerprint data through various fingerprint data processing for determining whether the input fingerprint corresponds to the registered fingerprint.

The fingerprint authentication unit 312 may determine the validity of the input fingerprint data on the basis of matching degree between the input fingerprint data and registered fingerprint data. The fingerprint authentication unit 312 may determine whether the matching degree is greater than or equal to a set first reference value. If the matching degree is greater than or equal to the first reference value, the input fingerprint corresponds to the registered fingerprint, and it may be determined that the validity of the input fingerprint data is accepted.

If the validity of the input fingerprint data is not accepted, the fingerprint authentication 312 may determine a next ranking validity of the input fingerprint data. The fingerprint authentication 312 may determine whether the matching degree is greater than or equal to a set second reference value. Or, the fingerprint authentication 312 may convert the matching degree to a set numerical number, and determine whether the converted value is greater than or equal to the set second reference value.

As a result of determination of validity of the input fingerprint data, the matching degree may be under the first reference value, and be greater than or equal to the second reference value (or, converted value from the matching degree may be greater than or equal to the second reference value). Although the input fingerprint data does not correspond to the registered fingerprint data, the fingerprint authentication 312 may approve a next ranking validity for the input fingerprint data. The next ranking validity may represent a limited validity approving execution of a part of function (or, certain applications) whose security level is set low.

If the validity of the input fingerprint data is accepted by the first processor 310 or the second processor 320, the first processor 310 may release a lock and simultaneously switch the electronic device 300 in a sleep state to a wake-up state.

Alternatively, if the first processor 310 or the second processor 320 determines that the validity of the input fingerprint data is not accepted, but the next ranking validity of the input fingerprint data is accepted, the first processor 310 may switch the app management unit 313 to a wake-up state, make the app management unit 313 to execute at least one application whose security is low in the electronic device 300.

The app management unit 313 may manage information related to an application and/or execution of the application (app). For example, at least one application whose security is low may be set in advance in the app management unit 313, or the user may set at least one application through the app management unit 313. If the input fingerprint data has the next ranking validity, the app management unit 313 may display at least one application through a display module (not shown) for execution of at least one application whose security is set low.

The second processor 320 may perform user authentication on the basis of fingerprint data received from the fingerprint sensor 330. The second processor 320 may include the determination unit 321 and a fingerprint authentication unit 323. According to various embodiments, the second processor 320 may further include the image processing unit 322.

If input fingerprint data is received from the fingerprint sensor 330, the determination unit 321 may determine which processor determine the validity of the input fingerprint data between the first processor 310 and the second processor 320. The second processor 320 may determine which processor determines the validity of input fingerprint data depending on a data processing capability of the second processor 320.

For example, the determination unit 321 may determine a processor on the basis of which processor has capability of image processing such as image reconfiguration, or which processor has capability to perform the fingerprint processing which determines that the input fingerprint corresponds to the registered fingerprint. Alternatively, the determination unit 321 may determine which processor determines the validity of fingerprint data depending on the input fingerprint data. For example, if it is necessary to perform complex image processing such as noise reduction for the input fingerprint data, the determination unit 321 may determine that the first processor 310 determines the validity of the input fingerprint data.

If the determination unit 321 may determine that the second processor 320 determines the validity of the input fingerprint data as a result of the determination, the fingerprint authentication unit 323 may determine the validity of the input fingerprint data.

The image processing unit 322 may reconfigure fingerprint data as a fingerprint image through image processing. Alternatively, the image processing unit 322 may extract minutiae from the fingerprint image.

The fingerprint authentication unit 323 may determine the validity of the input fingerprint data using sensor data, reconfigured image, or minutiae data, etc. For example, the fingerprint authentication unit 323 may compare fingerprint image generated in the image processing unit 322 with a registered fingerprint image, and determine the validity of the input fingerprint data. Alternatively, the fingerprint authentication unit 323 may compare minutiae data of input fingerprint data obtained in the image processing unit 322 with minutiae data of the registered fingerprint, and determine the validity of the input fingerprint data. In addition, the fingerprint authentication unit 323 may determine the validity of the input fingerprint data through various fingerprint data processing for determining that the input fingerprint data correspond to the registered fingerprint data.

The fingerprint authentication unit 323 may determine the validity of the input fingerprint data on the basis of matching degree between the input fingerprint data and the registered fingerprint data. The fingerprint authentication unit 323 may determine whether the matching degree is greater than or equal to a set first reference value. If the matching degree is greater than or equal to the first reference value, the input fingerprint may correspond to the registered fingerprint. If the validity of the input fingerprint data is accepted by the fingerprint authentication unit 323, the second processor 320 may inform that the fingerprint data corresponds to the registered fingerprint, to the first processor 310.

If it is determined that the validity of the input fingerprint data is not accepted, the fingerprint authentication unit 323 may determine a next ranking validity of the input fingerprint data. The fingerprint authentication unit 323 may determine whether the matching degree is greater than or equal to a set second reference value. Or, the fingerprint authentication unit 323 may convert the matching degree to a set numerical value, and then, determine whether that the converted value is greater than or equal to the second reference value.

As a result of determination of validity of the input fingerprint data, the matching degree may be under the first reference value, and be greater than or equal to the second reference value (or, converted value from the matching degree may be greater than or equal to the second reference value). Although the input fingerprint data does not correspond to the registered fingerprint data, the fingerprint authentication unit 323 may approve a next ranking validity for the input fingerprint data, and may execute at least one of application whose security level is set low in the electronic device 300 through the first processor 310.

As a result of determination of the determination unit 321, if it is determined that the first processor 310 determines the validity of the input fingerprint data, the second processor 320 may transmit the input fingerprint data related to the input fingerprint to the first processor 310.

If a target having a predetermined permittivity is detected, the fingerprint sensor 330 performs a sensing operation on the target 10 to obtain the fingerprint data, transmits the fingerprint data to the second processor 320. The fingerprint sensor 330 may monitor the fingerprint input only if there is a user's intention of fingerprint input. If it is detected that there is a user's intention of fingerprint input through the sensor module 350, the second processor 320 may control the fingerprint sensor 330 to monitor with a set period, whether to receive fingerprint input from a user. Alternatively, the second processor 320 may control the fingerprint sensor 330 to monitor only when it is detected that there is a user's intention of fingerprint input in the electronic device 300.

The sensor module 350 may detect that there is a user's intention of fingerprint input using at least one sensor provided in the electronic device 300. The at least one of sensor may include any sensor used for determination of whether there is a user's intention of fingerprint input such as an acceleration sensor, a gyro sensor, a geomagnetic sensor, a grip sensor, a proximity sensor, and a gesture sensor, etc. The sensor module 350 according to an embodiment may include at least one unit for processing sensor data obtained from the at least one sensor.

For example, the sensor module 350 may compare sensor data obtained through at least one sensor with sensor data set in advance. If the obtained sensor data corresponds to the specified sensor data, the sensor module 350 may determine that there is a user's intention of fingerprint input. A specified operation (corresponding to the set sensor data) may include any operation representing a user's intention of fingerprint input. The specified operation may include a set grip, a set movement having a set angle or more, or a set gesture, etc.

According to an embodiment, the electronic device 300 may determine whether there is a user's intention of fingerprint input depending on detection of a set grip through a grip sensor provided to a set region of the electronic device detect. If sensor data obtained through the grip sensor corresponds to the set grip, the sensor module 350 determines that there is a user's intention of fingerprint input.

According to another embodiment, the electronic device 300 may determine whether there is a user's intention of fingerprint input depending on detection of a movement having a set angle or more using an acceleration sensor or a gyro sensor. If sensor data obtained through the acceleration sensor or the gyro sensor corresponds to the movement having the set angle or more, the sensor module 350 determines that there is a user's intention of fingerprint input.

According to other embodiment, the electronic device 300 may determine whether there is a user's intention of fingerprint input depending on detection of a set gesture using a gesture sensor. If sensor data obtained through the gesture sensor corresponds to the set gesture, the sensor module 350 determines that there is a user's intention of fingerprint input.

If a set sensor data is received, or a specified operation is detected, the sensor module 350 may transmit a signal for monitoring fingerprint input to the fingerprint sensor 330 directly, or through the second processor 320. The sensor module 350 may transmit the obtained sensor data to the second processor 320 to determine for the second processor 320 whether the obtained sensor data correspond to the set sensor data or the specified operation.

The power control unit 340 may control power provided to respective element of the electronic device 300. The power control unit 340 may receive a control signal from the first processor 310 or the second processor 320 to control power provided to respective element of the electronic device 300.

The electronic device 300 may maintain the electronic device 300 in a sleep state of low power until a user is authenticated, using the second processor 320, which performs user authentication on the basis of input fingerprint data. Accordingly, an amount of battery consumption of the electronic device 300 may be reduced.

Also, even in the case where a fingerprint is not accurately recognized due to contamination on a user's fingerprint or the fingerprint sensor 330, the electronic device 300 may execute at least one application whose security is low by approving the next ranking validity of the input fingerprint data. Accordingly, a user's convenience may be improved in the electronic device 300.

An electronic device according to various embodiments of the present invention may include a sensor module configured to detect a specified operation, a fingerprint sensor configured to monitor a fingerprint input when the sensor module detects the specified operation, and a first processor configured to release a lock and switch the electronic device from a sleep state to a wake-up state if the input fingerprint corresponds to a registered fingerprint.

According to various embodiments of the present invention, the electronic device may include a second processor configured to receive input fingerprint data from the fingerprint sensor. According to various embodiments of the present invention, the second processor may determine which processor determines validity of the input fingerprint data. If the second processor is determined to determine the validity of the input fingerprint data, the second processor may determine matching degree between the input fingerprint and the registered fingerprint, and determine the validity on the basis of the matching degree.

According to various embodiments of the present invention, if the first processor is determined to determine the validity, the second processor may transmit the input fingerprint data to the first processor, and the first processor may determine the validity of the input fingerprint data.

According to various embodiments of the present invention, if the matching degree is under a set first reference value, the first processor or the second processor may determine that the input fingerprint does not corresponds to the registered fingerprint, and determine a next ranking validity of the input fingerprint data.

According to various embodiments of the present invention, if the matching degree is under a set first reference value, the first processor or the second processor may determine whether the matching degree is greater than or equal to a set second reference value. If the matching degree is greater than or equal to a set second reference value, the first processor or the second processor may execute at least one application whose security is set low. Alternatively, the first processor or the second processor may convert the matching degree to a set numerical value, and compare the converted value with the set second reference value.

According to various embodiments of the present invention, the second processor may determine the validity of the input fingerprint data with low power keeping the first processor in a sleep state.

Figure 4:
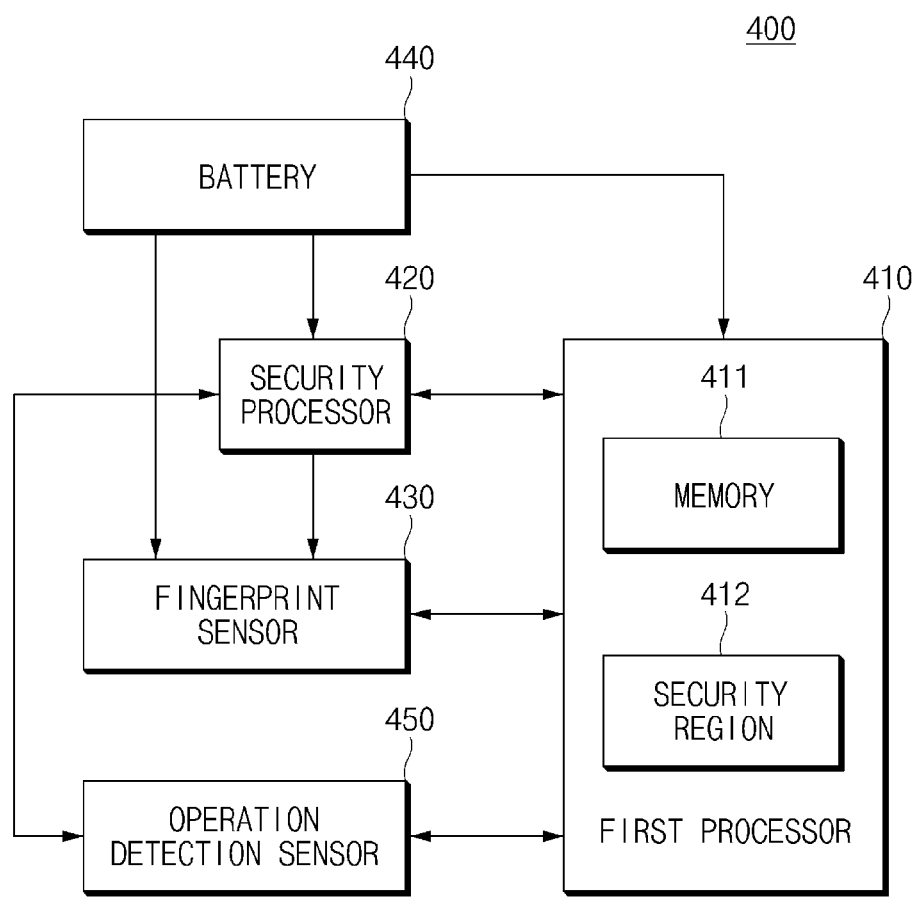
FIG. 4 is a block diagram illustrating an electronic device according to another embodiment of the present invention.

FIG. 4 is a block diagram illustrating a fingerprint processing device according to an embodiment of the present invention. Referring to FIG. 4, operations performed in the fingerprint processing device of FIG. 2 may be performed on at least one of a first processor 410 and a second processor 420. The first processor 410 and the second processor 420, respectively, may include at least part of function performed by at least one of an image processing unit 110, a sensor data determination unit 120, or a fingerprint authentication unit 130 of FIG. 2. For example, the first processor 410 may correspond to a controller (for example, application processor) which controls operations of the electronic device 400, and the second processor 420 may correspond to a sensor hub which obtains sensor data using at least one of sensor. And, the first processor 410 and the second processor 420 may receive sensor data detected from the fingerprint sensor 430, and perform a fingerprint processing on the basis of the received sensor data.

A first processor 410, a second processor 420, a fingerprint sensor 430, a battery 440, and an operation detection sensor 450 shown in FIG. 4, respectively, may correspond to the first processor 310, the second processor 320, the fingerprint sensor 330, the power control unit 340, and the sensor module 350 shown in FIG. 3. Accordingly, the content described with reference to FIG. 3 relating to the first processor 310, the second processor 320, the fingerprint sensor 330, the power control unit 340 and the sensor module 350 may be applied to the first processor 410, the second processor 420, the fingerprint sensor 430, the battery 440 and the operation detection sensor of FIG. 4.

A first processor 410, an operation detection sensor 450, a fingerprint sensor 430, a second processor 420, and a battery 440 may operate on an electronic device. Hereinafter, for convenience of description, it will be described that an electronic device includes the first processor 410, the operation detection sensor 450, the fingerprint sensor 430, the second processor 420, and the battery 440.

According to this embodiment, if it is detected that there is a user's intention of fingerprint input, for example, when the operation detection sensor 450 detects a specified operation, the fingerprint sensor 430 may monitor fingerprint input. If a specified operation is not detected, the fingerprint sensor 430 may not receive fingerprint input from the user.

The electronic device may use an additional processor, which performs user authentication on the basis of fingerprint data, maintaining the electronic device in a sleep state until a user is authenticated. The sleep sate (sleep mode) and a wake-up state, respectively, may correspond to a power saving mode and an active mode of the electronic device shown in FIGS. 1 and 2.

An electronic device according to the present invention may include a first processor 410, an operation detection sensor 450, a fingerprint sensor 430, a second processor 420, and a battery 440. Also, the first processor 410 may include a memory 411 and a security region 412. Hereinafter, each element is described according to a sequence in which the electronic device may operate.

The electronic device according to the present invention may operate in a sleep mode of low power which is a state where the battery 440 does not supply power to respective elements 410, 420, 430, 440. More specifically, the electronic device may operate initially in the sleep mode state where only the second processor 420 operates.

First, the operation detection sensor 450 connected with the second processor 420 may determine whether it has received a specified operation. More specifically, the operation detection sensor 450 may detect a specified operation for receiving a user's fingerprint using an acceleration sensor, a gyro sensor, a geomagnetic sensor, a grip sensor, a gesture sensor, etc.

For example, the operation detection sensor 450 may determine whether it has detected a set grip using a grip sensor, etc. provided to a set region of the electronic device. For another example, the operation detection sensor 450 may also determine whether the electronic device has moved by a set angle or more using an acceleration sensor, a gyro sensor, etc. For still another example, the operation detection sensor 450 may determine whether it has detected a set gesture using a gesture sensor, etc.

If a specified operation is not detected, the operation detection sensor 450 may transmit data that it has detected the specified operation to the second processor 420. For example, the data that it has detected the specified operation may be a signal representing that the specified operation is input. Or, the data that it has detected the specified operation may be sensor data obtained from the operation detection sensor 450. The second processor 420 may determine whether the obtained sensor data corresponds to the specified operation.

If the specified operation is input by the user, the second processor 420 may switch the fingerprint sensor 430 from a sleep state to a wake-up state, and control the fingerprint sensor 430 to be in a state for receiving a fingerprint input. The second processor 420 may monitor whether the fingerprint sensor 430 has received an input fingerprint from a user with a set period, and perform monitoring from when it receives the data from the operation detection sensor 450.

After that, if the fingerprint sensor 430 receives a fingerprint, the second processor 420 may determine which processor determines the validity of the input fingerprint (for example, which processor matches the input fingerprint with a registered fingerprint). More specifically, the second processor 420 may determine itself as to validity of the input fingerprint, or pass over determination of the validity of the input fingerprint to the first processor 410, depending on a current data processing capability of the second processor 420.

For example, the second processor 420 may determine whether to determine itself the validity of the input fingerprint data on the basis of whether it has capability of image processing (for example, reconfiguring fingerprint image), or whether it has capability to perform the fingerprint processing which determines whether the received fingerprint corresponds to the registered fingerprint. Alternatively, the second processor 420 may determine whether to determine itself the validity of the input fingerprint data according to received fingerprint data. For example, if it is necessary to perform complex image processing such as noise reduction for the received fingerprint data, the second processor 420 may transfer the received fingerprint data to the first processor 410 allowing the first processor 410 to determine the validity of the received fingerprint data.

The validity of the fingerprint data may represent matching degree between input fingerprint data and a registered fingerprint data, or how similar the input fingerprint data is to the registered fingerprint data. For example, if the matching degree between input fingerprint data and a registered fingerprint data is greater than or equal to a set first reference value, the input fingerprint data may correspond to the registered fingerprint data, and it may be determined that the validity of the input fingerprint data is accepted. If the matching degree is under the first reference value, the electronic device may determine a next ranking validity of the input fingerprint data. Although the input fingerprint does not correspond to the registered fingerprint, however, if the matching degree or converted value from the matching degree is greater than or equal to a set second reference value, the input fingerprint data may have the next ranking validity. The next ranking validity may represent to approve a limited validity for a part of function (or, a certain application) whose security level is set low.

If it is determined that the second processor 420 currently has a data processing capability for determining the validity of the input fingerprint, the second processor 420 may determine whether the validity of input fingerprint data is accepted. More specifically, the first processor 410 may determine whether matching degree between the input fingerprint data and a registered fingerprint data is greater than or equal to the set first reference value. If the matching degree is greater than or equal to the set first reference value, the input fingerprint data corresponds to the registered fingerprint data.

If the validity of the input fingerprint data is accepted, the second processor 420 may transmit fingerprint data related to the input fingerprint (hereinafter, input fingerprint data) to the first processor 410. More specifically, if the second processor 420 determines that the matching degree between the fingerprint data and the registered fingerprint data is greater than or equal to the set first reference value, the second processor 420 may transmit data including that the input fingerprint data corresponds to the registered fingerprint data to the first processor 410.

After that, the first processor 410 may release a lock (for example, lock setting) of the electronic device and simultaneously switch the state of an electronic device to a wake-up state. More specifically, if the first processor 410 has received data of content that validity of the fingerprint data input from the second processor 420 is accepted; the first processor 410 may release the lock and simultaneously switch the electronic device in the sleep state to the wake-up state.

That is, since the electronic device according to the present invention operates in a low power state during all operations of receiving a user's specified operation and fingerprint while maintaining the sleep state where only the second processor 420 operates and then determining whether the input fingerprint is the user's registered fingerprint, an amount of battery consumption of the electronic device may be reduced. More specifically, the electronic device may transmit data that validity of the input fingerprint data is accepted to the first processor 410 only when the input fingerprint data corresponds to the registered fingerprint data while only the second processor 420 operates in low power to release the lock and simultaneously switch the electronic device in the sleep state to the wake-up state.

If the validity of the input fingerprint data is not accepted, the second processor 420 may determine whether the validity of the fingerprint data is equal to or greater than a set second reference value. More specifically, if the validity of the input fingerprint data is not accepted, the second processor 420 may determine a next ranking validity. According to an embodiment, the second processor 402 may convert the matching degree between the input fingerprint data and the registered fingerprint data to a set numerical value, and then determine whether the converted numerical value is equal to or greater than the set second reference value.

According to another embodiment, as a result of determination of validity of the input fingerprint data, the matching degree may be under the first reference value, and be greater than or equal to the second reference value set for accepting a next ranking validity. For example, in a case where the second reference value set for accepting a next ranking validity of fingerprint data is 70 percent, the matching degree may be 72 percent.

In the above example, though input fingerprint data does not accurately correspond to the registered fingerprint data, that is, the matching degree is under the first reference value, if the validity of the input fingerprint data exceeds 70 percent, which is the set second reference value set, the next ranking validity may be accepted. Accordingly, the second processor 420 may execute at least one of application whose security is set low. More specifically, since the validity of the fingerprint data exceeds the set reference value, the electronic device may display respective icons that may execute applications such as a camera, a memo, etc. whose security is low, receive one of the displayed icons as an input from the user and execute the received application.

That is, the electronic device according to the present invention allows an operation to be performed even in the case where a fingerprint is not accurately recognized due to an internal defect of the electronic device or a foreign substance (for example, contamination) put on a user's fingerprint. In the case where next ranking validity of registered fingerprint data is accepted, the electronic device allows an application whose security is low to be executed to improve a user's convenience.

If it is determined that the second processor 420 currently does not have a data processing capability for determining validity of the input fingerprint, the second processor 420 may transmit the input fingerprint data to the first processor 410. More specifically, if the second processor 420 currently does not have a data processing capability for determining validity of the input fingerprint, the second processor 420 may pass over determination of the validity of the input fingerprint to the first processor 410.

According to various embodiments, the first processor 410 may include a memory 411 and a security region 412. Accordingly, the first processor 410 may determine the validity of the input fingerprint data in a security region 412 located inside the first processor 410. That is, the electronic device according to the present invention does not switch from the sleep state to the wake-up state, and determines the validity of the input fingerprint data in the security region 412 located inside the first processor 410. Also, of course, the electronic device according to the present invention may pass over the right for determining the validity of the input fingerprint data from the first processor 410 to the second processor 420 depending on a data processing capability of the first processor 410.

According to various embodiments, one physical processor (for example, a processor core) may be divided into two regions of a normal region and a security region, and separate at least one of a CPU, a register, an address space, a memory, a device, and an OS (operating system) into two for each region to isolate the respective region. For example, the processor may specify a device or a memory region to which only the security region is able to access. Accordingly, the processor does not allow even an OS of the normal region to access to the security region by separating the security region, thereby achieving high reliability with the security region. Each region cannot affect to the other region, and it is necessary to enter a separate CPU mode for execution of the security region, which is not allowed in the application level. Only through a kernel, the processor is able to enter the separate CPU mode. The processor may execute an application or a program which requires high security in the security region and other program or OS in the normal region. Detailed description relating thereto is made with reference to FIGS. 5A and 5B.

The electronic device according to the various embodiments of the present invention may include a sensor module configured to detect a specified operation in a sleep state, and receive a input fingerprint when the specified operation is detected, and a first processor configured to determine whether the input fingerprint corresponds to the registered fingerprint, and if the input fingerprint corresponds to the registered fingerprint, release a lock simultaneously switching to a wake-up state.

According to the various embodiments of the present invention, the sensor module may detect the specified operation using at least one of an acceleration sensor, a gyro sensor, a geomagnetic sensor, a grip sensor, a fingerprint sensor, and a gesture sensor.

According to the various embodiments of the present invention, the sensor module may receive the input fingerprint using a fingerprint sensor provided to a set region, and if the first processor receives the fingerprint, the second processor may determine whether to determine itself that the input fingerprint corresponds to a registered fingerprint, and if the second processor determines to determine itself whether the input fingerprint corresponds to the registered fingerprint, the second processor may compare the input fingerprint with the registered fingerprint to determine validity of the input fingerprint.

According to the various embodiments of the present invention, the second processor may determine validity of the fingerprint data while the first processor is in a sleep state and the second processor operates at low power.

According to the various embodiments of the present invention, if the second processor determines not to determine itself whether the input fingerprint corresponds to the registered fingerprint, the first processor may receive the fingerprint data related the input fingerprint from the second processor, and determine validity of the fingerprint data.

According to the various embodiments of the present invention, the first processor may convert a threshold determining validity of the fingerprint data to a set numerical value, determine whether the converted validity of the fingerprint data is equal to or greater than a set reference value, and if the converted validity is equal to or greater than the set reference value, execute set at least one application whose security is low.

According to the various embodiments of the present invention, if the validity of the fingerprint data is not accepted, the first processor may convert a threshold determining validity of the fingerprint data to a set numerical value, determine whether the converted validity of the fingerprint data is equal to or greater than a set reference value, and if the converted validity is equal to or greater than the set reference value, execute set at least one application whose security is low.

According to the various embodiments of the present invention, the electronic device may include a display module configured to display at least one of set contact information or set phrase if the first processor receives the fingerprint.

According to the various embodiments of the present invention, the first processor may determine that validity of fingerprint data is accepted, and when data comprising content that the validity of the fingerprint data is accepted is transmitted from the second processor, may release a set screen lock simultaneously switching electronic device from the sleep state to the wake-up state.

Figure 5A:
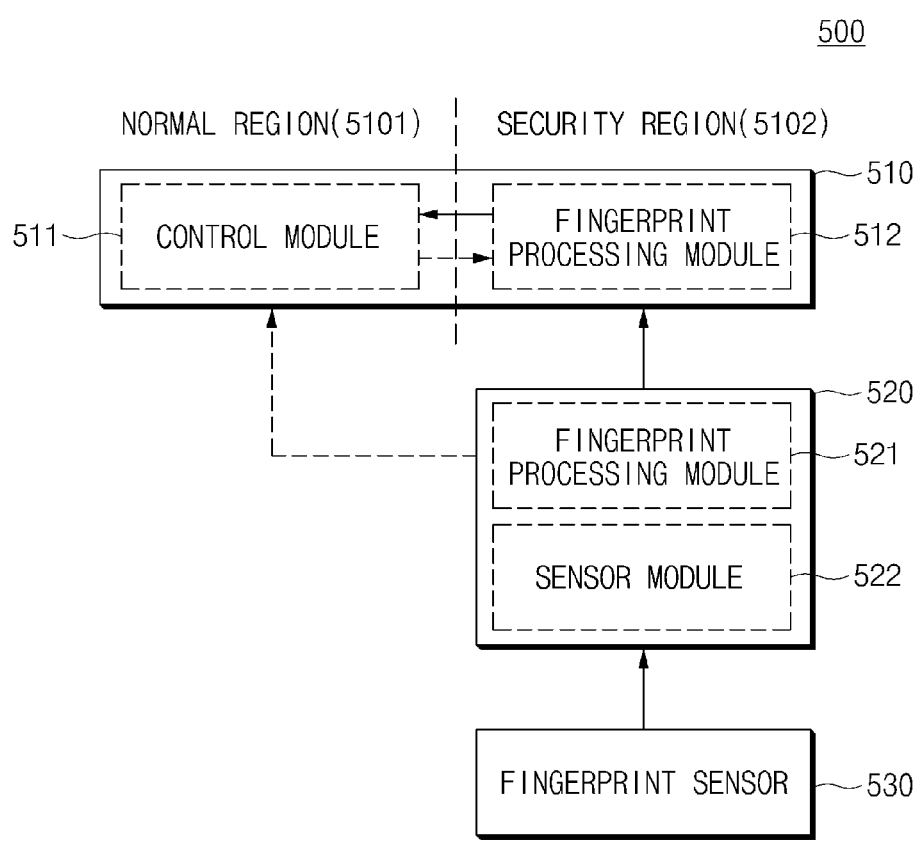
FIGS. 5A and 5B are block diagrams illustrating an electronic device according to another embodiment of the present invention.
Figure 5B:
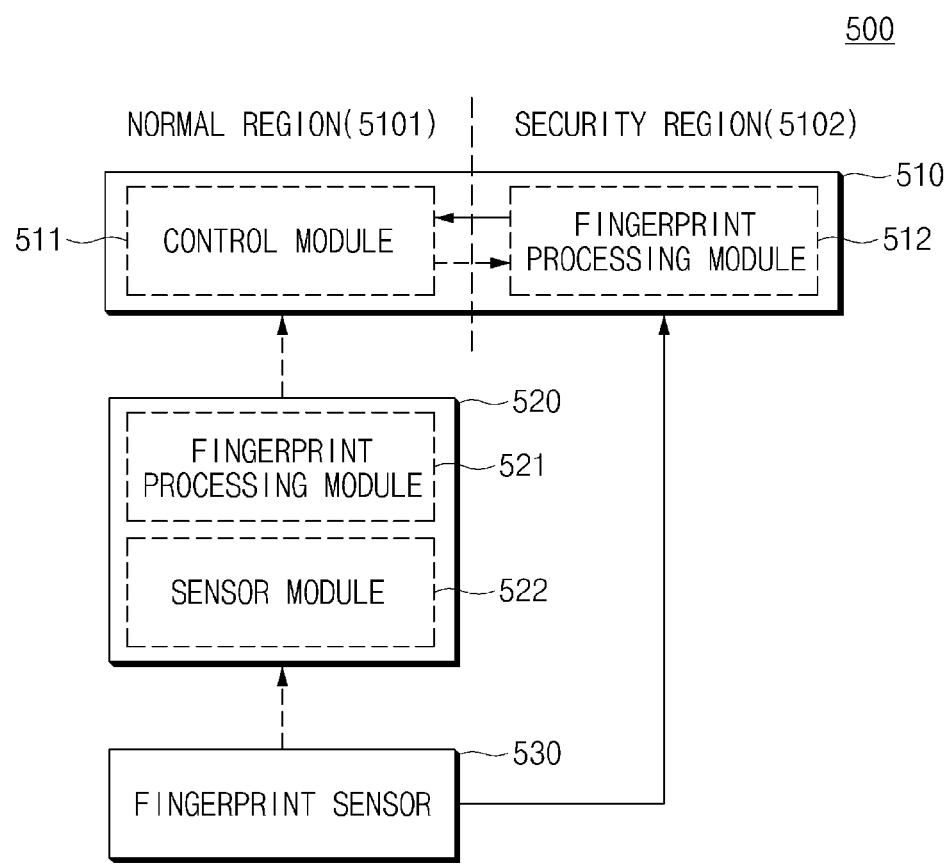

FIGS. 5A and 5B are block diagrams illustrating an electronic device according to an embodiment of the present invention. A first processor 510 of an electronic device 500 illustrated in FIGS. 5A and 5B may be divided two regions of a normal region 5101 and a security region 5102. The electronic device may perform data processing of fingerprint data obtained through a fingerprint sensor 530 or fingerprint processing in the security region 5102 of the first processor 510 to which a user cannot access. The normal region 5101 of the first processor 510 may transmit/receive a control signal (represented as a dotted arrow) related the fingerprint processing and control an operation of the electronic device 500 on the basis of the control signal. The security region 5102 of the first processor 510 may receive fingerprint data or data obtained after data processing of the fingerprint data (represented as a solid arrow), and determine the validity of the fingerprint data on the basis of the received fingerprint data.

Referring to FIG. 5A, the electronic device 500 may allow only the second processor 520 to access to the fingerprint sensor 530 limiting other access to the fingerprint sensor 530. The fingerprint sensor 530 may transmit fingerprint data to the second processor 520, and prevent access to the fingerprint data from other elements. The fingerprint processing module 521 of the second processor 520 may determine whether there is a user's intention of fingerprint input, and process the fingerprint data or transmit a control signal corresponding to existence of the user's intention of fingerprint input to the normal region 5101 of the first processor 510 for processing the fingerprint data in the security region 5102 of the first processor 510. Accordingly to various embodiments, the fingerprint processing module 512 of the first processor 510 may include at least one of an image processing unit (or a second image processing unit which performs at least part of image processing), or a fingerprint authentication unit. The fingerprint processing module 521 of the second processor 520 may include at least one of a determination unit, an image processing unit (or a first image processing unit which performs at least part of image processing), or a fingerprint authentication unit.

According to an embodiment, the second processor 520 may receive fingerprint data obtained from the fingerprint sensor 530, and perform image processing such as reconfiguration of a fingerprint image, minutiae extraction, etc. on the basis of the received fingerprint data. The fingerprint processing module 521 may determine whether there is a user's intention of fingerprint input on the basis of at least one of detected operation through a sensor module 522, fingerprint data received from the fingerprint sensor 530, or processed fingerprint data obtained after image processing. If it is determined that there is a user's intention of fingerprint input, the second processor 520 may determine whether input fingerprint correspond to a registered fingerprint on the basis of the processed fingerprint data. The second processor 520 may transmit a control signal to the normal region 5101 of the first processor 510 according to existence of the user's intention of fingerprint input or a result of the determination. The normal region 5101 may let the fingerprint processing module 512 of the security region 5101 determine a validity of the input fingerprint data or a next ranking validity of the input fingerprint data through the control signal. The security region 5102 may receive a matching degree between the input fingerprint data and registered fingerprint data, and determine the validity or the next ranking validity of the input fingerprint data.

The security region 5102 may transmit a determination result of the validity or the next ranking validity of the input fingerprint data to the normal region 5101. For example, if the validity of the input fingerprint data is accepted, that is, if it is determined that the input fingerprint correspond to the registered fingerprint, the security region 5102 may transmit the determination result or a control signal corresponding to the determination result to a control module 511 of the normal region 5101 to release a lock of the electronic device 500 authenticating the input fingerprint. If it is determined that the input fingerprint does not correspond to the registered fingerprint, but the next ranking validity is accepted, the security region 5102 may transmit the determination result or a control signal corresponding to the determination result to a control module 511 of the normal region 5101 to execute at least one application whose security is low. Further, it is determined that both of the validity and the next ranking validity are not accepted, the security region 5102 may transmit the determination result or a control signal corresponding to the determination result to a control module 511 of the normal region 5101 to display a contact information, set in advance, or a notice message saying that the electronic device is unusable.

According to another embodiment, the second processor 520 may receive fingerprint data obtained from the fingerprint sensor 530, and perform image processing such as reconfiguration of a fingerprint image, minutiae extraction, etc. on the basis of the received fingerprint data. The fingerprint processing module 521 may determine whether there is a user's intention of fingerprint input on the basis of at least one of detected operation through a sensor module 522, fingerprint data received from the fingerprint sensor 530, or processed fingerprint data obtained after image processing. The second processor 520 may transmit a control signal to the normal region 5101 of the first processor 510 according to existence of the user's intention of fingerprint input. If it is determined that there is a user's intention of fingerprint input, the normal region 5101 may let the fingerprint processing module 512 of the security region 5101 perform fingerprint processing through the control signal. The security region 5102 may receive processed data obtained after image processing, and determine whether input fingerprint correspond to a registered fingerprint on the basis of the processed data. The fingerprint processing module 512 may determine the validity or the next ranking validity of the input fingerprint data on the basis of a matching degree between the input fingerprint data and registered fingerprint data. The security region 5101 may transmit a determination result of the validity or the next ranking validity to the normal region 5101. After that, the normal region 5101 may operate the same, as illustrated in the above embodiment, according to the determination result.

According to another embodiment, the second processor 520 may receive fingerprint data obtained from the fingerprint sensor 530, and perform first image processing such as reconfiguration of a fingerprint image, etc. on the basis of the received fingerprint data. The fingerprint processing module 521 may determine whether there is a user's intention of fingerprint input on the basis of at least one of detected operation through a sensor module 522, fingerprint data received from the fingerprint sensor 530, or processed fingerprint data obtained after the first image processing. The second processor 520 may transmit a control signal to the normal region 5101 of the first processor 510 according to existence of the user's intention of fingerprint input. If it is determined that there is a user's intention of fingerprint input, the normal region 5101 may let the fingerprint processing module 512 of the security region 5101 perform second image processing and fingerprint processing through the control signal. The security region 5102 may receive processed data obtained after the first image processing, and perform the second image processing such as minutiae extraction etc. on the basis of the processed data. The security region 5102 may determine whether input fingerprint correspond to a registered fingerprint on the basis of processed data obtained after that the second image processing. The fingerprint processing module 512 may determine the validity or the next ranking validity of the input fingerprint data on the basis of a matching degree between the input fingerprint data and registered fingerprint data. The security region 5101 may transmit a determination result of the validity or the next ranking validity to the normal region 5101. After that, the normal region 5101 may operate the same, as illustrated in the above embodiment, according to the determination result.

Referring to FIG. 5B, the electronic device 500 may allow only the security region 5102 of the first processor 510 or the second processor 520 to access to the fingerprint sensor 530 limiting other access to the fingerprint sensor 530. Accordingly, the fingerprint sensor 530 may prevent access to the fingerprint data from other elements. The fingerprint processing module 521 of the second processor 520 may determine whether there is a user's intention of fingerprint input, and transmit a control signal corresponding to existence of the user's intention of fingerprint input to the normal region 5101 of the first processor 510 for receiving the fingerprint data in the security region 5102 of the first processor 510 from the fingerprint sensor 530. Accordingly to various embodiments, the fingerprint processing module 512 of the first processor 510 may include an image processing unit and a fingerprint authentication unit. The fingerprint processing module 521 of the second processor 520 may include a determination unit or an image processing unit.

According to an embodiment, the second processor 520 may determine whether there is a user's intention of fingerprint input on the basis of detected operation through a sensor module 522. The second processor 520 may transmit a control signal to the normal region 5101 of the first processor 510 according to existence of the user's intention of fingerprint input. If it is determined that there is a user's intention of fingerprint input, the normal region 5101 may let the fingerprint processing module 512 of the security region 5101 receive fingerprint data directly from the fingerprint sensor 530 and perform image processing and fingerprint processing on the basis of the received fingerprint data through the control signal. The security region 5102 of the first processor 510 may perform image processing such as reconfiguration of a fingerprint image, minutiae extraction, etc. on the basis of the received fingerprint data. The security region 5102 may determine whether input fingerprint correspond to a registered fingerprint on the basis of processed fingerprint data obtained after image processing. The fingerprint processing module 512 may determine the validity or the next ranking validity of the input fingerprint data on the basis of a matching degree between the input fingerprint data and registered fingerprint data. The security region 5101 may transmit a determination result of the validity or the next ranking validity to the normal region 5101. After that, the normal region 5101 may operate the same, as illustrated in the embodiment of FIG. 5A, according to the determination result.

According to another embodiment, the second processor 520 may determine whether there is a user's intention of fingerprint input on the basis of at least one of detected operation through a sensor module 522 or fingerprint data received from the fingerprint sensor 530. The second processor 520 may transmit a control signal to the normal region 5101 of the first processor 510 according to existence of the user's intention of fingerprint input. If it is determined that there is a user's intention of fingerprint input, the normal region 5101 may let the fingerprint processing module 512 of the security region 5101 receive fingerprint data directly from the fingerprint sensor 530 and perform image processing and fingerprint processing on the basis of the received fingerprint data through the control signal. When the security region 5102 receives fingerprint data from the fingerprint sensor 530, all the information passage (for example, interface) connecting the second processor 520 to the first processor 510 may be blocked. The security region 5102 may perform image processing such as reconfiguration of a fingerprint image, minutiae extraction, etc. on the basis of the received fingerprint data. The security region 5102 may determine whether input fingerprint correspond to a registered fingerprint on the basis of processed fingerprint data obtained after image processing. The fingerprint processing module 512 may determine the validity or the next ranking validity of the input fingerprint data on the basis of a matching degree between the input fingerprint data and registered fingerprint data. The security region 5101 may transmit a determination result of the validity or the next ranking validity to the normal region 5101. After that, the normal region 5101 may operate the same, as illustrated in the embodiment of FIG. 5A, according to the determination result.

Figure 6:
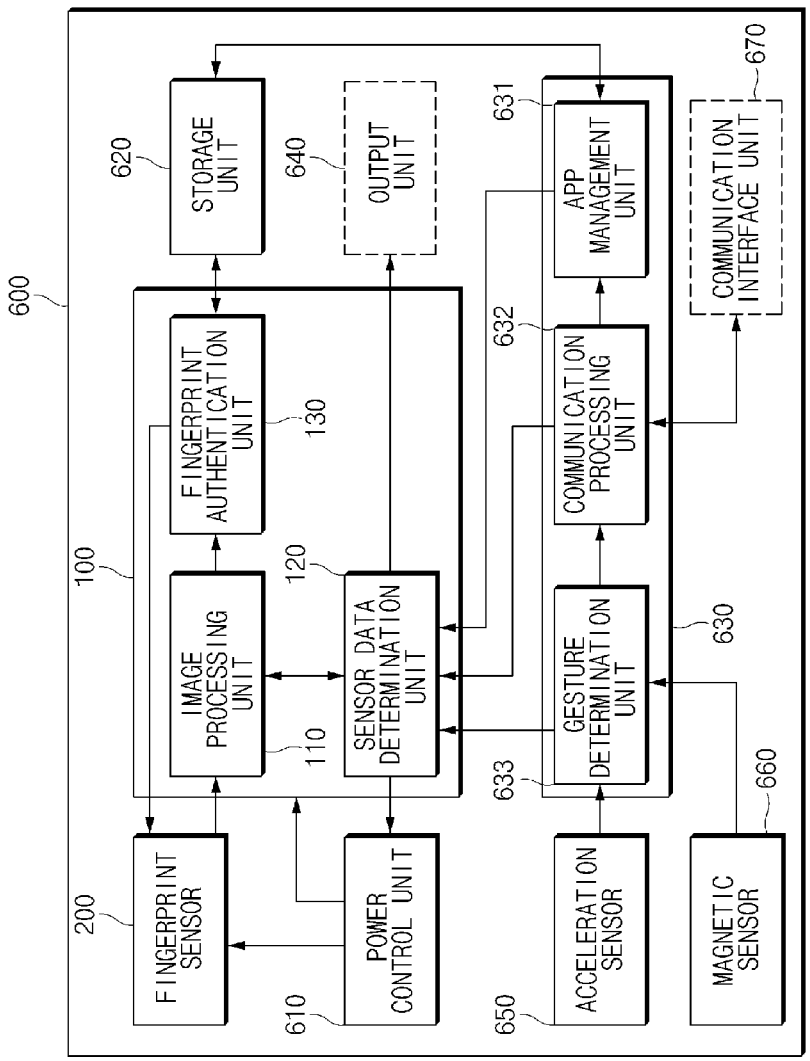
FIG. 6 is a block diagram illustrating an electronic device according to an embodiment of the present invention.

FIG. 6 is a block diagram illustrating an electronic device according to an embodiment of the present invention. Referring to FIG. 6, the electronic device 600 includes a fingerprint processing device 100, a fingerprint sensor 200, a power control unit 610, a storage unit 620, a control unit 630, an output unit 640, an acceleration sensor 650, and a magnetic sensor 660. The content described with reference to FIGS. 1 and 2 relating to the fingerprint processing device 100 and the fingerprint sensor 200 may be applied to the fingerprint processing device 100 and the fingerprint sensor 200 of FIG. 6. In this regard, overlapping descriptions are not provided.

In this specification, only components relating to this embodiment are described in order not to obscure features thereof. Accordingly, those skilled in the art will understand that other general-purpose components other than the components shown in FIG. 6 may be further included.

The fingerprint processing device 100 receives sensor data from the fingerprint sensor 200 and reconfigures the received sensor data as an image. The fingerprint processing device 100 determines whether the sensor data is a pseudo input on which a fingerprint authentication does not need to be performed by using the reconfigured image.

According to an embodiment of the present invention, the fingerprint processing device 100 determines whether sensor data is a pseudo input on which a fingerprint authentication does not need to be performed, on the basis of at least one of whether sensor data is a fingerprint form of data, whether the amount of change in the received sensor data for a predetermined time is greater than or equal to a predetermined value, and whether a direction of a fingerprint in the received sensor data corresponds to a direction set for fingerprint authentication.

According to another embodiment, the fingerprint processing device 100 determines whether sensor data is a pseudo input on which a fingerprint authentication does not need to be performed on the basis of a determination result of a gesture recognized by a gesture determination unit 633 of the control unit 630.

According to another embodiment, the fingerprint processing device 100 determines whether sensor data is a pseudo input on which a fingerprint authentication does not need to be performed on the basis of whether the fingerprint sensor 200 is used for execution of an application received from an app management unit 631.

Furthermore, the fingerprint processing device 100 may determine whether sensor data is a pseudo input on which a fingerprint authentication does not need to be performed on the basis of whether a call/message/notification signal occurs from a communication processing unit 632. The call/message/notification signal includes an incoming/outgoing signal of a Short Message Service (SMS) message or a Multimedia Message Service (MMS) message and various notification signals. However, the present invention is not limited thereto, and the call/message/notification signal may include all incoming/outgoing signals of data transmitted/received through a communication network.

If sensor data is determined to be pseudo input according to a determination result of the fingerprint processing device 100, a control signal is outputted to the power control unit 610 in order to allow the fingerprint sensor 200 to be in a power saving mode. If the sensor data is not determined to be pseudo input, the sensor data determination unit 120 outputs a control signal to perform a fingerprint processing in which the fingerprint authentication unit 130 determines whether a fingerprint corresponding to a fingerprint in sensor data is registered.

In this embodiment, the fingerprint processing device 100 processes sensor data of the fingerprint sensor 200 and is separate from the control unit 630. However, the present invention is not limited thereto, and the fingerprint processing device 100 may be included in the control unit 630. Alternatively, the fingerprint processing device 100 may be included in a sensor hub for processing sensor data from sensors such as the acceleration sensor 650 and the magnetic sensor 660 in addition to the fingerprint sensor 200.

When the target 10 having a predetermined permittivity is detected, the fingerprint sensor 200 performs a sensing operation on the target 10 to obtain sensor data and transmits the obtained sensor data to the fingerprint processing device 100.

The power control unit 610 controls the power supplied to each unit of the electronic device 600. The power control unit 610 receives a control signal from the fingerprint processing device 100 and controls the fingerprint sensor 200 or the fingerprint processing device 100, thereby allowing it to be in a power saving mode. In this embodiment, for convenience of description, only a signal relationship between the fingerprint sensor 200, the fingerprint processing device 100, and the power control unit 610 will be described.

The storage unit 620, as a typical storage medium, stores a fingerprint registered through the fingerprint sensor 200 and the fingerprint processing device 100. Additionally, the storage unit 620 stores data or programs necessary for determining whether sensor data of the fingerprint processing device 100 is a pseudo input. Besides that, the storage unit 620 may store data or programs necessary for operations of the electronic device 600. The storage unit 620 may be implemented using a Hard Disk Drive (HDD), Read Only Memory (ROM), Random Access Memory (RAM), Flash Memory, Memory Card, NAND Memory, or Solid State Drive (SDD).

The control unit 630 controls operations of the electronic device 600. The control unit 630 includes the app management unit 631, the communication processing unit 632, and the gesture determination unit 633. In addition, the control unit 630 may include other units for controlling operations of the electronic device 600. However, such descriptions shall not be included in order not to obscure the features of this embodiment. The control unit 630 may correspond to at least one processor or may include more than one processor.

The app management unit 631 manages information relating to applications and operations thereof. For example, the app management unit 631 may provide information on whether there is an application currently being executed and what kind of hardware device is used for executing a corresponding application. The app management unit 631 may provide information on whether there is an application currently being executed in the fingerprint processing device 100 and whether the fingerprint sensor 200 is used for executing a corresponding application, in response to a request from the fingerprint processing device 100.

On receiving a determination result from the app management unit 631 that there is no application currently being executed or the fingerprint sensor 200 is not used for executing the application currently being executed, the fingerprint processing device 100 determines sensor data as a pseudo input on which a fingerprint authentication does not need to be performed.

For example, the fingerprint sensor 200 is not required for game play or video play. Accordingly, if a predetermined application not requiring fingerprint sensor 200 to execute the application is currently being executed, for example, game play app or video play app, the fingerprint processing device 100 allows the fingerprint sensor 200 to enter a power saving mode.

The communication processing unit 632 processes a call/message/notification signal, which includes all incoming/outgoing signals of data transmitted/received through a communication network. An outgoing signal of a call, an SMS message, or an MMS message occurs in response to a user's request and is received by the communication processing unit 632. An incoming signal of a call, an SMS message, or an MMS message is received by the communication processing unit 632 through the communication interface unit 670. On receiving the call/message/notification signal, the communication processing unit 632 provides a notification to the fingerprint processing device 100 that the call/message/notification signal has occurred.

On receiving the call/message/notification signal from the communication processing unit 632, the fingerprint processing device 100 allows the fingerprint sensor 200 to enter a power saving mode. Due to the call/message/notification signal, even when the sensor data determination unit 120 of the fingerprint processing device 100 receives sensor data, it determines the sensor data to be a pseudo input on which a fingerprint authentication does not need to be performed.

In the case of an incoming/outgoing call, until a call from the communication processing unit 632 is terminated, the sensor data determination unit 120 determines the sensor data received by the fingerprint processing device 100 to be a pseudo input on which a fingerprint authentication does not need to be performed. Accordingly, the fingerprint processing device 100 maintains the fingerprint sensor 200 to be in a power saving mode until a call termination signal is received.

The gesture determination unit 633 determines whether a recognized gesture corresponds to a predetermined gesture by using at least one sensor equipped in the electronic device 600. The least one sensor may include all sensors used for gesture recognition, for example, the acceleration sensor 650, the magnetic sensor 660, or a proximity sensor (not shown). Hereinafter, for convenience of description, it will be described that the gesture determination unit 633 recognizes a gesture by using the acceleration sensor 650 or the magnetic sensor 660. On the basis of a signal input from the acceleration sensor 650 or the magnetic sensor 660, the gesture determination unit 633 recognizes which gesture corresponds to the input signal, and if the recognized gesture corresponds to a predetermined gesture, outputs a control signal to the fingerprint processing device 100. When the fingerprint processing device 100 receives from the gesture determination unit 633 a determination result that the recognized gesture corresponds to the predetermined gesture, it determines the sensor data to be a pseudo input on which a fingerprint authentication does not need to be performed.

The predetermined gesture may be stored in the storage unit 620. For example, when the gesture determination unit 633 recognizes an operation of picking up the electronic device 600, the fingerprint processing device 100 receives a determination result from the gesture determination unit 633 and allows the fingerprint sensor 200 to enter a power saving mode. The predetermined gesture may be a gesture performing a predetermined function, such as a direct call, that does not require the use of the fingerprint sensor 200, but the present invention is not limited thereto.

The output unit 640 outputs a determination result of the sensor data determination unit 120. The output unit 640 may output a determination result of the sensor data determination unit 120 in a voice, vibration, text, picture or video format by using a display panel, a touch screen, a speaker and a vibration sensor, equipped in the electronic device 600. However, the present invention is not limited thereto, and the output unit 640 may output a determination result of the sensor data determination unit 120 in various formats in addition to the above formats.

The acceleration sensor 650 detects a movement state or an exercise state of a user of the electronic device 600 by detecting a vibration or an impact applied to the electronic device 600, or a change in speed of the electronic device 600.

The magnetic sensor 660 recognizes a movement or position of the electronic device 600 as a result of a change in a magnetic field.

The communication interface unit 670 receives a call, an SMS message, an MMS message, and a notification transmitted via a communication network and transmits a call, an SMS message, an MMS message, and a notification via a communication network at the request of a user.

An electronic device according to various embodiments of the present invention may include a fingerprint sensor, when a target having a predetermined permittivity is detected, configured to obtain sensor data by performing a sensing operation on the target and transmitting the obtained sensor data to a fingerprint processing device, a power control unit configured to control power supply for the fingerprint sensor, and the fingerprint processing device configured to receive sensor data from the fingerprint sensor, reconfigure the received sensor data as an image, determine whether the sensor data is a pseudo input by using the reconfigured image, output a control signal to the power control unit to allow the fingerprint sensor to enter a power saving mode if the sensor data is determined as the pseudo input, and determine whether a fingerprint corresponding to a fingerprint from the sensor data is registered if the sensor data is not determined as the pseudo input.

According to various embodiments of the present invention, the fingerprint processing device may determine whether the sensor data is a pseudo input on the basis of at least one of whether the sensor data is a fingerprint form of data, whether an amount of change in sensor data received over a predetermined time is greater than or equal to a predetermined value, and whether a fingerprint direction of the received sensor data corresponds to a direction set for fingerprint authentication.

According to various embodiments of the present invention, the electronic device may further include a communication processing unit configured to process a call/message/notification signal, an application management unit configured to manage an execution of an application and information relating to the application, wherein the fingerprint processing device determines whether the sensor data is a pseudo input on the basis of whether the fingerprint sensor is used for executing an application being executed or whether a call/message/notification signal occurs.

According to various embodiments of the present invention, the electronic device may further include an acceleration sensor, a magnetic sensor, and a gesture determination unit configured to determine whether a gesture recognized by using at least one of the acceleration sensor and the magnetic sensor corresponds to a predetermined gesture, wherein the fingerprint processing device determines whether the sensor data is a pseudo input on the basis of a determination result of the recognized gesture from the gesture determination unit.

Figure 7:
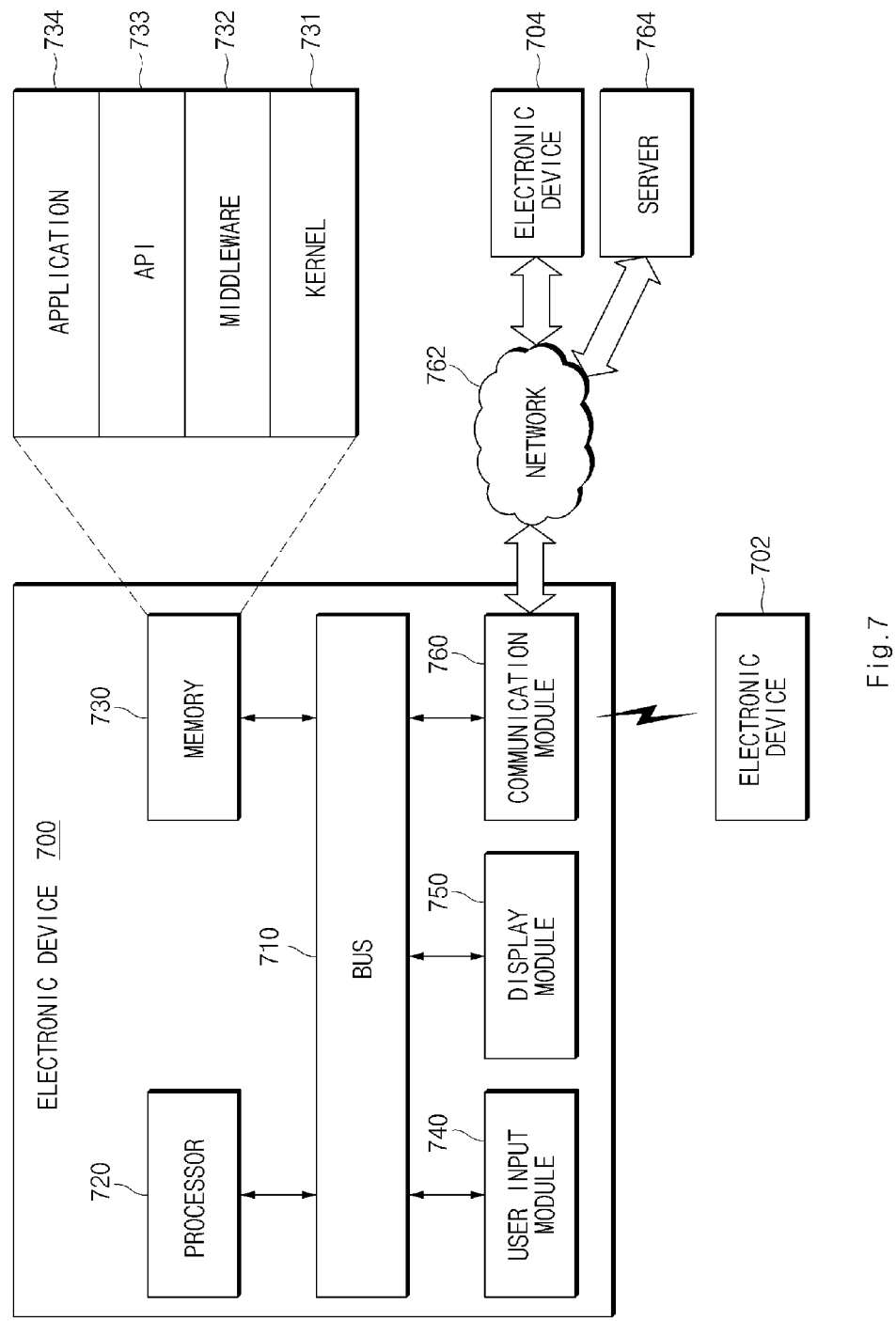
FIG. 7 is a block diagram illustrating an electronic device according to another embodiment of the present invention.

FIG. 7 is a block diagram illustrating an electronic device according to an embodiment. Referring to FIG. 7, the electronic device 700 may include a bus 710, a processor 720, a memory 730, a user input module 740, a display module 750, or a communication module 760.

The bus 710 may be a circuit for connecting the above-mentioned elements and transferring communication (ex: a control message) between the above-mentioned elements.

The processor 720, for example, may receive an instruction from the above-described elements (for example, the memory 730, the user input module 740, the display module 750, the communication module 760, etc.) via the bus 710, decode the received instruction, and execute an operation or a data process corresponding to the decoded instruction.

The memory 730 may store an instruction or data received from the processor 720 or other elements (ex: the user input module 740, the display module 750, the communication module 760, etc.) or generated by the processor 720 or the other elements. The memory 730, for example, may include program modules such as a kernel 731 a middleware 732, an application programming interface (API) 733, or an application 734, etc. The above-mentioned respective programming modules may be configured of a software, a firmware, a hardware, or a combination of two or more of these.

The kernel 731 may control or manage system resources (ex: the bus 710, the processor 720, or the memory 730, etc.) used for executing an operation or a function implemented in the to other programming modules, for example, the middleware 732, the API 733, or the application 734. Also, the kernel 731 may provide an interface via which the middleware 732, the API 733, or the application 734 accesses an individual element of the electronic device 700 to control or manage the same.

The middleware 732 may serve as a mediator so that the API 733 or the application 734 may communicate with the kernel 731 to give and take data. Also, in connection with task requests received from the (plurality of) applications 734, the middleware 732 may perform load balancing regarding the task requests using, for example, a method for assigning an order of priority that may use a system resource (ex: the bus 710, the processor 720, or the memory 730, etc.) of the electronic device 700 to at least one of the (plurality of) applications 734.

The API 733 is an interface via which the application 734 may control a function provided by the kernel 731 or the middleware 732. The API 733 may include at least one interface or a function for a file control, a window control, image processing, or a character control, etc.

The user input module 740, for example, may receive an instruction or data from a user to transfer the same to the processor 720 or the memory 730 via the bus 710. The display module 750 may display an image, a video, or data, etc. to a user.

The communication module 760 may enable communication between another electronic device 702 and the electronic device 700. The communication module 760 may support a short distance communication protocol of a predetermined distance (ex: Wireless Fidelity (Wi-Fi), Bluetooth (BT), Near Field Communication (NFC), or a predetermined network communication 762 (ex: the Internet, a Local Area Network (LAN), a Wide Area Network (WAN), a telecommunication network, a cellular network, a satellite network or Plain Old Telephone Service (POTS), etc.)). Each of the electronic devices 702 and 704 may be the same (ex: the same type of) device as the electronic device 700 or a different (ex: a different type of) device.

Figure 8:
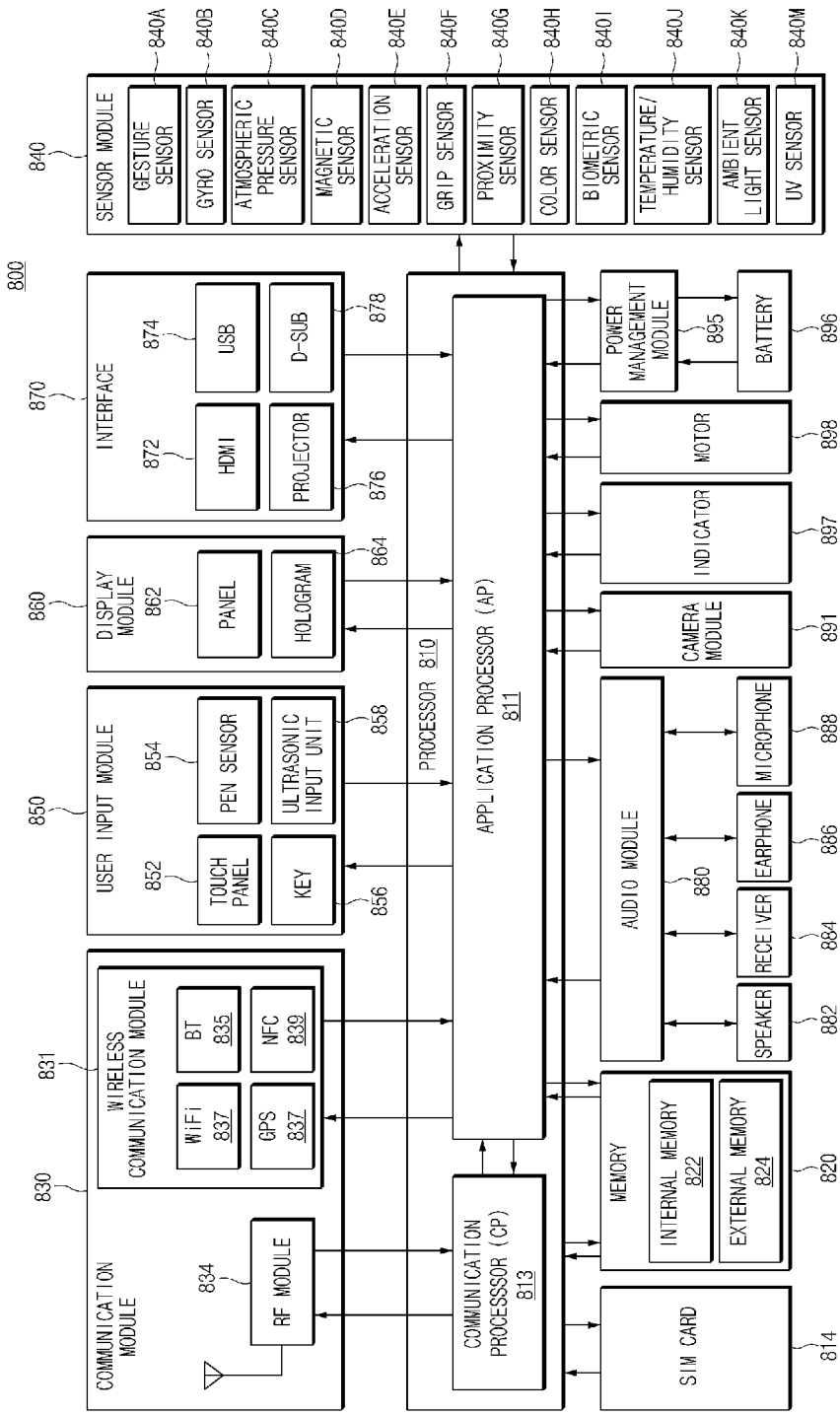
FIG. 8 is a block diagram illustrating hardware according to an embodiment of the present invention.

FIG. 8 is a block diagram illustrating a hardware 800 according to an embodiment. The hardware 800, for example, may be the electronic device 700 illustrated in FIG. 7. Referring to FIG. 8, the hardware may include one or more processors 810, a Subscriber Identification Module (SIM) card 814, a memory 820, a communication module 830, a sensor module 840, a user input module 850, a display module 860, an interface 870, an audio CODEC 880, a camera module 891, a power management module 895, a battery 896, an indicator 897, or a motor 898.

The processor 810 (ex: the processor 720) may include one or more application processors (AP) 811 or one or more communication processors (CP) 813. The processor 810, for example, may be the processor 720 illustrated in FIG. 7. Though the AP 811 and the CP 813 are included inside the processor 810 in FIG. 8, the AP 811 and the CP 813 may be included inside different IC packages, respectively.

The processor 810 according to an embodiment of the present invention may receive sensor data detected from the fingerprint sensor, and determine whether the sensor data is a pseudo input on which a fingerprint authentication does not need to be performed. For example, the processor 810 may determine whether the sensor data is a pseudo input on the basis of at least one of whether sensor data is a fingerprint form of data, whether the amount of change in the sensor data received for a predetermined time is greater than or equal to a predetermined value, and whether a direction of a fingerprint in the received sensor data corresponds to a direction set for fingerprint authentication. The processor 810 may determine whether sensor data is a pseudo input on the basis of detected gesture. Alternatively, the processor 810 may determine a pseudo input on the basis of whether the fingerprint sensor is used for execution of an application. The processor 810 may determine whether sensor data is a pseudo input on the basis of whether a call/message/notification signal occurs. If sensor data is determined to be pseudo input according to the determination result, a control signal may be outputted in order to allow the fingerprint sensor to be in a power saving mode. If the sensor data is not determined to be a pseudo input, the processor 810 may perform a fingerprint processing which determines whether a fingerprint of sensor data corresponds to a registered fingerprint.

The processor 810 according to another embodiment of the present invention may include a first processor and a second processor. The first processor and the second processor may operate independently. For example, although the first processor stays in a sleep state, the second processor may be in a wake-up state. The second processor may identify whether a received fingerprint corresponds to a registered fingerprint, and if the received fingerprint corresponds to the registered fingerprint, the second processor may switch the electronic device to the wake-up state simultaneously with releasing a lock. Also, if a fingerprint is received, the second processor may determine which processor matches the input fingerprint input with the registered fingerprint. If it is determined that the second processor matches the input fingerprint with the registered fingerprint, the second processor may compare the input fingerprint with the registered fingerprint to determine validity of fingerprint data of the input fingerprint. Except for the second processor, other elements of the electronic device may be in a sleep state.

In the case where the second processor does not determine to match the input fingerprint with the registered fingerprint, the second processor may transfer a fingerprint data related the input fingerprint to the first processor. The first processor may determine validity of the fingerprint data. Also, in the case where validity of the fingerprint data is not accepted, the first processor may determine a next ranking validity of the fingerprint data. For example, the first processor may convert matching degree between input fingerprint data and a registered fingerprint data to a set numerical value, and determine whether the converted value is equal to or greater than a set second reference value. If the first processor receives data including that the validity of fingerprint data is accepted from the second processor, the first processor may switch the electronic device from a sleep state to a wake-up state simultaneously releasing a set screen lock of the electronic device.

The AP 811 may drive an operating system (OS) or applications to control a plurality of hardware or software elements connected to the AP 811, and perform various data processes including multimedia data and operations. The AP 811, for example, may be implemented as a system on chip (SoC). According to an embodiment, the processor 810 may further include a Graphic Processing Unit (GPU) (not shown).

The CP 813 may perform a function of managing a data link and converting a communication protocol in a communication between an electronic device (ex: the electronic device 700) including the hardware 800 and other electronic devices connected via a network. The CP 813, for example, may be implemented as an SoC. According to an embodiment, the CP 813 may perform at least a portion of a multimedia control function. The CP 813, for example, may perform discrimination and authentication of a terminal inside a communication network using a subscriber identification module (ex: a SIM card 814). Also, the CP 813 may provide services such as voice communication, video communication, a short message, or packet data, etc. to the user.

Also, the CP 813 may control data transmission/reception of the communication module 830. Though elements such as the CP 813, the power management module 895, or the memory 820 are illustrated as elements separated from the AP 811 in FIG. 8, the AP 811 may be implemented to include at least a portion (ex: the CP 813) of the above-described elements according to an embodiment.

According to an embodiment, the AP 811 or the CP 813 may load an instruction or data received from at least one of a non-volatile memory and other elements connected to each of the AP 811 and the CP 813 to a volatile memory and process the same. Also, the AP 811 or the CP 813 may store data received from at least one of other elements or data generated by at least one of other elements in a non-volatile memory.

The SIM card 814 may be a card that implements a subscriber identification module, and may be inserted into a slot formed in a specific position of the electronic device. The SIM card 814 may include a unique identification information (ex: Integrated Circuit Card Identifier (ICCID)) or subscriber information (ex: International mobile subscriber identity (IMSI)).

The memory 820 may include a built-in memory 822 or an external memory 824. The memory 820, for example, may be the memory 730 illustrated in FIG. 7. The built-in memory 822, for example, may include at least one of a volatile memory (for example, dynamic random access memory (DRAM), static RAM (SRAM), synchronous dynamic RAM (SDRAM), etc.) and a non-volatile memory (for example, one time programmable ROM (OTPROM), a programmable ROM (PROM), erasable and programmable ROM (EPROM), electrically erasable and programmable ROM (EEPROM), mask ROM, flash ROM, NAND flash memory, NOR flash memory, etc.). According to an embodiment, the built-in memory 822 may have a form of a Solid State Drive (SSD). The external memory 824, for example, may further include a compact flash (CF), secure digital (SD), micro-secure digital (micro-SD), mini secure digital (mini-SD), extreme digital (xD), or a memory stick, etc.

The communication module 830 may include a wireless communication module 831 or a Radio Frequency (RF) module 834. The communication module 830, for example, may be the communication module 760 illustrated in FIG. 7. The wireless communication module 831, for example, may include a Wi-Fi 833, Bluetooth (BT) 835, a Global Positioning System (GPS) 837, or Near Field Communication (NFC) 839. For example, the wireless communication module 831 may provide a wireless communication function using a radio frequency. Additionally or generally, the wireless communication module 831 may include a network interface (ex: a LAN card) or a modem for connecting the hardware 800 with a network (ex: the Internet, a LAN, a WAN, a telecommunication network, a cellular network, a satellite network, or a POTS, etc.).

The RF module 834 may take charge of transmission/reception of data, for example, transmission/reception of an RF signal or a called electronic signal. Though not shown, the RF module 834 may include, for example, a transceiver, a power amp module (PAM), a frequency filter, or a low noise amplifier (LNA), etc. Also, the RF module 834 may further include a component for transmitting/receiving a radio wave in a free space in wireless communication, for example, a conductor or a conducting line, etc.

The sensor module 840, for example, may include at least one of a gesture sensor 840A, a gyro sensor 840B, an atmospheric pressure sensor 840C, a magnetic sensor 840D, an acceleration sensor 840E, a grip sensor 840F, a proximity sensor 840G, an color sensor (for example, RGB (red, green, blue) sensor) 840H, a biometric sensor 840I, a temperature/humidity sensor 840J, a ambient light sensor 840K, and an ultraviolet (UV) sensor 840M. The sensor module 840 may measure a physical quantity or detect an operation state of the electronic device to convert the measured or detected information to an electric signal. Additionally/generally, the sensor module 840, for example, may include an E-nose sensor (not shown), an electromyography sensor (EMG sensor) (not shown), an electroencephalogram sensor (EEG sensor) (not shown), an electrocardiogram sensor (ECG sensor), or a fingerprint sensor, etc. The sensor module 840 may further include a control circuit for controlling at least one sensor belonging thereto.

The sensor module 840 according to the present invention may detect a specified operation in a sleep state, and when the specified operation is detected, the sensor module 840 may sense a fingerprint to receive a fingerprint input. Also, the sensor module 840 may detect the specified operation using at least one of an acceleration sensor, a gyro sensor, a geomagnetic sensor, a grip sensor, a fingerprint sensor, and a gesture sensor. Also, the sensor module 840 may receive the fingerprint input using a fingerprint sensor provided to a set region.

The user input module 850 may include a touch panel 852, a (digital) pen sensor 854, a key 856, or an ultrasonic input unit 858. The user input module 850, for example, may be the user input module 740 illustrated in FIG. 7. The touch panel 852, for example, may recognize a touch input using at least one of capacitive, resistive, infrared, or ultrasonic methods. Also, the touch panel 852 may further include a controller (not shown). In case of a capacitive touch panel, it may perform proximity recognition as well as a direct touch. The touch panel 852 may further include a tactile layer. In this case, the touch panel 852 may provide a tactile reaction to a user.

The (digital) pen sensor 854, for example, may be implemented using a method which is the same as or similar to receiving a user's touch input, or using a separate sheet for recognition. For the key 856, a keypad or a touch pad may be used, for example. The ultrasonic input unit 858 is a device allowing a terminal to detect a sound wave using a microphone (ex: the microphone 888) via a pen generating an ultrasonic wave, and enables wireless recognition. According to an embodiment, the hardware 800 may receive a user input from an external device (ex: a network, a computer, or a server) connected thereto using the communication module 830.

The display module 860 may include a panel 862 or a hologram 864. The display module 860, for example, may be the display module 750 illustrated in FIG. 7. The panel 862, for example, may be a Liquid Crystal Display (LCD) or an Active-Matrix Organic Light-Emitting Diode (AM-OLED), etc. The panel 862, for example, may be implemented as a flexible, transparent, or wearable panel. The panel 862 may be configured as one module together with the touch panel 852. The hologram 864 may show a 3-dimensional image in a vacant space using interference of light. According to an embodiment, the display module 860 may further include a control circuit for controlling the panel 862 and the hologram 864.

If matching degree between input fingerprint data and a registered fingerprint data is greater than or equal to a second reference value set for acceptance of a next ranking validity, the display module 860 according to the present invention may display an icon that may execute at least one application whose security is set low. Also, the display module 860 may receive a selection of at least one of displayed icons. If it is detected that the matching degree is less than the second reference value by a set number of times or more, the display module 860 may display set contact information.

The interface 870, for example, may include a High-Definition Multimedia Interface (HDMI) 872, a Universal Serial Bus (USB) 874, a projector 876, or a D-subminiature (D-sub) 878. Additionally or generally, the interface 870, for example, may include Secure Digital (SD)/Multi-Media Card (MMC) (not shown) or infrared data association (IrDA) (not shown).

The audio CODEC 880 may convert voice and an electric signal in dual directions. The audio CODEC 880, for example, may convert voice information input or output via a speaker 882, a receiver 884, an earphone 886, or a microphone 888, etc.

The camera module 891 is a device that may shoot an image and a moving picture. According to an embodiment, the camera module 891 may include one or more image sensors (ex: a front lens or a rear lens), an image signal processor (ISP) (not shown) or a flash LED (not shown).

The power management module 895 may manage power of the hardware 800. Though not shown, the power management module 895, for example, may include a power management integrated circuit (PMIC), a charger integrated circuit (IC), or a battery fuel gauge.

The PMIC, for example, may be mounted inside an integrated circuit or an SoC semiconductor. The charging method may be classified into a wired method and a wireless method. The charger IC may charge a battery, and may prevent an overvoltage or an overcurrent from being introduced from a charger. According to an embodiment, the charger IC may include a charger IC for at least one of a wired charging method and a wireless charging method. For the wireless charging method, for example, there exist a magnetic resonance method, a magnetic induction method, or an electromagnetic wave method, etc., and an additional circuit for wireless charging, for example, circuits such as a coil loop, a resonance circuit, a rectifier, etc. may be added.

The battery gauge, for example, may measure a remnant of the battery 896, a voltage, a current or a temperature during charging. The battery 896 may generate electricity to supply power, and may be a rechargeable battery.

The indicator 897 may display a specific state of the hardware 800 or a portion (ex: the AP 811) thereof, for example, a booting state, a message state, or a charging state, etc. The motor 898 may convert an electric signal to mechanical vibration. An MCU 899 may control the sensor module 840.

Though not shown, the hardware 800 may include a processing device (ex: a GPU) for supporting a mobile TV. The processing device for supporting the mobile TV, for example, may process media data corresponding to standards such as Digital Multimedia Broadcasting (DMB), Digital Video Broadcasting (DVB), or a media flow, etc.

A name of the above-described element of the hardware according to the present invention may change depending on the kind of the electronic device. The hardware according to the present invention may include at least one of the above-described elements, and some of the elements may be omitted or additional other elements may be further included. Also, some of elements of the hardware according to the present invention may combine to form one entity and equally perform a function of the relevant elements before the combination.

Figure 9:
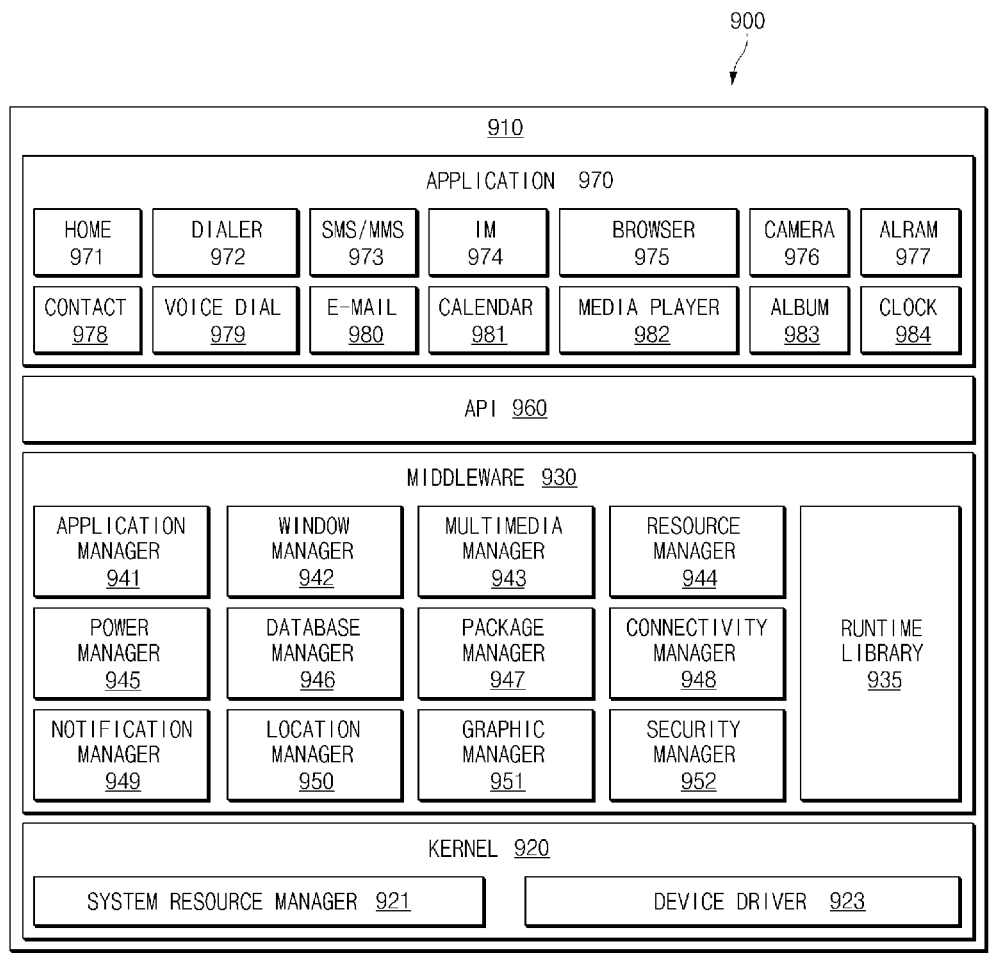
FIG. 9 is a block diagram illustrating a programming module according to an embodiment of the present invention.

FIG. 9 is a block diagram illustrating a programming module 900 according to an embodiment. The programming module 900 may be included (ex: stored) in the electronic device 700 (ex: the memory 730) illustrated in FIG. 7. At least a portion of the programming module 900 may be configured using a software, a firmware, a hardware, or a combination of at least two or more of these. The programming module 900 may be implemented in a hardware (ex: the hardware 800) to include an OS controlling a resource related to the electronic device (ex: the electronic device 700) or various applications (ex: the application 970) driven on the OS. For example, the OS may be Android, iOS, Windows, Symbian, Tizen or Bada, etc. Referring to FIG. 9, the programming module 900 may include a kernel 910, a middleware 930, an application programming interface (API) 960, or an application 970.

The kernel 910 (ex: the kernel 731) may include a system resource manager 911 or a device driver 912. The system resource manager 911, for example, may include a process manager 913, a memory manager 915, or a file system manager 917, etc. The system resource manager 911 may perform control, allocation, or recovery, etc. of a system resource. The device driver 912, for example, may include a display driver 914, a camera driver 916, a Bluetooth driver 918, a share memory driver 920, a USB driver 922, a keypad driver 924, a WiFi driver 926, or an audio driver 928. Also, according to an embodiment, the device driver 912 may include an inter-process communication (IPC) driver.

The middleware 930 may include a plurality of modules implemented in advance for providing a function which the application 970 requires in common. Also, the middleware 930 may provide a function via the API 960 so that the application 970 may efficiently use a limited system resource of the inside of the electronic device. For example, as illustrated in FIG. 9, the middleware 930 (ex: the middleware 732) may include at least one of a runtime library 935, an application manager 941, a window manager 942, a multimedia manager 943, a resource manager 944 a power manager 945, a database manager 946, a package manager 947, a connectivity manager 948, a notification manager 949, a location manager 950, a graphic manager 951, or a security manager 952.

The runtime library 935, for example, may include a library module which a compiler uses in order to add a new function via a programming language while the application 970 is executed. According to an embodiment, the runtime library 935 may perform a function for an input/output, memory management, or an arithmetic function.

The application manager 941, for example, may manage a life cycle of at least one application among the applications 970. The window manager 942 may manage a GUI resource used on a screen. The multimedia manager 943 may understand a format required for reproducing various media files, and perform encoding or decoding of a media file using a codec suitable for a relevant format. The resource manager 944 may manage a resource such as a source code, a memory, or a storage space, etc. of at least one application among the applications 970.

The power manager 945 may operate together with a Basic Input/Output System (BIOS), etc. to manage a battery or power, and provide power information, etc. required for an operation. The database manager 946 may manage to generate, retrieve, or change a database to be used by at least one of the applications 970. The package manager 947 may manage installation or update of an application distributed in the form of a package file.

The connectivity manager 948, for example, may manage wireless connection such as Wi-Fi or Bluetooth, etc. The notification manager 949 may display or notice an event such as an arrived message, a promise, proximity notice, etc. in a way that does not disturb a user. The location manager 950 may manage the position information of the electronic device. The graphic manager 951 may manage a graphic effect to be provided to a user or a user interface related thereto. The security manager 952 may provide all security functions required for system security or user security, etc. According to an embodiment, in the case where the electronic device (ex: the electronic device 700) has a telephone function, the middleware 930 may further include a telephony manager (not shown) for managing a voice or video communication function of the electronic device.

The middleware 930 may generate and use a new middleware module via various function combinations of the above-described internal element modules. The middleware 930 may provide a module specialized for each kind of an OS in order to provide a differentiated function. Also, the middleware 930 may dynamically delete some of existing elements or add new elements. Therefore, the middleware 930 may omit some of elements described in an embodiment of the present invention, or further have another element, or replace an element by an element having a different name and performing a similar function.

The API 960 (ex: the API 733) is a set of API programming functions, and may be provided as a different configuration depending on an OS. For example, in case of Android or iOS, for example, one API set may be provided for each platform. In case of Tizen, for example, two or more API sets may be provided.

The application 970 (ex: the application 734), for example, may include a preloaded application or a third party application.

At least a portion of the programming module 900 may be implemented using an instruction stored in a computer-readable storage medium. In the case where the instruction is executed by one or more processors (ex: the processor 810), the one or more processors may perform a function corresponding to the instruction. A computer-readable storage medium, for example, may be the memory 860. At least a portion of the programming module 900, for example, may be implemented (ex: executed) by the processor 810. At least a portion of the programming module 900 may include, for example, a module, a program, a routine, sets of instructions, or a process, etc. for performing one or more functions.

A name of elements of a programming module (ex: the programming module 900) according to the present invention may change depending on the kind of the OS. Also, a programming module according to the present invention may include at least one of the above-described elements, or some of the elements may be omitted, or additional other elements may be further included.

Figure 10:
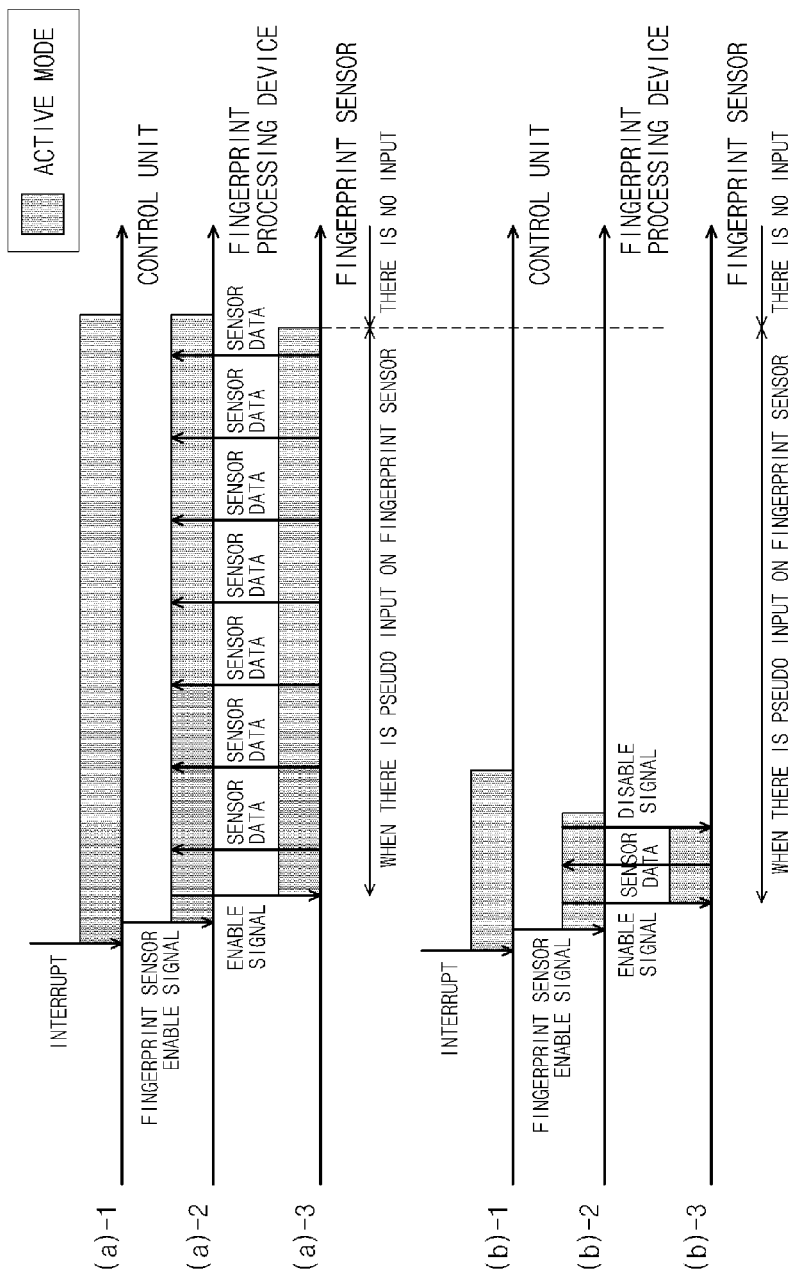
FIG. 10 illustrates graphs of operations of a fingerprint sensor and a fingerprint processing device according to a pseudo input of the fingerprint sensor which is maintained for a predetermined time.

FIG. 10 illustrates graphs of operations of a fingerprint sensor and a fingerprint processing device according to a pseudo input of the fingerprint sensor which is maintained for a predetermined time.

Graphs (a)-1 to (a)-3 illustrate operations of the control unit 630, the fingerprint processing device 100, and the fingerprint sensor 200, respectively, in an existing fingerprint processing system operating without power control according to a determination result on whether sensor data is a pseudo input, in accordance with the conventional art.

When an interrupt signal is received, the control unit 630 enters into an active mode. If the fingerprint processing device 100 receives a fingerprint sensor enable signal under the condition that the control unit 630 is in an active mode, the fingerprint processing device 100, enters into an active mode. Under the condition that the fingerprint processing device 100 is in an active mode, if the fingerprint sensor 200 receives an enable signal, the fingerprint sensor 200 enters into an active mode.

If there is a pseudo input having a permittivity of a person on the fingerprint sensor 200, the fingerprint sensor 200 obtains sensor data and transmits the obtained sensor data to the fingerprint processing device 100. As shown in graph (a)-3, if a pseudo input having a permittivity of a person is maintained on the fingerprint sensor 200, the fingerprint sensor 200 senses the target 10 continuously and transmits the obtained sensor data to the fingerprint processing device 100.

The fingerprint processing device 100 continuously receives the sensor data of a pseudo input from the fingerprint sensor 200, extracts a feature on the received sensor data, and performs a fingerprint authentication. Accordingly, as shown in graphs (a)-2 and (a)-3, the fingerprint sensor 200 and the fingerprint processing device 100, respectively, do not enter a power saving mode and maintain the active mode continuously, and also consume power while the pseudo input is maintained. Accordingly, the control unit 630 also does not enter a power saving mode, while the fingerprint processing device 100 performs fingerprint processing and the control unit 630 maintains the active mode as shown in graph (a)-1.

In graph (a)-3, soon after there is no input of the fingerprint sensor 200, the fingerprint sensor 200 enters a power saving mode. Accordingly, if there is no input for a predetermined time, control unit 630 and the fingerprint processing device 100 enter a power saving mode as shown in graphs (a)-1 and (a)-2, respectively.

In such a way, in graphs (a)-1 to (a)-3, while a pseudo input is maintained in spite of sensor data requiring no fingerprint authentication, the fingerprint processing device 100 performs unnecessary fingerprint processing on sensor data repeatedly and consumes power in accordance with the prior art.

Graphs (b)-1 to (b)-3 illustrate operations of the control unit 630, the fingerprint processing device 100, and the fingerprint sensor 200, respectively, when the fingerprint processing device 100 or a fingerprint processing method is used according to an embodiment of the present invention.

A procedure in which the control unit 630, the fingerprint processing device 100, and the fingerprint sensor 200 enter into an active mode is identical to that described with reference to graphs (a)-1 to (a)-3.

If there is a pseudo input having a permittivity of a person on the fingerprint sensor 200, the fingerprint sensor 200 obtains sensor data and transmits the obtained sensor data to the fingerprint processing device 100 as shown in graph (b)-3. The fingerprint processing device 100 determines whether the received sensor data is a pseudo input through the sensor data determination unit 120. The sensor data determination unit 120 determines that the received sensor data is a pseudo input and the fingerprint processing device 100 transmits a disable signal to the fingerprint sensor 200 through power control unit 610 so as to allow the fingerprint sensor 200 to enter a power saving mode.

According to another embodiment, when the fingerprint processing device 100 receives a call/message/notification signal from the control unit 630, it transmits a disable signal to the fingerprint sensor 200 through power control unit 610 in order to allow the fingerprint sensor 200 to enter a power saving mode.

In graph (b)-3, even when a pseudo input having a permittivity of a person is continuously maintained on the fingerprint sensor 200, the fingerprint sensor 200 enters a power saving mode. In graph (b)-2, since there is no reception of sensor data from the fingerprint sensor 200 for a predetermined time, the fingerprint processing device 100 enters a power saving mode. The control unit 630 shown in graph (b)-1 enters a power saving mode if there is no input for a predetermined time.

If an input of the fingerprint sensor 200 is a pseudo input on which a fingerprint authentication does not need to be performed, the fingerprint processing device 100 according to this embodiment of the present invention determines whether the input is a pseudo input before performing fingerprint processing and then allows the fingerprint sensor 200 to enter a power saving mode. Compared to the power consumption of the fingerprint sensor 200, the fingerprint processing device 100, and the control unit 630 shown in graphs (a)-1 to (a)-3, the power consumption of the fingerprint sensor 200, the fingerprint processing device 100, and the control unit 630 shown in graphs (b)-1 to (b)-3, may be effectively reduced.

Figure 11:
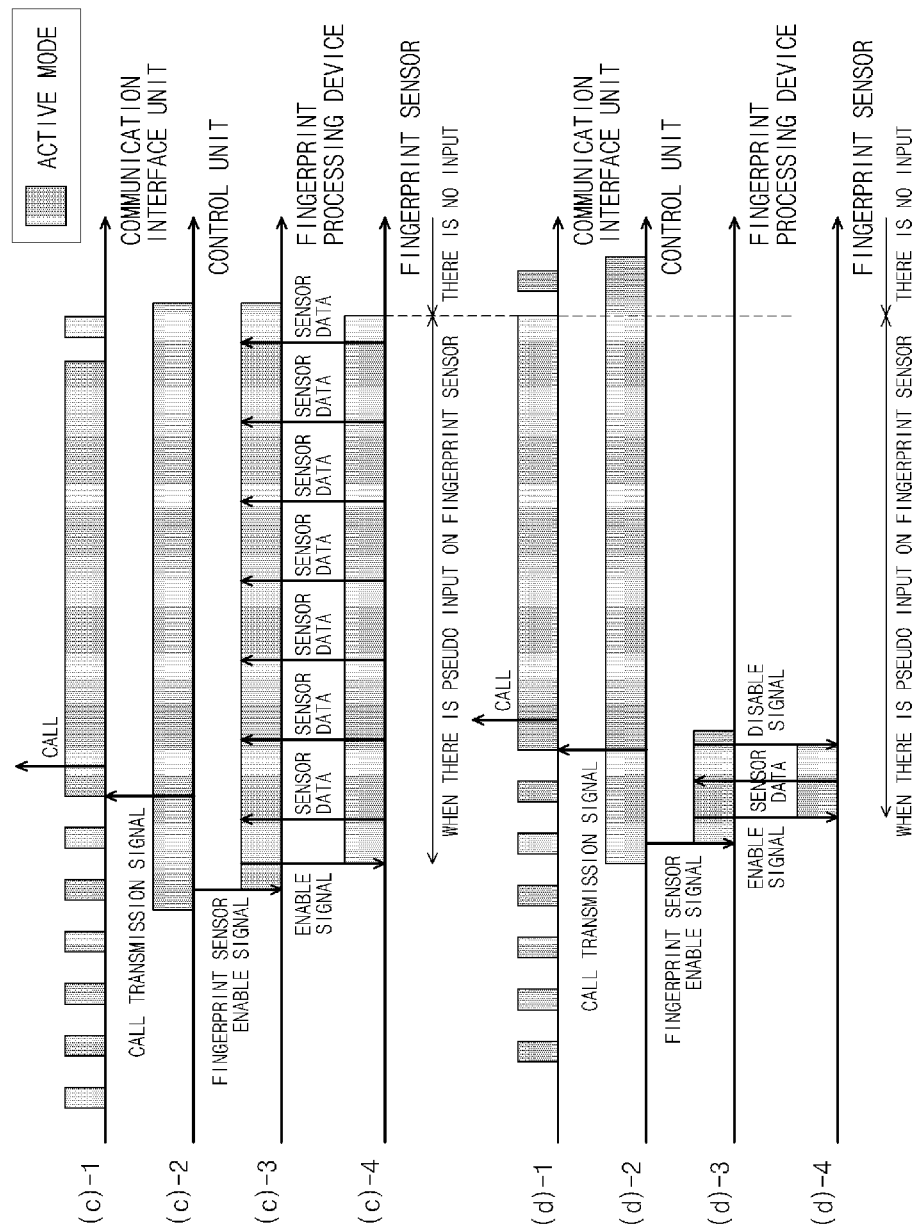
FIG. 11 illustrates graph of operations of a fingerprint sensor and a fingerprint processing device according to a pseudo input of the fingerprint sensor which is maintained for a predetermined time.

FIG. 11 illustrates graphs of operations of a fingerprint sensor and a fingerprint processing device according to a pseudo input of the fingerprint sensor maintained for a predetermined time during a call transmission.

Graphs (c)-1 to (c)-4 illustrate operations of the communication interface unit 670, the control unit 630, the fingerprint processing device 100, and the fingerprint sensor 200, respectively, in an existing fingerprint processing system operating, without power control according to a determination result on whether sensor data is a pseudo input, in accordance with the conventional art.

Once a call transmission request arrives at the control unit 630, the control unit 630 enters into an active mode and transmits a call transmission signal to the communication interface unit 670. Additionally, if the fingerprint processing device 100 receives a fingerprint sensor enable signal under the condition that the control unit 630 is in an active mode, the fingerprint processing device 100 enters into an active mode. Under the condition that the fingerprint processing device 100 is in an active mode, if the fingerprint sensor 200 receives an enable signal, the fingerprint sensor 200 enters into an active mode.

For example, although no fingerprint authentication through the fingerprint sensor 200 is required during a call, there may be a pseudo input because a cheek or a finger contacts the fingerprint sensor 200 during a call. In such a way, if there is a pseudo input having a permittivity of a person on the fingerprint sensor 200, the fingerprint sensor 200 obtains sensor data and transmits the obtained sensor data to the fingerprint processing device 100, as shown in graphs (c)-3 and (c)-4.

In this case, the pseudo input of the fingerprint sensor 200 is maintained until the call is terminated. If a pseudo input having a permittivity of a person is maintained on the fingerprint sensor 200, the fingerprint sensor 200 senses the target 10 continuously and transmits the obtained sensor data to the fingerprint processing device 100. The fingerprint processing device 100 continuously receives the sensor data of a pseudo input from the fingerprint sensor 200, extracts a feature on the received sensor data, and performs a fingerprint authentication.

Until there is no input to the fingerprint sensor 200, as shown in graph (c)-3, the fingerprint processing device 100 does not enter a power saving mode and maintains an active mode.

In graph (c)-4, soon after there is no input to the fingerprint sensor 200, the fingerprint sensor 200 enters a power saving mode. Then, if there is no input for a predetermined time, the fingerprint processing device 100 enters a power saving mode as shown in graph (c)-3.

In such a way, in graphs (c)-1 to (c)-4, while a pseudo input is maintained in spite of the fact that no fingerprint authentication is required during a call, the fingerprint processing device 100 repeatedly performs unnecessary fingerprint processing on sensor data and consumes power.

Graphs (d)-1 to (d)-4 illustrate operations of the communication interface unit 670, the control unit 630, the fingerprint processing device 100, and the fingerprint sensor 200, respectively, when the fingerprint processing device 100 or a fingerprint processing method is used according to an embodiment of the present invention.

A procedure that the communication interface unit 670, the control unit 630, the fingerprint processing device 100, and the fingerprint sensor 200 enter an active mode is identical to that described with reference to graphs (c)-1 to (c)-4.

In the same manner, there may be a pseudo input for a predetermined time if a cheek or a finger contacts the fingerprint sensor 200. In this case, as shown in graph (d)-4, the fingerprint sensor 200 obtains sensor data and transmits the obtained sensor data to the fingerprint processing device 100.

In graph (d)-2, if the communication processing unit 632 of the control unit 630 receives a call transmission signal, it transmits a notification that the call transmission signal occurs to the sensor data determination unit 120 of the fingerprint processing device 100. Until a call termination signal is received from the communication processing unit 632, the sensor data determination unit 120 determines the sensor data received by the fingerprint processing device 100 as a pseudo input on which a fingerprint authentication does not need to be performed.

On the basis of a determination result of the sensor data determination unit 120, the fingerprint processing unit 100 transmits a disable signal to the fingerprint sensor 200 through the power control unit 610 to allow the fingerprint sensor 200 to enter a power saving mode as shown in graph (d)-4. The fingerprint processing device 100 maintains the fingerprint sensor 200 to be in a power saving mode until a call termination signal is received. Or, when receiving a call reception signal through the communication interface unit 670, the control unit 630 enters into an active mode and the fingerprint processing device 100 and the fingerprint sensor 200 enter into an active mode through a fingerprint sensor enable signal.

In graph (d)-3, since there is no reception of sensor data from the fingerprint sensor 200 for a predetermined time, the fingerprint processing device 100 enters a power saving mode. Even when a pseudo input having a permittivity of a person is continuously maintained, the fingerprint sensor 200 and the fingerprint processing device 100 enter into a power saving mode as shown in graphs (d)-3 and (d)-4.

The control unit 630 shown in graph (d)-2 maintains the active mode until the call is terminated. If the call is terminated and there is no input for a predetermined time, the control unit 630 enters a power saving mode after a while as shown in graph (d)-2.

While a function, such as a call, requiring no fingerprint authentication is performed, the fingerprint processing device 100 according to this embodiment determines an input of the fingerprint sensor 200 as a pseudo input and then allows the fingerprint sensor 200 to enter a power saving mode. Compared to the power consumption of the fingerprint sensor 200 and the fingerprint processing device 100 of the conventional art shown in graphs (c)-1 to (c)-4, the power consumption of the fingerprint sensor 200 and the fingerprint processing device 100 of the present invention shown in graphs (d)-1 to (d)-4 may be effectively reduced.

FIGS. 12A to 12C are views illustrating an embodiment of detecting a specified operation in an electronic device according to the present invention. First, as illustrated in FIG. 12A, the electronic device may be in a sleep mode state of a low power state where only a second processor operates. More specifically, before receiving user authentication, the electronic device may be in the sleep mode state, not in a wake-up mode where all elements of the electronic device, whose power is supplied from a battery, operate.

After that, the electronic device may determine whether it has received a specified operation. More specifically, the electronic device may detect a specified operation for receiving a user's fingerprint using an operation detection sensor, provided to the electronic device, such as an acceleration sensor, a gyro sensor, a geomagnetic sensor, a grip sensor, and a gesture sensor, etc.

For example, as illustrated in FIG. 12B, in a case where an electronic device has a grip sensor on the left/right sides of the electronic device in order to receive a specified operation from a user, a specified operation may be an operation of a user's grip detected in the grip sensor.

In the above example, the electronic device may detect a specified operation that a user will input a fingerprint using the grip sensor. The specified operation may be defined in advance. More specifically, the electronic device may sense a fingerprint from a user only when detecting the user's grip before receiving the fingerprint; hence, as described above, detection for the specified operation in advance may prevent the electronic device from sensing an unintended fingerprint input from the user.

After that, the electronic device may receive a user's fingerprint using a fingerprint sensor 1201 provided to a set region of the electronic device. For example, in a case where the fingerprint sensor 1201 that may receive a fingerprint of a user's thumb is provided to the set region of the left of the electronic device, the electronic device may receive the fingerprint of the user's thumb from the fingerprint sensor 1201 if the grip operation is detected.

After that, the electronic device may determine whether input fingerprint data corresponds to registered fingerprint data. More specifically, the electronic device may determine validity of fingerprint data that determines whether a user's fingerprint data, registered in advance, corresponds to currently input fingerprint data.

As illustrated in FIG. 12C, if validity of input fingerprint data is accepted, the electronic device may release a lock simultaneously switching the electronic device in a sleep state to a wake-up state.

That is, the electronic device according to the present invention may perform a user authentication process with low power using a fingerprint sensor during the sleep state, and if authenticating the user, the electronic device may release a lock of the electronic device simultaneously switching the state of the electronic device to a wake-up state, thereby improving a user's convenience. Also, the electronic device according to the present invention has a sensor that detects in advance a user's gesture who intends to input a fingerprint before receiving a fingerprint from the user, so that the electronic device may prevent an erroneous input and determine the user's accurate input intention in advance.

FIGS. 13A to 13D are views illustrating another embodiment of detecting a specified operation in an electronic device according to the present invention. First, as illustrated in FIG. 13A, the electronic device may be in a sleep mode state of a low power state where only a second processor operates. More specifically, before receiving user authentication, the electronic device may be in the sleep mode state, not in a wake-up mode where all elements of the electronic device, whose power is supplied from a battery, operate.

After that, the electronic device may determine whether it has received a specified operation. More specifically, the electronic device may detect a specified operation for receiving a user's fingerprint using an operation detection sensor, provided to the electronic device, such as an acceleration sensor, a gyro sensor, a geomagnetic sensor, a grip sensor, and a gesture sensor, etc.

For example, as illustrated in FIG. 13B, in a case where the electronic device has a gyro sensor and an acceleration sensor, etc. in a set region of the electronic device in order to receive a specified operation from a user, a specified operation may be a movement having a set angle (a degree) or more by the electronic device.

In the above example, the electronic device may detect the movement that a user will input a fingerprint using a sensor such as the gyro sensor, and the acceleration sensor, etc. provided to a set region of the electronic device. The movement and the set angle may be defined in advance. More specifically, the electronic device may sense a fingerprint from the user only when detecting the movement of the set angle (a degree) or more before receiving the fingerprint; hence, as described above, detection for the specified operation in advance may prevent the electronic device from sensing an unintended fingerprint input from the user.

After that, the electronic device may receive a user's fingerprint using the fingerprint sensor 1301 provided to a set region of the electronic device. For example, as illustrated in FIG. 13C, the electronic device may display the fingerprint sensor on a touchscreen of the electronic device and simultaneously display a notice message such as "input a fingerprint on the fingerprint sensor". Also, the electronic device may transfer a voice message such as "input a fingerprint on the fingerprint sensor" using a speaker provided to the electronic device.

After that, if receiving a user's fingerprint from the fingerprint sensor 1301 displayed on the touchscreen, the electronic device may determine whether the input fingerprint data corresponds to registered fingerprint data. More specifically, the electronic device may determine validity of the input fingerprint data determining whether a user's fingerprint data, registered in advance, corresponds to currently input fingerprint data.

As illustrated in FIG. 13D, if validity of input fingerprint data is accepted, the electronic device may release a lock and simultaneously switch the electronic device in the sleep state to the wake-up state.

That is, through detecting a user's specified operation for receiving the user's fingerprint and determining that validity of the input fingerprint data is accepted, the electronic device according to the present invention may release the set and simultaneously switch the electronic device from the sleep state to the wake-up state, thereby reducing the user's interaction.

Figure 14A:
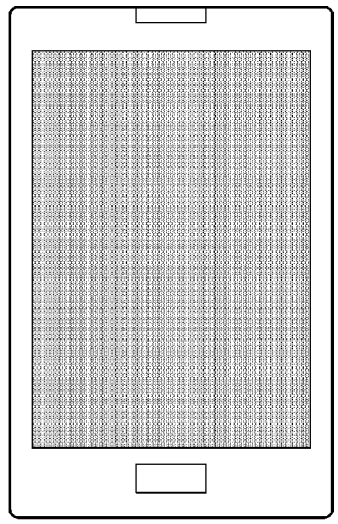
FIGS. 14A to 14D illustrate an electronic device detecting a specified operation according to another embodiment of the present invention.

FIGS. 14A to 14D are views illustrating still another embodiment of detecting a specified operation in an electronic device according to the present invention. First, as illustrated in FIG. 14A, the electronic device may be in a sleep mode state of a low power state where only a second processor operates. More specifically, before receiving user authentication, the electronic device may be in the sleep mode state, not in a wake-up mode where all elements of the electronic device, whose power is supplied from a battery, operate.

After that, the electronic device may determine whether it has received a specified operation. More specifically, the electronic device may detect a specified operation for receiving a user's fingerprint using an operation detection sensor, provided to the electronic device, such as an acceleration sensor, a gyro sensor, a geomagnetic sensor, a grip sensor, and a gesture sensor, etc.

Figure 14B:
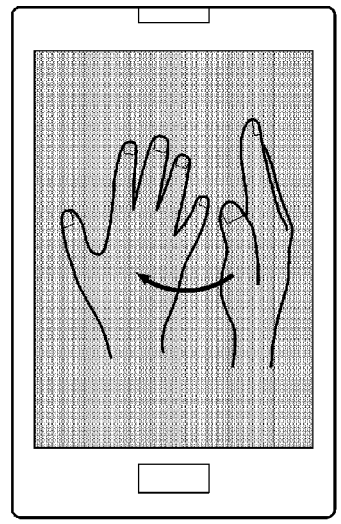

For example, as illustrated in FIG. 14B, in a case where the electronic device has a gesture sensor, etc. in a set region of the electronic device in order to receive a specified operation from a user, a specified operation may be a movement where a user's hand, etc. moves from the right to the left.

In the above example, the electronic device may detect the movement where a user's hand moves from the right to the left using a sensor such as the gesture sensor. The movement may be defined in advance. More specifically, the electronic device may sense a fingerprint from the user only when detecting the movement before receiving the fingerprint; hence, as described above, detection for the specified operation in advance may prevent the electronic device from sensing an unintended fingerprint input from the user.

Figure 14C:
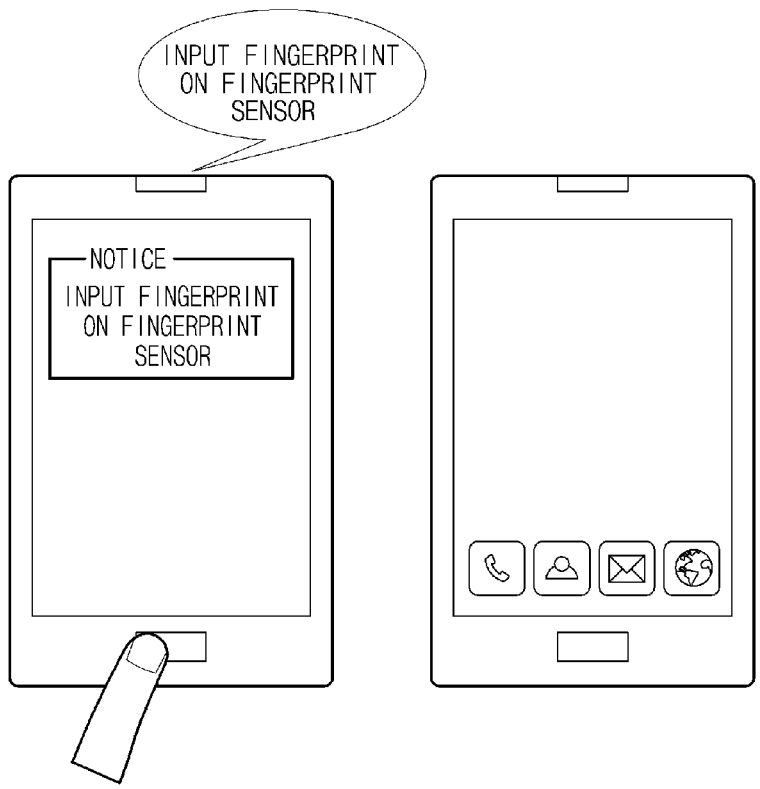

After that, the electronic device may receive the user's fingerprint using a fingerprint sensor provided to a set region of the electronic device. For example, as illustrated in FIG. 14C, the electronic device may display a notice message such as "input a fingerprint on the fingerprint sensor" before sensing the user's fingerprint from the fingerprint sensor. Also, the electronic device may transfer a voice message such as "input a fingerprint on the fingerprint sensor" using a speaker provided to the electronic device.

After that, if the user's fingerprint is received from the fingerprint sensor, the electronic device may determine whether input fingerprint data corresponds to registered fingerprint data. More specifically, the electronic device may determine validity of fingerprint data that determines whether the user's fingerprint data, registered in advance, corresponds to currently input fingerprint data.

Figure 14D:
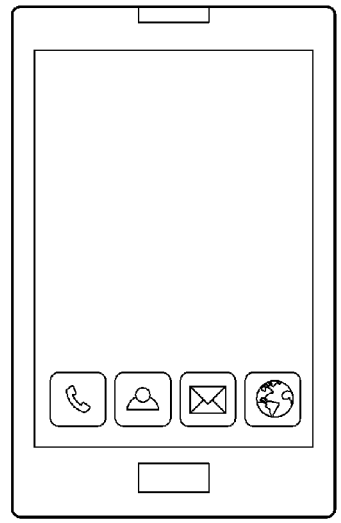

As illustrated in FIG. 14D, if validity of the input fingerprint data is accepted, the electronic device may release a lock and simultaneously switch the electronic device in the sleep state to the wake-up state.

FIGS. 15A to 15D are views illustrating an embodiment of executing an application whose security is low when a next ranking validity of input fingerprint data is accepted in an electronic device according to the present invention. First, the electronic device may detect an operation defined in advance in the sleep state, and then receive a user's fingerprint from a fingerprint sensor 1501 provided to a set region.

Figure 15A:
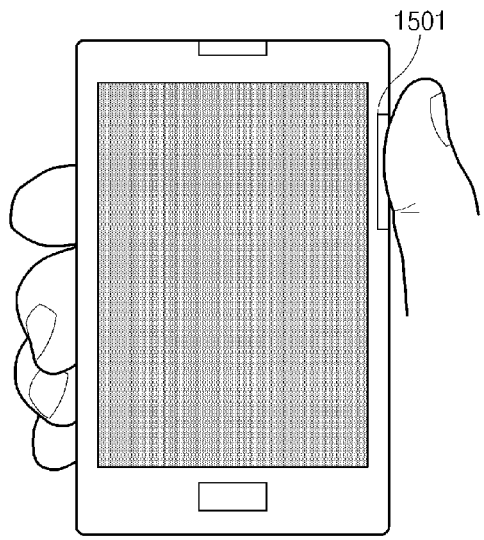
FIGS. 15A to 15D illustrate an electronic device executing at least one application whose security is set low if a next ranking validity condition of fingerprint data is satisfied according to an embodiment of the present invention.

For example, as illustrated in FIG. 15A, in a case of where the electronic device has a grip sensor on the left/right sides of the electronic device in order to receive a specified operation from a user, the specified operation may be an operation of a user's grip.

In the above example, the electronic device may detect an operation defined in advance that a user will input a fingerprint using the grip sensor. More specifically, the electronic device may sense a fingerprint from the user only when detecting the operation of the user's grip before receiving a fingerprint from the user.

After that, the electronic device may receive the user's fingerprint using a fingerprint sensor 1501. For example, in a case where the fingerprint sensor 1501 that may receive the fingerprint of the user's thumb is provided to the set region of the left side of the electronic device, the electronic device may receive the fingerprint of the user's thumb from the fingerprint sensor 1501 if the grip operation is detected.

After that, the electronic device may determine whether input fingerprint data corresponds to registered fingerprint data. More specifically, the electronic device may determine validity of fingerprint data that determines whether the user's fingerprint data, registered in advance, corresponds to currently input fingerprint data.

After that, if the validity of the input fingerprint data is not accepted, the electronic device may determine a next ranking validity of the fingerprint data. More specifically, if that validity of fingerprint data input from the fingerprint sensor 1501 is not accepted, the electronic device may determine that the matching degree between the input fingerprint data and the registered fingerprint data is equal to or greater than a set second reference value.

For example, the electronic device may convert the matching degree to a set numerical value, and then determine whether the converted value is equal to or greater than the set second reference value.

For example, in a case where input fingerprint data does not correspond to the registered fingerprint data as a result of determination of the validity of the input fingerprint data, and the electronic device may determine a next ranking validity of the input fingerprint data.

For example, in a case where a set second reference value for accepting a next ranking validity of fingerprint data is 80 percent, matching degree between the input fingerprint data and the registered fingerprint data may be 85 percent.

Figure 15B:
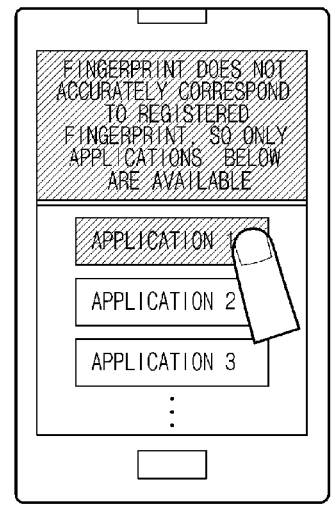

In the above example, though the input fingerprint data does not correspond to the registered fingerprint data, if the matching degree exceeds 80 percent which is the second reference value set for acceptance of the next ranking validity, the electronic device may execute an application whose security is low. For example, as illustrated in FIG. 15B, the electronic device may display respective icons that may execute an application whose security is low together with a notice message such as "it does not accurately correspond to a set fingerprint (registered fingerprint), so only applications below are executable" on the touchscreen.

Figure 15C:
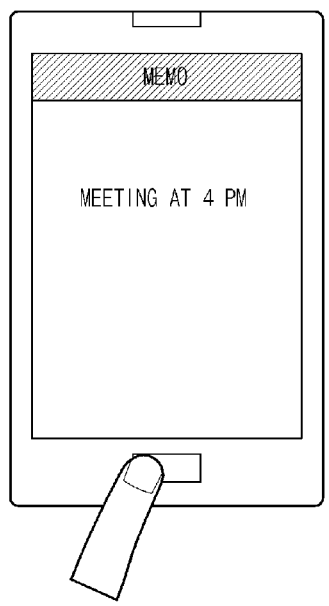

After that, when one of the displayed icons is selected, the electronic device may execute the selected icon. For example, as illustrated in FIGS. 15B and 15C, if a first application is an application that may write down a memo, the electronic device may receive a memo such as "meeting at 4 pm".

Here, an application whose security is low may be an application less related to a user's personal privacy such as a camera application that may execute a camera, a memo application that may write a memo, a weather-related application that may search weather, etc.

Figure 15D:
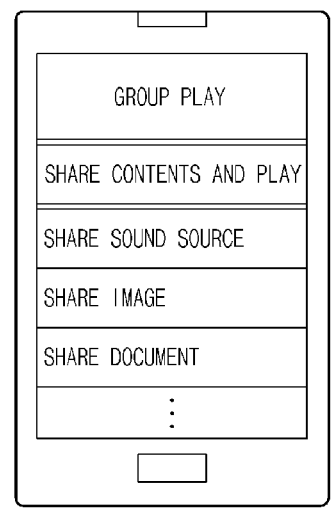

After that, if accurate fingerprint data is received from a user again, the electronic device may share a result of an application whose security is low with other users. For example, as illustrated in FIG. 15D, if the electronic device determines that fingerprint data input again from the user afterward accurately corresponds to registered fingerprint data, the electronic device may share a memo written using a "group play" function, etc. with other users.

That is, the electronic device according to the present invention may determine whether the matching degree is greater than or equal to a set second reference value even though the input fingerprint data does not accurately correspond to registered fingerprint data, and the electronic device may execute an application whose security is low, thereby improving a user's personal privacy and simultaneously improving a user's convenience.

FIGS. 16A to 16D are views illustrating another embodiment of executing a set application whose security is low when a next ranking validity of input fingerprint data is accepted in an electronic device according to the present invention.

Figure 16A:
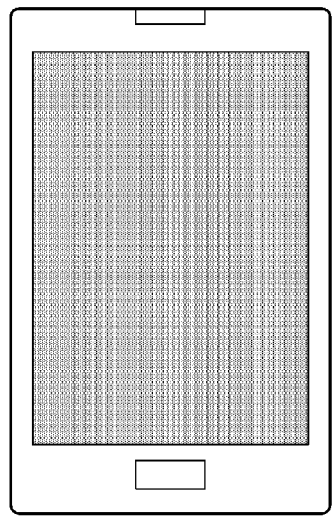
FIGS. 16A to 16D illustrate an electronic device executing at least one application whose security is set low if a next ranking validity condition of fingerprint data is satisfied according to another embodiment of the present invention.

First, as illustrated in FIG. 16A, the electronic device may detect an operation defined in advance in a sleep state, and then receive a user's fingerprint from a fingerprint sensor provided to a set region.

After that, the electronic device may determine whether input fingerprint data corresponds to registered fingerprint data. More specifically, the electronic device may determine validity of fingerprint data that determines whether a user's fingerprint data, registered in advance, corresponds to currently input fingerprint data.

After that, when determining that validity of the input fingerprint data is not accepted, the electronic device may determine the next ranking validity of the fingerprint data. The electronic device may determine whether matching degree between the input fingerprint data and the registered fingerprint data is equal to or greater than a set second reference value. For example, when determining that validity of input fingerprint data is not accepted, the electronic device may convert the matching degree to a set numerical value, and then determine whether the converted value is equal to or greater than a set second reference value.

For example, in a case where input fingerprint data has not accurately corresponded to registered fingerprint data as a result of determination of the validity of the input fingerprint data, and the electronic device may determine a next ranking validity of the input fingerprint. For example, in a case where a second reference value set for accepting a next ranking validity of fingerprint data is 75 percent, the matching degree between the input fingerprint data and the registered fingerprint data may be 80 percent.

Figure 16B:
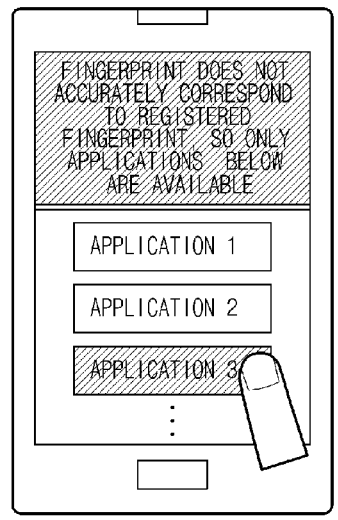

In the above example, though the input fingerprint data does not accurately correspond to the registered fingerprint data, if the matching degree exceeds 75 percent which is the set second reference value for acceptance of the next ranking validity, the electronic device may execute a set application whose security is low. For example, as illustrated in FIG. 16B, the electronic device may display respective icons that may execute an application whose security is low together with a notice message such as "fingerprint does not accurately correspond to registered fingerprint, so only applications below are executable" on the touchscreen of the electronic device.

Figure 16C:
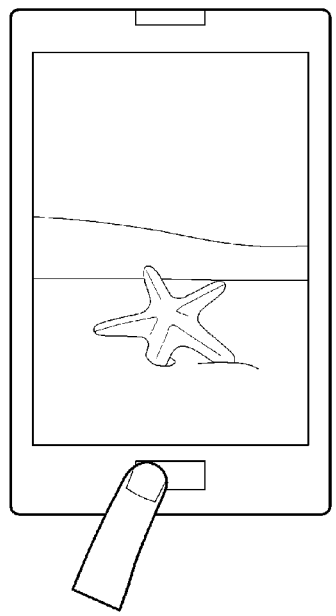

After that, when one of displayed icons is selected, the electronic device may execute the selected icon. For example, as illustrated in FIGS. 16B and 16C, if a third application is an application that may execute a camera, the electronic device may shoot an object.

Figure 16D:
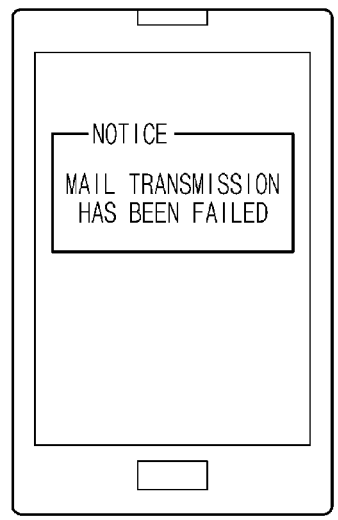

After that, if the electronic device receives accurate fingerprint data from a user again, the electronic device may share a result, etc. of an application whose security is low with other users. For example, as illustrated in FIG. 16D, when the electronic device determines that fingerprint data input again from the user afterward accurately corresponds to registered fingerprint data, the electronic device may share a shot predetermined object with other users.

That is, the electronic device according to the present invention allows an operation to be performed even in the case where a fingerprint is not accurately recognized due to an internal defect of the electronic device or a foreign substance put on a user's fingerprint. In the case where a next ranking validity of input fingerprint data is accepted, the electronic device allows an application whose security is low to be executed to improve a user's convenience.

Figure 17A:
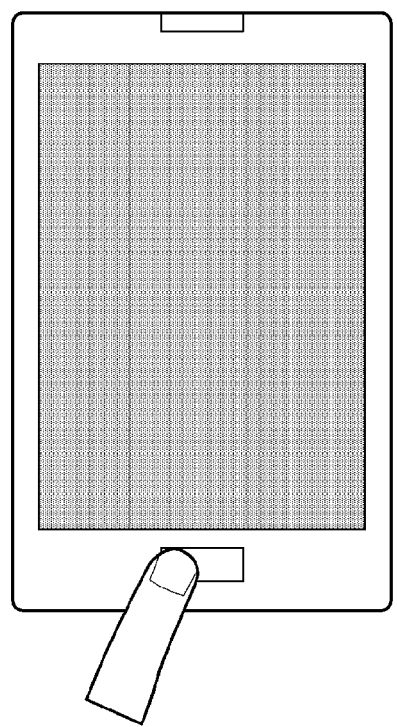
FIGS. 17A to 17B illustrate an electronic device displaying a user's contact information if validity condition of fingerprint data is not satisfied by a set number of times or more according to an embodiment of the present invention.
Figure 17B:
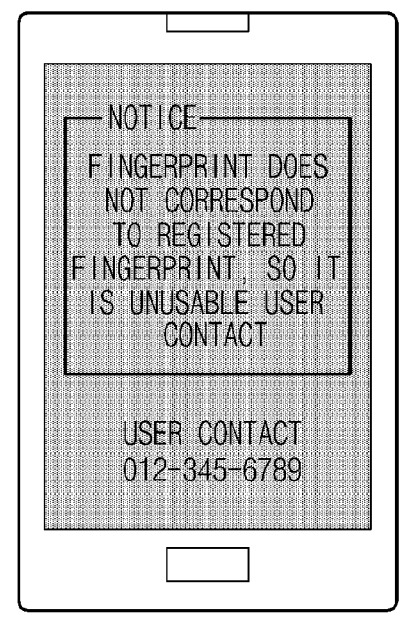

FIGS. 17A to 17B are views illustrating an embodiment of displaying a user's contact information when determining that validity of input fingerprint data is not accepted by a set number of times or more in an electronic device according to the present invention.

First, as illustrated in FIG. 17A, the electronic device may detect an operation defined in advance in the sleep state, and then receive a user's fingerprint from a fingerprint sensor provided to a set region.

After that, the electronic device may determine whether the input fingerprint data corresponds to the registered fingerprint data. More specifically, the electronic device may determine validity of input fingerprint data that determines whether a user's fingerprint data, to registered in advance, corresponds to currently input fingerprint data.

After that, in the case where the electronic device determines that validity of input fingerprint data is not accepted, the electronic device may determine a next ranking validity of the input fingerprint data.

The electronic device may determine whether the matching degree between the input fingerprint data and the registered fingerprint data is equal to or greater than a set second reference value. For example, in the case where the electronic device determines that validity of fingerprint data input from a fingerprint sensor is not accepted, the electronic device may convert the matching degree to a set numerical value, and then determine whether the converted value is equal to or greater than a set second reference value.

For example, in a case where fingerprint data does not accurately correspond to registered fingerprint data as a result of determination of validity of the input fingerprint data in an electronic device, and a next ranking validity of the input fingerprint data is not accepted by three times which is a set number of times, as illustrated in FIG. 17B, the electronic device may display set contact information together with a notice message saying unusable on the touchscreen of the electronic device. More specifically, the electronic device may display a user's contact information such as "012-345-6789" which is set contact information together with a notice message such as "fingerprint does not correspond to the set fingerprint (registered fingerprint), so it is unusable" on the touchscreen.

Also, although not shown in FIGS. 17A and 17B, in the case where validity of input data is not accepted in the electronic device, the electronic device may receive a set password, pattern, etc. manually to release a lock.

An embodiment of the present invention may provide an apparatus and a method for reducing an economic load and a load for personal information leakage caused by a loss of a user's electronic device by displaying the user's emergency contact information set in advance, in case of receiving a fingerprint from other users and detecting an erroneous input by a set number of times or more when the electronic device is lost.

Figure 18:
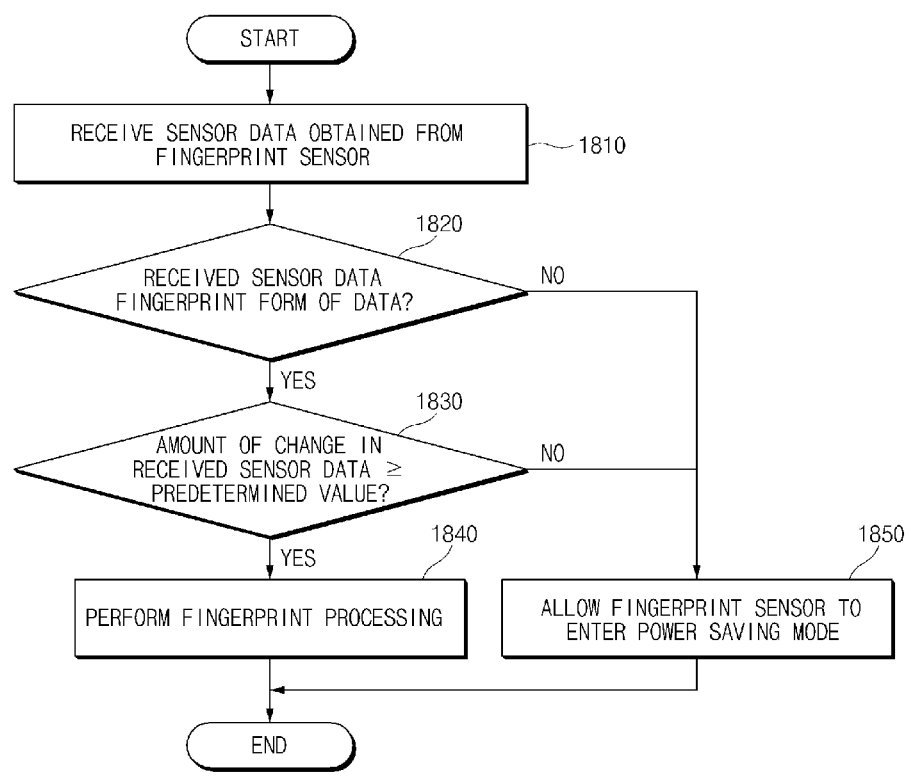
FIG. 18 is a flowchart illustrating a method of controlling power supply for a fingerprint sensor according to an embodiment of the present invention.

FIG. 18 is a flowchart illustrating a method of controlling power supply for a fingerprint sensor according to an embodiment of the present invention. The flowchart shown in FIG. 18 includes operations processed chronologically in the fingerprint processing device 100 shown in FIGS. 6 and 3. Accordingly, even if contents are omitted hereinafter, contents describing the fingerprint processing device 100 shown in FIGS. 2 and 6 may be applied to the flowchart of FIG. 18.

In operation 1710, the fingerprint processing device 100 receives the sensor data obtained from the fingerprint sensor 200. The sensor data may have a signal form as the data obtained according to a sensing result of the fingerprint sensor 200.

In operation 1720, the sensor data determination unit 120 determines whether the received sensor data is a fingerprint form of data. The sensor data determination unit 120 determines whether sensor data is a fingerprint form of data by using an image reconfigured by the image processing unit 110 or a feature extracted from the reconfigured image. Also, the sensor data determination unit 120 determines whether sensor data is a fingerprint form of data by using the sensor data itself.

For example, the sensor data determination unit 120 determines that the received sensor data is not a fingerprint form of data if there is no form of ridges and valleys in the received sensor data or if an interval between ridges or a width between a ridge and a valley is greater than or equal to a predetermined value.

However, the present invention is not limited thereto and the sensor data determination unit 120 may use various methods of determining a fingerprint form of data. If the received sensor data is a fingerprint form of data on the basis of a determination result of the sensor data determination unit 120, the method proceeds to operation 1830, and if the received sensor is not a fingerprint form of data, the method proceeds to operation 1850.

If it is unclear whether the received sensor data is a fingerprint form of data on the basis of a determination result of the sensor data determination unit 120, since there is a need to further confirm whether the sensor data is a pseudo input, the sensor data determination unit 120 estimates that the received sensor data is a fingerprint form of data.

In operation 1830, the sensor data determination unit 120 determines whether the amount of change in the sensor data received over a predetermined time is greater than or equal to a predetermined value. The sensor data determination unit 120 determines whether the amount of change in the received sensor data is greater than or equal to a predetermined value by using sensor data, an image reconfigured by the image processing unit 110 or a feature extracted from the reconfigured image.

After the predetermined time, further fingerprint authentication may not be performed and thus the predetermined time may be set differently according to whether the fingerprint sensor 200 is a touch method or a swipe method. The predetermined value may be determined by a value having a degree of almost no change.

If the amount of change in the received sensor data is greater than or equal to a predetermined value on the basis of a determination result of the sensor data determination unit 120, the method proceeds to operation 1840, and if the amount of change in the received sensor data is less than the predetermined value, the method proceeds to operation 1850.

In operation 1840, the fingerprint authentication unit 130 performs fingerprint processing. The fingerprint authentication unit 130 determines whether a fingerprint corresponding to a fingerprint of sensor data is registered through fingerprint processing so as to perform a fingerprint authentication.

In operation 1850, the fingerprint processing device 100 allows the fingerprint sensor 200 to enter a power saving mode. If sensor data is determined as a pseudo input according to a determination result of the sensor data determination unit 120, the fingerprint processing device 100 outputs a control signal to the power control unit 610 in order to allow the fingerprint sensor 200 to be in a power saving mode.

According to this embodiment, the fingerprint processing device 100 determines whether the sensor data is a pseudo input on the basis of whether the received sensor data is a fingerprint form of data or whether the amount of change in the received sensor data is greater than or equal to a predetermined value.

In this embodiment, the sensor data determination unit 120 determines whether the received sensor data is a fingerprint form of data and then determines whether the amount of change in the received sensor data is greater than or equal to a predetermined value. However, according to another embodiment, the sensor data determination unit 120 determines whether the amount of change in the received sensor data is greater than or equal to a predetermined value and then determines whether the received sensor data is a fingerprint form of data.

Figure 19:
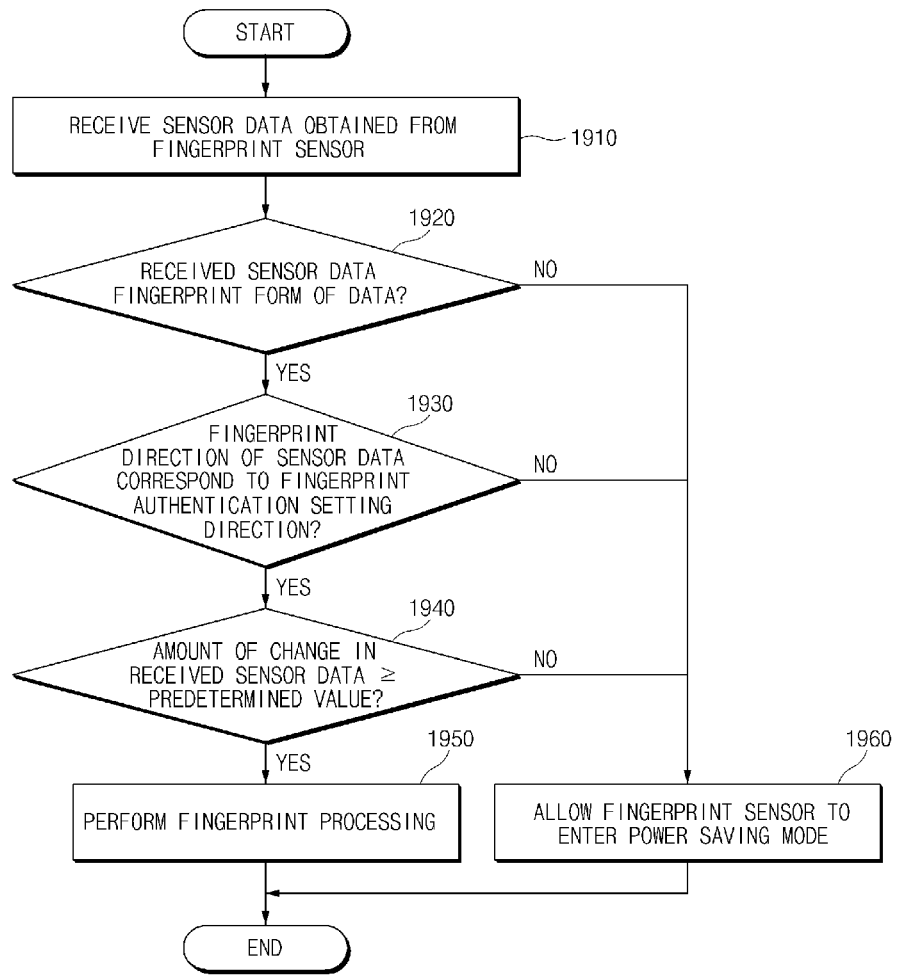
FIG. 19 is a flowchart illustrating a method of controlling power supply for a fingerprint sensor according to another embodiment of the present invention.

FIG. 19 is a flowchart illustrating a method of controlling power supply for a fingerprint sensor according to another embodiment of the present invention.

In operation 1910, the fingerprint processing device 100 receives the sensor data obtained from the fingerprint sensor 200.

In operation 1920, the sensor data determination unit 120 determines whether the received sensor data is a fingerprint form of data. If the received sensor data is a fingerprint form of data on the basis of a determination result of the sensor data determination unit 120, the method proceeds to operation 1930, and if the received sensor data is not a fingerprint form of data, the method proceeds to operation 1960.

If it is unclear whether the received sensor data is a fingerprint form of data on the basis of a determination result of the sensor data determination unit 120, the sensor data determination unit 120 estimates that the received sensor data is a fingerprint form of data.

In operation 1930, the fingerprint processing device 100 determines whether a fingerprint direction of the received sensor data corresponds to a fingerprint authentication setting direction. The sensor data determination unit 120 determines whether the fingerprint direction of the received sensor data corresponds to the fingerprint authentication setting direction by using an image reconfigured by the image processing unit 110 or a feature extracted from the reconfigured image. Also, the sensor data determination unit 120 may use the sensor data itself.

For example, the sensor data determination unit 120 may determine that the received sensor data is not a fingerprint form of data if a direction that the ridges and valleys of a fingerprint in received sensor data extend is not in a horizontal direction set to a fingerprint authentication direction by a predetermined angle. However, the present invention is not limited thereto and the sensor data determination unit 120 may use various methods of determining a fingerprint form of data.

On the basis of a determination result of the sensor data determination unit 120, if the fingerprint direction of the received sensor data corresponds to the fingerprint authentication setting direction, the method proceeds to operation 1940, and if the fingerprint direction of the received sensor data does not correspond to the fingerprint authentication setting direction, the method proceeds to operation 1960.

In operation 1940, the fingerprint processing device 100 determines whether the amount of change in the received sensor data is greater than or equal to a predetermined value. If the amount of change in the received sensor data is greater than or equal to a predetermined value on the basis of a determination result of the sensor data determination unit 120, the method proceeds to operation 1950, and if the received sensor data is less than the predetermined value, the method proceeds to operation 1960.

In operation 1950, the fingerprint authentication unit 130 performs fingerprint processing. The fingerprint authentication unit 130 determines whether a fingerprint corresponding to a fingerprint of sensor data is registered through fingerprint processing so as to perform fingerprint authentication.

In operation 1960, the fingerprint processing device 100 allows the fingerprint sensor 200 to enter a power saving mode.

According to this embodiment, the fingerprint processing device 100 determines whether sensor data is a pseudo input on the basis of whether the received sensor data is a fingerprint form of data, whether a fingerprint direction of the received sensor data corresponds to a fingerprint authentication setting direction, or whether the amount of change in the received sensor data is greater than or equal to a predetermined value.

According to this embodiment, the fingerprint processing device 100 sequentially determines whether the received sensor data is a fingerprint form of data, whether a fingerprint direction of the received sensor data corresponds to a fingerprint authentication setting direction, and whether the amount of change in the received sensor data is greater than or equal to a predetermined value. According to another embodiment of the present invention, the order in which the sensor data determination unit 120 determines whether received sensor data is a pseudo input may vary.

For example, the sensor data determination unit 120 determines whether sensor data is a pseudo input in the fastest determination order. It is assumed that determining whether the amount of change in the received sensor data is greater than or equal to a predetermined value uses the sensor data itself without image processing of the sensor data. It is assumed that determining whether the received sensor data is a fingerprint form of data uses a reconfigured image of the sensor data and determining whether a fingerprint direction of the received sensor data corresponds to a fingerprint authentication setting direction uses a feature extracted from a reconfigured image. In this case, the sensor data determination unit 120 makes a determination in an order according to whether an image is processed and image processing amount. That is, the sensor data determination unit 120 sequentially determines whether the amount of change in the received sensor data is greater than or equal to a predetermined value, whether the received sensor data is a fingerprint form of data, and whether a fingerprint direction of the received sensor data corresponds to a fingerprint authentication setting direction.

Figure 20:
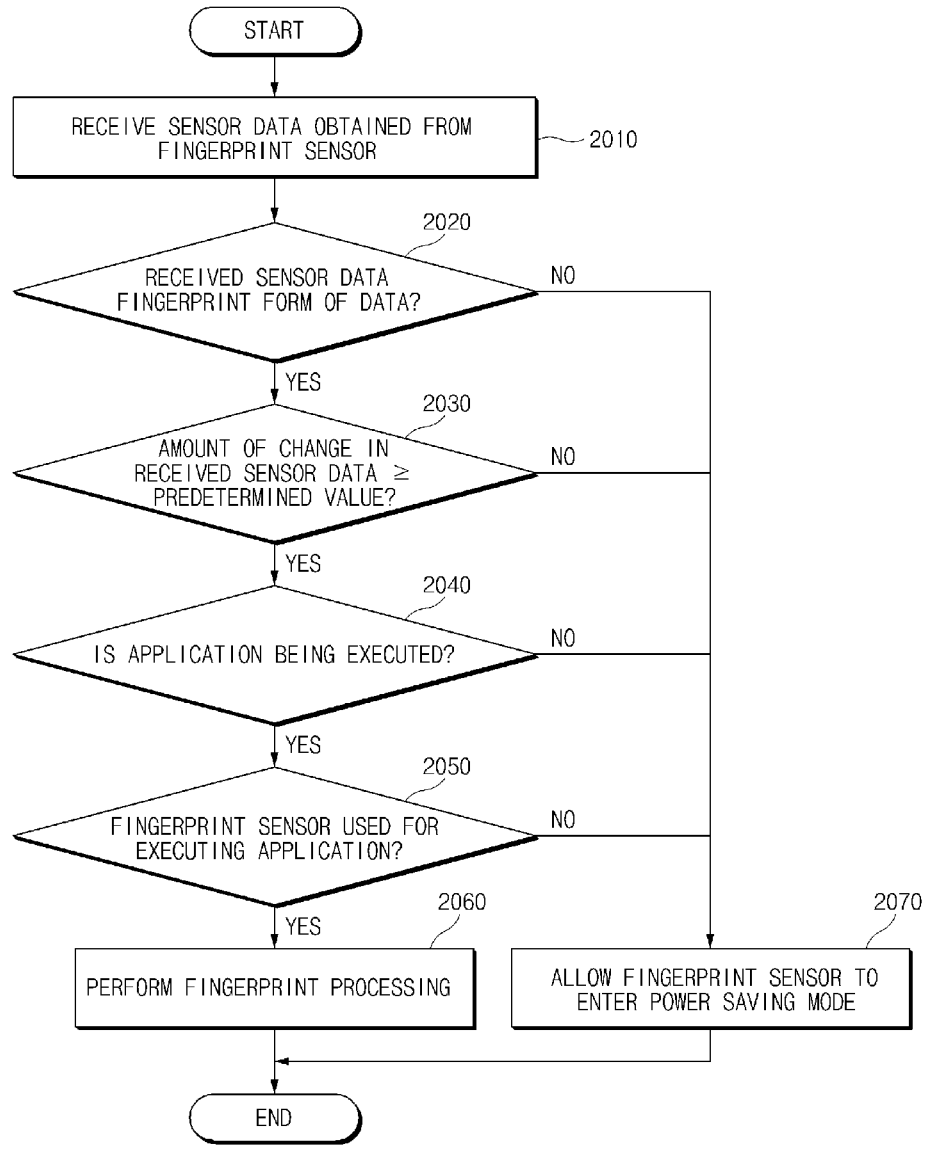
FIG. 20 is a flowchart illustrating a method of controlling power supply for a fingerprint sensor according to another embodiment of the present invention.

FIG. 20 is a flowchart illustrating a method of controlling power supply for a fingerprint sensor according to another embodiment of the present invention.

In operation 2010, the fingerprint processing device 100 receives the sensor data obtained from the fingerprint sensor 200.

In operation 2020, the sensor data determination unit 120 determines whether the received sensor data is a fingerprint form of data. If the received sensor data is a fingerprint form of data on the basis of a determination result of the sensor data determination unit 120, the method proceeds to operation 2030, and if the received sensor data is not a fingerprint form of data, the method proceeds to operation 2070.

If it is unclear whether the received sensor data is a fingerprint form of data on the basis of a determination result of the sensor data determination unit 120, the sensor data determination unit 120 estimates that the received sensor data is a fingerprint form of data.

In operation 2030, the fingerprint processing device 100 determines whether the amount of change in the received sensor data is greater than or equal to a predetermined value. If the amount of change in the received sensor data is greater than or equal to a predetermined value on the basis of a determination result of the sensor data determination unit 120, the method proceeds to operation 2040, and if the received sensor data is less than the predetermined value, the method proceeds to operation 2070.

In operation 2040, the sensor data determination unit 120 determines whether there is an application being executed from the app management unit 631. The sensor data determination unit 120 requests the confirmation of whether there is an application being executed from the app management unit 631. Upon receiving the request from the fingerprint processing device 100, the app management unit 631 confirms whether there is an application currently being executed and transmits a confirmation result to the fingerprint processing device 100.

If there is an application being executed on the basis of a confirmation result from the app management unit 631, the sensor data determination unit 120 proceeds to operation 2050 and if there is no application being executed, proceeds to operation 2070.

In operation 2050, the sensor data determination unit 120 determines whether the fingerprint sensor 200 is used for executing the application being executed from the app management unit 631. The sensor data determination unit 120 requests a confirmation of whether the fingerprint sensor 200 is used for executing the application from the app management unit 631. Upon receiving the request from the fingerprint processing device 100, the app management unit 631 confirms whether the fingerprint sensor 200 is used for executing the application and transmits a confirmation result to the fingerprint processing device 100.

If the fingerprint sensor 200 is used for executing the application on the basis of a confirmation result from the app management unit 631, the sensor data determination unit 120 proceeds to operation 2060 and if there is no application being executed, proceeds to operation 2070.

In operation 2060, the fingerprint authentication unit 130 performs fingerprint processing.

In operation 2070, the fingerprint processing device 100 allows the fingerprint sensor 200 to enter a power saving mode.

According to this embodiment, the fingerprint processing device 100 determines whether sensor data is a pseudo input on the basis of whether the received sensor data is a fingerprint form of data, whether the amount of change in the received sensor data is greater than or equal to a predetermined value, and whether the fingerprint sensor 200 is used for executing the application being executed.

According to this embodiment, the fingerprint processing device 100 sequentially determines whether the received sensor data is a fingerprint form of data, whether the amount of change in the received sensor data is greater than or equal to a predetermined value, and whether the fingerprint sensor 200 is used for executing the application being executed. However, according to another embodiment of the present invention, the order in which the sensor data determination unit 120 determines whether received sensor data is a pseudo input may vary.

Figure 21:
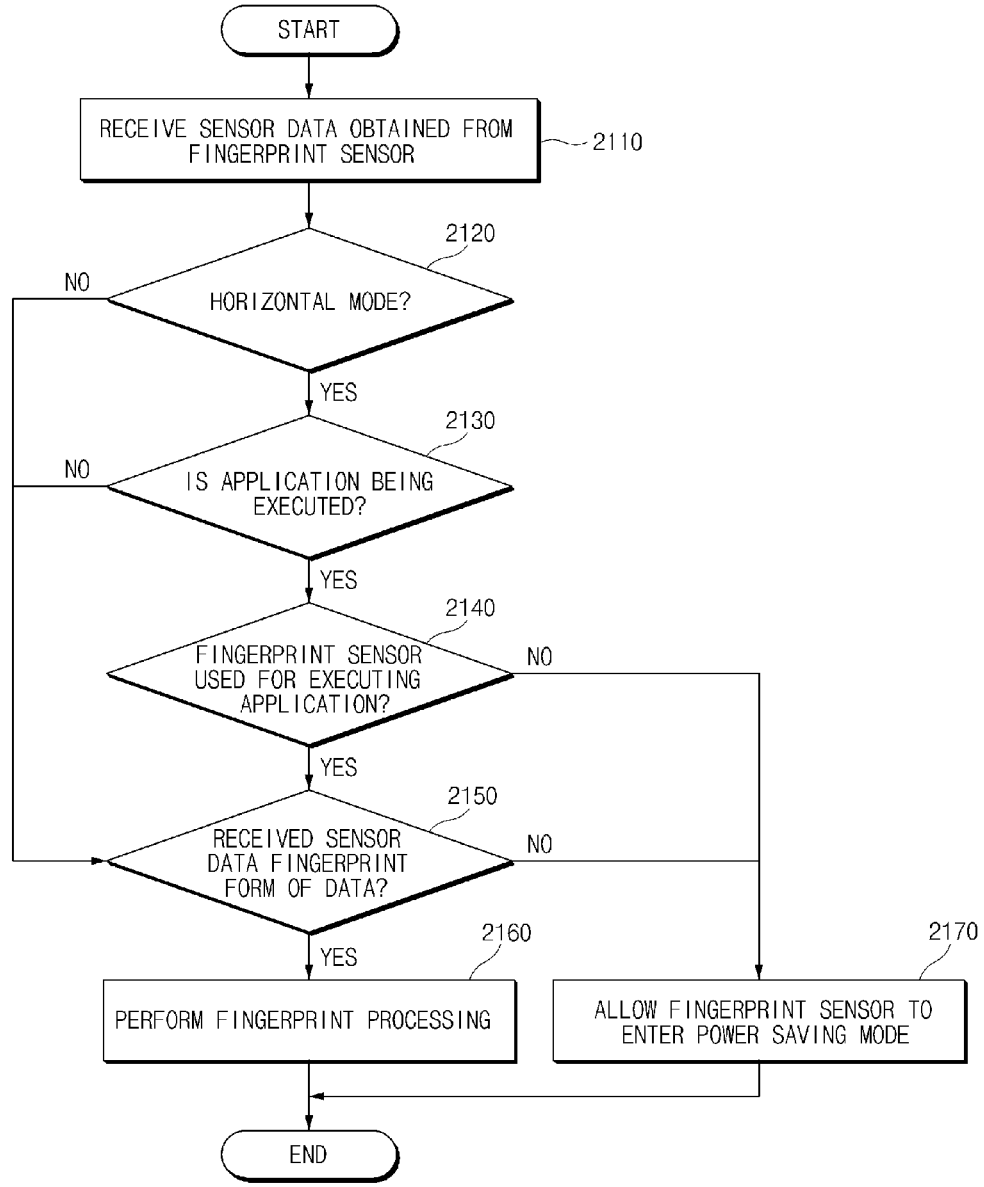
FIG. 21 is a flowchart illustrating a method of controlling power supply for a fingerprint sensor according to another embodiment of the present invention.

FIG. 21 is a flowchart illustrating a method of controlling power supply for a fingerprint sensor according to another embodiment of the present invention.

In operation 2110, the fingerprint processing device 100 receives the sensor data obtained from the fingerprint sensor 200.

In operation 2120, the sensor data determination unit 120 determines whether a use mode of the electronic device 600 is a horizontal mode from the control unit 630. The control unit 630 determines whether the use mode of a terminal equipped with the fingerprint sensor 200 is the horizontal mode by using the acceleration sensor 650 or the magnetic sensor 660. The sensor data determination unit 120 requests a confirmation of whether the use mode of the electronic device 600 is the horizontal mode from the control unit 630. Upon receiving the request from the fingerprint processing device 100, the control unit 630 confirms whether the use mode of the electronic device 600 is the horizontal mode and transmits a confirmation result to the fingerprint processing device 100.

For example, no fingerprint sensor 200 is required in the case of an application executed in a horizontal mode, for example, game play or video play application. Accordingly, while an application executed in a horizontal mode is being executed, the fingerprint processing device 100 allows the fingerprint sensor 200 to enter a power saving mode.

If it is determined that the use mode of the electronic device 600 is the horizontal mode on the basis of the confirmation result from the control unit 630, the sensor data determination unit 120 proceeds to operation 2130 and if it is determined that the use mode of the electronic device 600 is not the horizontal mode, proceeds to step 950.

In operation 2130, the sensor data determination unit 120 determines whether there is an application being executed from the app management unit 631.

If there is an application being executed on the basis of a confirmation result from the app management unit 631, the sensor data determination unit 120 proceeds to operation 2140 and if there is no application being executed, proceeds to operation 2150. The fingerprint processing device 100 determines whether there is an application being executed.

In operation 2140, the sensor data determination unit 120 determines whether the fingerprint sensor 200 is used for executing the application being executed from the app management unit 631. If the fingerprint sensor 200 is used for executing the application being executed on the basis of a confirmation result from the app management unit 631, the sensor data determination unit 120 proceeds to operation 2150 and if there is no application being executed, proceeds to operation 2170.

In operation 2150, the sensor data determination unit 120 determines whether the received sensor data is a fingerprint form of data. If the received sensor data is a fingerprint form of data on the basis of a determination result of the sensor data determination unit 120, the method proceeds to operation 2160, and if the received sensor is not a fingerprint form of data, the method proceeds to operation 2170.

If it is unclear whether the received sensor data is a fingerprint form of data on the basis of a determination result of the sensor data determination unit 120, the sensor data determination unit 120 estimates that the received sensor data is a fingerprint form of data.

In operation 2160, the fingerprint authentication unit 130 performs fingerprint processing.

In operation 2170, the fingerprint processing device 100 allows the fingerprint sensor 200 to enter a power saving mode.

According to this embodiment, the fingerprint processing device 100 determines whether a received application executed in a horizontal mode is being executed, whether the fingerprint sensor 200 is used for executing an application being executed, and whether sensor data is a fingerprint form of data.

According to another embodiment, the sensor data determination unit 120 may further determine whether the amount of change in the received sensor data is greater than or equal to a predetermined value or whether a fingerprint direction of the received sensor data corresponds to a fingerprint authentication setting direction.

Figure 22:
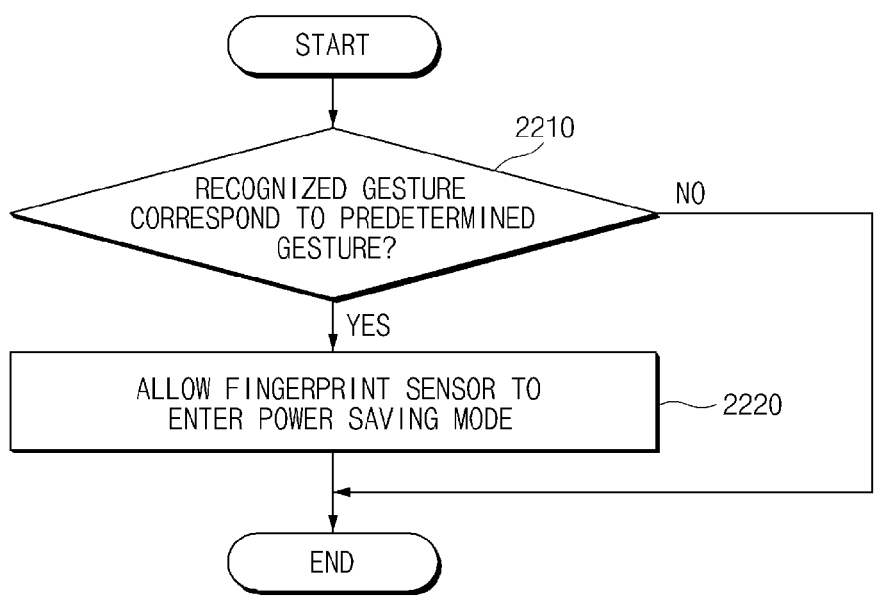
FIG. 22 is a flowchart illustrating a method of controlling power supply for a fingerprint sensor according to another embodiment of the present invention.

FIG. 22 is a flowchart illustrating a method of controlling power supply for a fingerprint sensor according to another embodiment of the present invention.

In operation 2210, the sensor data determination unit 120 determines whether a recognized gesture corresponds to a predetermined gesture from the gesture determination unit 633. On the basis of a signal inputted from the acceleration sensor 650, the magnetic sensor 660, or at least one sensor used for gesture recognition, the gesture determination unit 633 recognizes which gesture corresponds to the input signal and if the recognized gesture corresponds a predetermined gesture, outputs a control signal to the fingerprint processing device 100.

If the recognized gesture corresponds to a predetermined gesture on the basis of a confirmation result from the gesture determination unit 633, the sensor data determination unit 120 proceeds to operation 2220 and if the recognized gesture does not correspond to a predetermined gesture, terminates the method. That is, the sensor data determination unit 120 performs no operation.

In operation 2220, the fingerprint processing device 100 allows the fingerprint sensor 200 to enter a power saving mode.

According to this embodiment, upon determining that a predetermined gesture is recognized from the gesture determination unit 633, the fingerprint processing device 100 determines input sensor data as a pseudo input on which a fingerprint authentication does not need to be performed.

Figure 23:
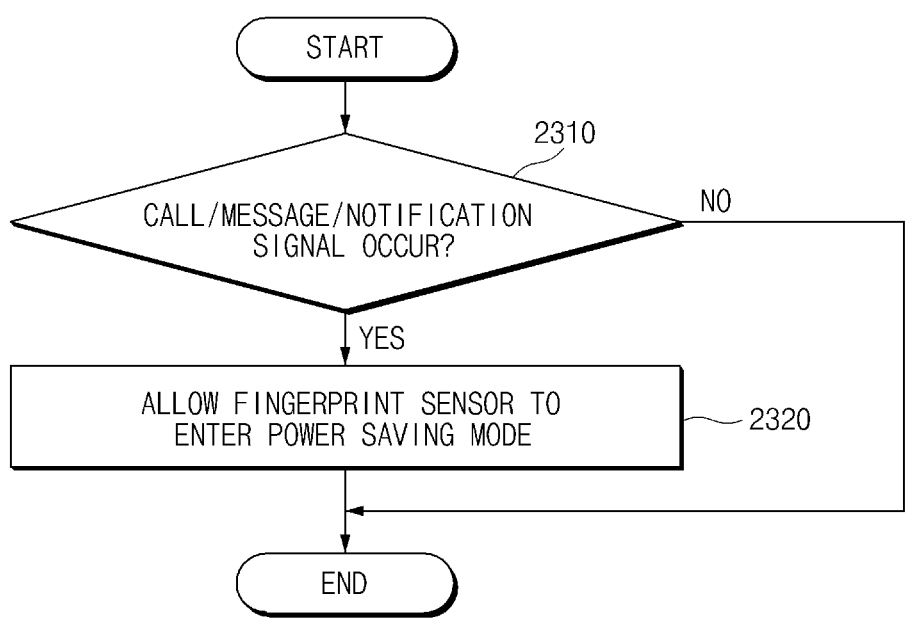
FIG. 23 is a flowchart illustrating a method of controlling power supply for a fingerprint sensor according to another embodiment of the present invention.

FIG. 23 is a flowchart illustrating a method of controlling a power supply for a fingerprint sensor according to another embodiment of the present invention.

In operation 2310, the sensor data determination unit 120 determines whether a call/message/notification signal occurs from the communication processing unit 632. The communication processing unit 632 processes the call/message/notification signal and provides a notification that the call/message/notification signal occurs to the fingerprint processing device 100.

If it is determined that the call/message/notification signal occurs on the basis of a confirmation result from the communication processing unit 632, the sensor data determination unit 120 proceeds to operation 2220 and if the call/message/notification signal does not occur, terminates the method and performs no operation.

In operation 2320, the fingerprint processing device 100 allows the fingerprint sensor 200 to enter a power saving mode and maintains the power saving mode of the fingerprint sensor 200.

According to an embodiment, in the case of an incoming/outgoing call, the sensor data determination unit 120 determines sensor data input while the incoming/outgoing call is maintained as a pseudo input. Accordingly, until the incoming/outgoing call is terminated, the fingerprint processing device 100 maintains the fingerprint sensor 200 to continuously be in a power saving mode.

Accordingly, even when there is an input to the fingerprint sensor 200 during a call, no fingerprint authentication is performed by allowing the fingerprint sensor 200 to enter a power saving mode. Therefore, unnecessary power consumption of the fingerprint sensor 200 may be reduced.

As described above, even when an input is provided to a fingerprint sensor, if it is a pseudo input not requiring fingerprint authentication, the fingerprint sensor enters a power saving mode without performing fingerprint processing, so that the power consumption of the fingerprint sensor may be effectively reduced. A fingerprint sensor monitors fingerprint input when detecting a specified operation, so that the fingerprint sensor may sense fingerprint input only if there is a user's intention of fingerprint input. Accordingly, the above embodiments of the present invention may prevent power consumption due to an unintended fingerprint input. Also, an additional processor performs user authentication on the basis of the input fingerprint data, thereby keeping other elements of the electronic device in a sleep state except for the additional processor.

Accordingly, by reducing unnecessary power consumption in an electronic device equipped with a fingerprint sensor, the usage time of a battery may be increased.

A method of controlling power supply for a fingerprint sensor according to various embodiments of the present invention may include receiving sensor data obtained from the fingerprint sensor, determining whether the received sensor data is a fingerprint form of data, if the received sensor data is the fingerprint form of data, determining if an amount of change in sensor data received over a predetermined time is greater than or equal to a predetermined value, and if the received sensor data is not the fingerprint form of data or if the received sensor data is the fingerprint form of data but an amount of change in the received sensor data is less than the predetermined value, allowing the fingerprint sensor to enter a power saving mode.

According to the various embodiments of the present invention, the method may further include if the sensor data is the fingerprint form of data, determining whether a fingerprint direction of the received sensor data corresponds to a direction set for fingerprint authentication, wherein allowing the fingerprint sensor to enter a power saving mode may include, if the sensor data is the fingerprint form of data but the fingerprint direction of the received sensor does not correspond to the direction set for fingerprint authentication, allowing the fingerprint sensor to enter a power saving mode.

According to the various embodiments of the present invention, the method may further include if the sensor data is the fingerprint form of data, confirming whether there is an application being executed, and if there is the application being executed, confirming whether the fingerprint sensor is used for executing the application, wherein allowing the fingerprint sensor to enter a power saving mode may include, if the sensor data is the fingerprint form of data but there is no application being executed or if the fingerprint is not used for executing the application being executed, allowing the fingerprint sensor to enter a power saving mode.

According to the various embodiments of the present invention, the method may further include confirming whether a use mode of an electronic device equipped with the fingerprint sensor is a horizontal mode by using one of an acceleration sensor and a magnetic sensor, wherein confirming whether there is an application being executed may include, if the use mode of the electronic device is the horizontal mode, confirming that there is the application being executed.

According to the various embodiments of the present invention, the method may further include determining whether a recognized gesture corresponds to a predetermined gesture by using at least one sensor equipped in an electronic device including the fingerprint sensor, if the recognized gesture corresponds to the predetermined gesture, determining that a function not requiring a driving of the fingerprint sensor is being executed, and allowing the fingerprint sensor to enter a power saving mode.

According to the various embodiments of the present invention, the method may further include confirming whether a call/message/notification signal occurs in an electronic device including the fingerprint sensor, and if the call/message/notification signal occurs in the electronic device, allowing the fingerprint sensor to enter a power saving mode.

According to the various embodiments of the present invention, wherein allowing the fingerprint sensor to enter the power saving mode may include allowing a fingerprint processing device processing sensor data of the fingerprint sensor to enter a power saving mode in addition to the fingerprint sensor.

According to the various embodiments of the present invention, wherein determining whether the received sensor data is a fingerprint form of data may include reconfiguring the received sensor data as an image, and determining whether the sensor data is the fingerprint form of data by using the reconfigured image.

According to the various embodiments of the present invention, wherein determining whether the received sensor data is a fingerprint form of data may include reconfiguring the received sensor data as an image, extracting a feature from the reconfigured image, and determining whether the sensor data is the fingerprint form of data by using the extracted feature.

According to the various embodiments of the present invention, the method may further include if the sensor data is the fingerprint form of data and the amount of change in the received sensor data is greater than or equal to the predetermined value, performing a fingerprint processing operation for determining whether a fingerprint corresponding to a fingerprint from the sensor data is registered.

According to the various embodiments of the present invention, a computer-readable recording medium having a program recorded thereon, which, when executed by a computer, may implement a method of controlling power supply for a fingerprint sensor, and the method may include receiving sensor data obtained from the fingerprint sensor, determining whether the received sensor data is a fingerprint form of data, if the received sensor data is the fingerprint form of data, determining if an amount of change in sensor data received over a predetermined time is greater than or equal to a predetermined value, and if the received sensor data is not the fingerprint form of data or if the received sensor data is the fingerprint form of data but an amount of change in the received sensor data is less than the predetermined value, allowing the fingerprint sensor to enter a power saving mode.

Figure 24A:
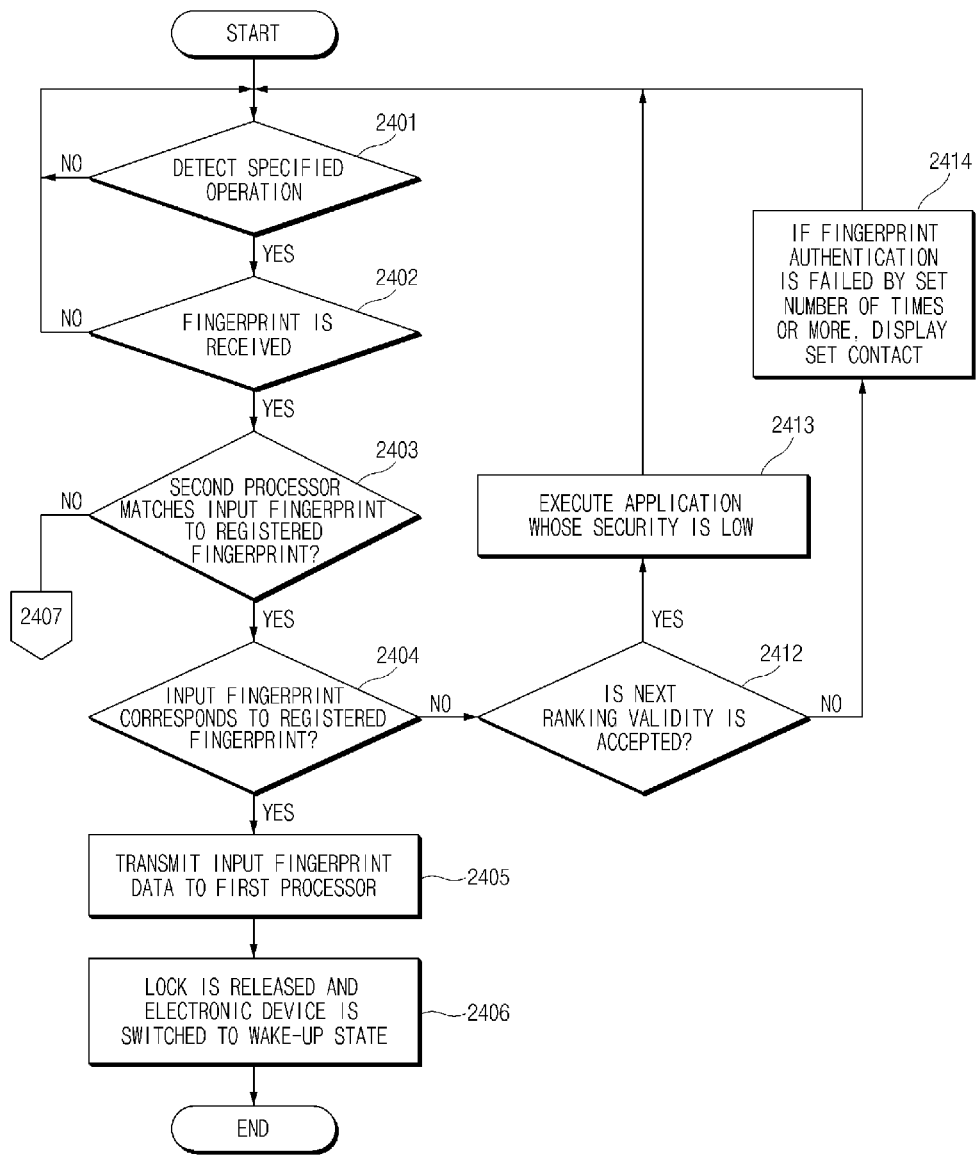
FIGS. 24A and 24B are flowcharts illustrating a sequence of operating an electronic device according to an embodiment of the present invention.
Figure 24B:
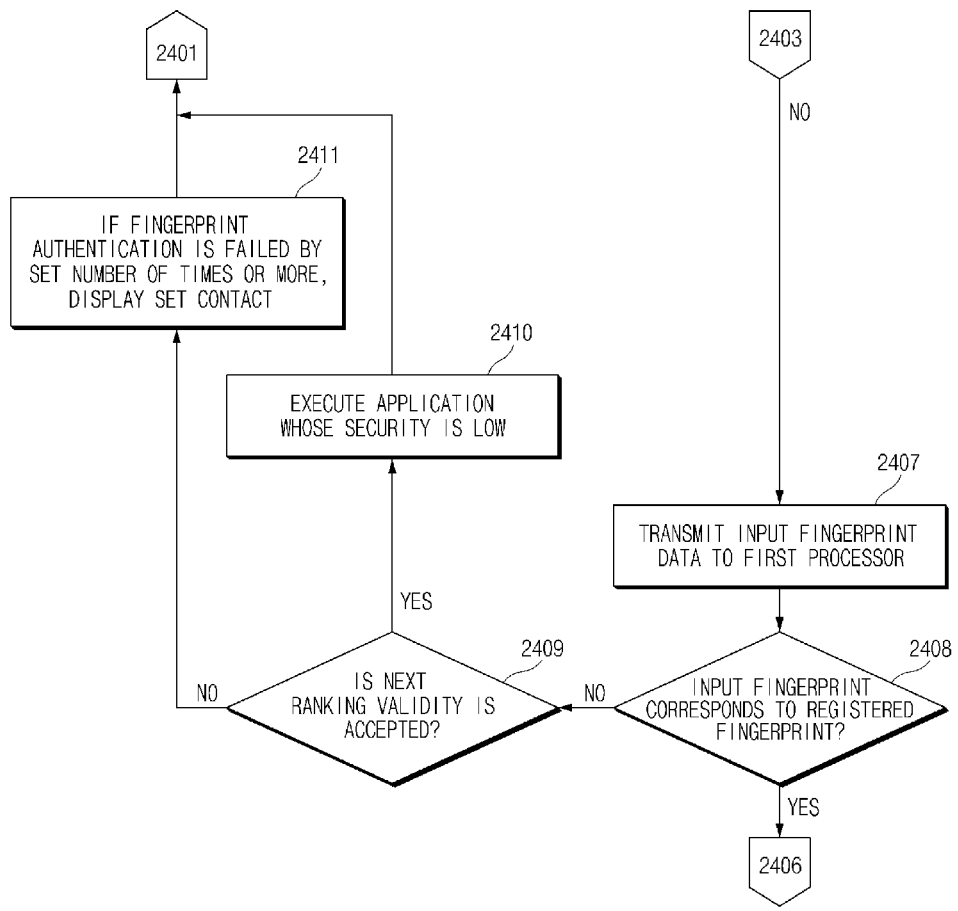

FIGS. 24A and 24B is a flowchart illustrating a sequence of operating an electronic device according to an embodiment of the present invention. First, as illustrated in FIGS. 24A and 24B, the electronic device may detect a specified operation in a sleep state (operation 2401). More specifically, while a first processor of the electronic device is in the sleep state and only a second processor operates in low power, the electronic device may detect the specified operation. For example, the electronic device may detect a set grip using a grip sensor, etc. provided to a set region of the electronic device. For another example, the electronic device may determine whether the electronic device moves by a set angle or more using an acceleration sensor, a gyro sensor, etc. For still another example, the electronic device may determine whether it has detected a set gesture using a gesture sensor, etc.

If the specified operation is detected in the above determination operation 2401, the electronic device may receive the fingerprint input monitoring a fingerprint (operation 2402). More specifically, if the specified operation is detected, the electronic device may determine whether it has received a fingerprint from a user via a fingerprint sensor provided to the set region.

If the fingerprint input is received in the above determination operation 2402, the electronic device may determine which processor matches the input fingerprint to a registered fingerprint (operation 2403). More specifically, the electronic device may determine whether to determine itself as to whether the input fingerprint corresponds to the registered fingerprint depending on current data processing capability of the second processor.

If the second processor is determined to match the input fingerprint to the registered fingerprint in the above determination operation 2403, the second processor may determine whether the input fingerprint corresponds to the registered fingerprint (operation 2404). More specifically, if the electronic device determines that the second processor has currently data processing capability, the second processor may determine whether the input fingerprint corresponds to the registered fingerprint.

If the input fingerprint corresponds to the registered fingerprint in the above determination operation 2404, the second processor may transmit input fingerprint data to the first processor (operation 2405). More specifically, if matching degree between the input fingerprint and the registered fingerprint is greater than first reference value, the input fingerprint corresponds to the registered fingerprint, and the validity of the input fingerprint is accepted.

After that, a lock of the electronic device may be released and the electronic device may be switched to a wake-up state. More specifically, the first processor may release a lock and simultaneously switch the electronic device to the wake-up state.

If a specified operation is not detected, or a fingerprint input is not received in the above determination operations 2401 and 2402, the electronic device may repeat the above determination operations 2401 and 2402.

If it is determined that the second processor matches the input fingerprint to the registered fingerprint in the above determination operation 2303, the second processor may transmit input fingerprint data to the first processor (operation 2407). More specifically, if it is determined that the second processor currently has an insufficient data processing capability for determination, the second processor may hand over the determination to the first processor.

After that, the electronic device may determine whether validity of the input fingerprint data is accepted (operation 2408). More specifically, the first processor may determine whether the input fingerprint data corresponds to the user's registered fingerprint data.

If the electronic device determines that the validity of the input fingerprint data is not accepted in the above determination operation 2408, the electronic device may determine a next ranking validity of the input fingerprint data (operation 2409). More specifically, the electronic device may determine whether the matching degree between the input fingerprint data and the registered fingerprint data is equal to or greater than a set second reference value in the above determination operation 2409. For example, if the electronic device determines that the validity of the input fingerprint data is not accepted, the electronic device may convert the matching degree to a set numerical value, and then determine whether the converted value is equal to or greater than a set second reference value.

If the electronic device determines that the next ranking validity of the input fingerprint data is accepted in the above determination operation 2409, the electronic device may execute an application whose security is low (operation 2410). Here, the application whose security is low may be an application less related to a user's personal privacy such as a camera application that may execute a camera, a memo application that may write a memo, a weather-related application that may retrieve weather, etc.

If the validity of the input fingerprint data is accepted in the electronic device in the above determination operation 2408, the electronic device may repeat the operation 2406 of releasing a lock and simultaneously switching to a wake-up state.

If the electronic device determines that next ranking validity of the input fingerprint data is not accepted in the above determination operation 2409, the electronic device may determine the validity of the input fingerprint data by a set number of times or more. If fingerprint authentication is failed (that is the validity and the next ranking validity of the input fingerprint data is not accepted) by a set number of times or more, the electronic device may display set contact (operation 2411). For example, the electronic device may display a user's contact information such as "012-345-6789" with a notice message such as "fingerprint does not correspond to the registered fingerprint, so it is unusable" on the touchscreen.

If the input fingerprint does not correspond to the registered fingerprint in the above determination operation 2404, the electronic device may determine the next ranking validity of the input fingerprint data (operation 2412). For example, if the validity of the input fingerprint data is not accepted, the electronic device may determine whether the matching degree between the input fingerprint data and the registered fingerprint data is greater than or equal to a second reference value. Alternatively, the electronic device may convert the matching degree to a set numerical value, and then determine whether the converted value is equal to or greater than a set second reference value.

If the next ranking validity of the fingerprint data is accepted in the above determination operation 2412, the electronic device may execute an application whose security is low (operation 2413). Here, an application whose security is low may be an application less related to a user's personal privacy such as a camera application that may execute a camera, a memo application that may write a memo, a weather-related application that may retrieve weather, etc.

If the electronic device determines that the next ranking validity of input fingerprint data is not accepted in the above determination operation 2412, the electronic device may determine the validity and the next ranking validity of the input fingerprint data by a set number of times or more. If fingerprint authentication is failed (that is the validity and the next ranking validity of the input fingerprint data is not accepted) by a set number of times or more, the electronic device may display set contact (operation 2414). For example, the electronic device may display set contact information with a notice message saying it is unusable on the touchscreen of the electronic device.

Figure 25:
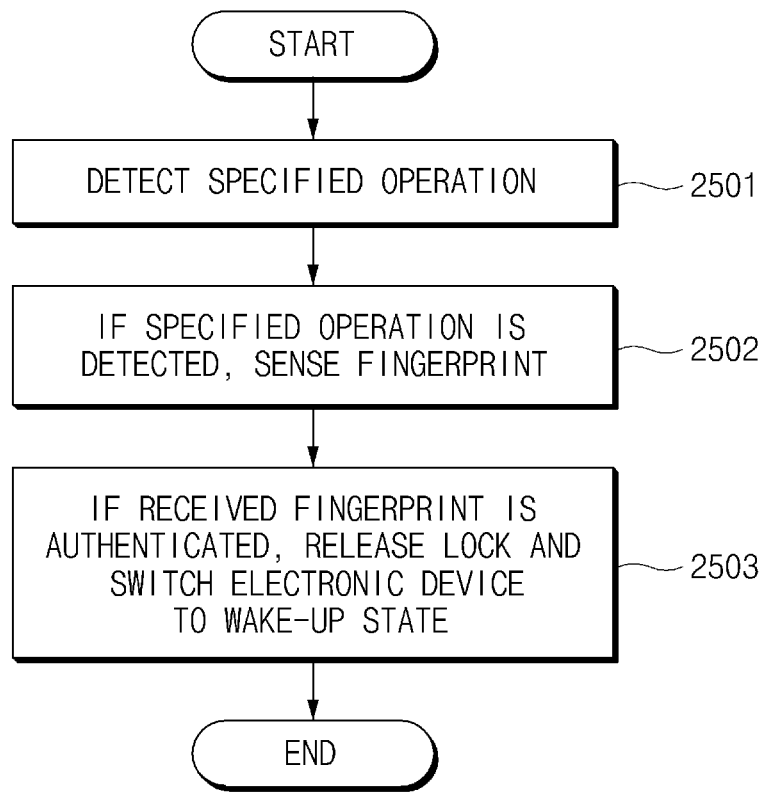
FIG. 25 is a flowchart illustrating a method of performing a fingerprint authentication at low power to release a lock of the electronic device according to an embodiment of the present invention.

FIG. 25 is a flowchart illustrating a method of an electronic device, for authenticating a fingerprint using low power to release a lock according to an embodiment of the present invention. First, as illustrated in FIG. 25, while a first processor of the electronic device is in a sleep state and a second processor operates in low power, the electronic device may detect a specified operation (operation 2501). More specifically, the electronic device may detect the specified operation in a sleep mode state of low power which is a state where a battery does not supply power to respective elements of the electronic device, but only the second processor operates. For example, the electronic device may detect a set grip using a grip sensor, etc. provided to a set region of the electronic device. For another example, the electronic device may detect a movement having a set angle or more using an acceleration sensor, a gyro sensor, etc. For still another example, the electronic device may detect a set gesture using a gesture sensor, etc.

After that, if the specified operation is detected, the electronic device may sense a fingerprint input (operation 2502). More specifically, when detecting the specified operation, the electronic device may receive a fingerprint from a user via a fingerprint sensor provided to a set region.

After that, if the received fingerprint is authenticated, the electronic device may release a lock and simultaneously switch the electronic device to a wake-up state (operation 2503). More specifically, if the first processor receives data of content that validity of input fingerprint data is accepted from the second processor, or the first processor accepts the validity of input fingerprint data, the electronic device may release lock and simultaneously switch the electronic device in a sleep state to a wake-up state.

According to various embodiments of the present invention, the electronic device may perform a user authentication process with low power using a fingerprint sensor during the sleep state, and if authenticating the user, the electronic device may release a lock of the electronic device simultaneously switching the state of the electronic device to a wake-up state, thereby improving a user's convenience.

According to various embodiments of the present invention, the electronic device may determine whether the matching degree is greater than or equal to a set second reference value even though the input fingerprint data does not accurately correspond to registered fingerprint data, and the electronic device may execute an application whose security is low, thereby improving a user's personal privacy and simultaneously improving a user's convenience.

According to various embodiments of the present invention, the electronic device may have a sensor that detects in advance a user's gesture who intends to input a fingerprint before receiving a fingerprint from the user, so that the electronic device may prevent an erroneous input and determine the user's accurate input intention in advance.

According to various embodiments of the present invention, the electronic device may reduce an economic load and a load for personal information leakage caused by a loss of a user's electronic device by displaying the user's emergency contact information set in advance, in case of receiving a fingerprint from other users and detecting an erroneous input by a set number of times or more when the electronic device is lost.

A method for operating an electronic device according to the various embodiments of the present invention may comprise determining whether a specified operation has been detected in a sleep mode, in case of detecting the specified operation, determining whether a registered fingerprint has been recognized, and in case of recognizing the registered fingerprint, switching to a wake-up state simultaneously with releasing a lock.

According to the various embodiments of the present invention, wherein determining whether the specified operation has been detected in the sleep mode may comprise determining whether the specified operation has been detected using at least one of an acceleration sensor, a gyro sensor, a geomagnetic sensor, a grip sensor, a fingerprint sensor, and a gesture sensor.

According to the various embodiments of the present invention, wherein in case of detecting the specified operation, determining whether the registered fingerprint has been recognized may comprises determining whether a fingerprint has been received using a fingerprint recognition sensor provided to a set region, in case of receiving the fingerprint, determining, at a second processor, whether to determine whether the received fingerprint is a registered fingerprint, and in the case where the second processor determines to determine whether the received fingerprint is the registered fingerprint, comparing, at the second processor, the received fingerprint with the registered fingerprint to determine validity of fingerprint data of the received fingerprint.

According to the various embodiments of the present invention, wherein comparing, at the second processor, the received fingerprint with the registered fingerprint to determine validity of fingerprint data of the received fingerprint may comprise determining validity of the fingerprint data while a first processor is in a sleep state and the second processor operates at low power.

According to the various embodiments of the present invention, the method may further comprise in the case where the second processor has determined not to determine whether the received fingerprint is the registered fingerprint, determining the received fingerprint and related fingerprint data are transmitted from the second processor to a first processor, determining, at the first processor, validity of the fingerprint data.

According to the various embodiments of the present invention, the method may further comprise in the case where the second processor has determined to determine whether the received fingerprint is the registered fingerprint, converting a threshold determining validity of the fingerprint data to a set numerical value, determining whether the converted validity of the fingerprint data is equal to or greater than a set reference value, and in the case where the validity of the converted fingerprint data is equal to or greater than the set reference value, executing at least one set application whose security is low.

According to the various embodiments of the present invention, the method may further comprise in the case where validity of the fingerprint data is not accepted, converting a threshold determining validity of the fingerprint data to a set numerical value, determining whether the converted validity of the fingerprint data is equal to or greater than a set reference value, and in the case where the converted validity of the fingerprint data is equal to or greater than the set reference value, executing at least one set application whose security is low.

According to the various embodiments of the present invention, the method may further comprise in the case where the second processor receives the fingerprint, displaying at least one of set contact information and a set phrase.

According to the various embodiments of the present invention, wherein in case of recognizing the registered fingerprint, the method may further comprise switching to the wake-up state simultaneously with releasing a lock further include determining validity of fingerprint data is accepted, determining data comprising content that the validity of the fingerprint data is accepted is transmitted from a second processor to a first processor, and releasing, at the first processor, set screen lock and simultaneously switching a power state from the sleep state to the wake-up state.

In this specification, a component expressed as a means for performing a specific function encompasses an arbitrary method performing a specific function, and such a component includes a combination of circuit elements performing a specific function, firmware combined with an appropriate circuit for executing software to perform a specific function, or an arbitrary form of software including microcode.

In this specification, referring to 'an embodiment' in the scope of the present invention and its various modifications means that the specific features, structures, and characteristics relating to this embodiment are included in at least one embodiment in the scope of the present invention. Accordingly, the expression 'an embodiment' and arbitrary other modifications disclosed in this entire specification do not necessarily refer to the same embodiment.

All embodiments and conditional examples disclosed in this specification are intentionally described to help those skilled in the art to understand the principles and concepts of the present invention. And thus, it will be understood by those of ordinary skill in the art that various changes in form and details may be made therein without departing from the spirit and scope of the present invention as defined by the following claims. Therefore, the disclosed embodiments should be considered in descriptive sense only and not for purposes of limitation. Therefore, the scope of the invention is defined not by the detailed description of the invention but by the appended claims, and all differences within the scope will be construed as being included in the present invention.

The above embodiments of the present invention are illustrative and not limiting. Various alternatives and equivalents are possible. Other additions, subtractions, or modifications are obvious in view of the present disclosure and are intended to fall within the scope of the appended claims.

What is claimed is:

1. A method of controlling power supply for a fingerprint sensor, the method comprising:
   receiving, by at least one processor of an electronic device, sensor data obtained from the fingerprint sensor;
   obtaining, by the at least one processor, information indicating whether the sensor data is a fingerprint form of data;
   if the sensor data is the fingerprint form of data, obtaining, by the at least one processor, information indicating whether a use mode of the electronic device equipped with the fingerprint sensor is a horizontal mode by using one of an acceleration sensor and a magnetic sensor; and
   if the use mode is the horizontal mode, decreasing, by the at least one processor, a power of the fingerprint sensor.

2. The method of claim 1, further comprising, if the sensor data is the fingerprint form of data, obtaining information indicating whether a fingerprint direction of the sensor data corresponds to a direction set for fingerprint authentication, and
   if the sensor data is the fingerprint form of data but the fingerprint direction of the sensor data does not correspond to the direction set for fingerprint authentication, decreasing the power of the fingerprint sensor.

3. The method of claim 1, further comprising:
   if the sensor data is the fingerprint form of data, obtaining information indicating whether there is an application being executed;
   if the application is being executed, obtaining information indicating whether the fingerprint sensor is used for executing the application, and
   if the sensor data is the fingerprint form of data but no application is being executed or if the fingerprint is not used for executing the application, decreasing the power of the fingerprint sensor.

4. The method of claim 3, wherein obtaining information indicating whether the fingerprint sensor is used for executing the application includes, if the use mode of the electronic device is the horizontal mode, obtaining information indicating that there is the application being executed.

5. The method of claim 1, further comprising obtaining information indicating whether a recognized gesture corresponds to a predetermined gesture by using at least one sensor equipped in the electronic device including the fingerprint sensor,
   wherein, if the recognized gesture corresponds to the predetermined gesture, obtaining information indicating that a function not requiring a driving of the fingerprint sensor is being executed, and decreasing the power of the fingerprint sensor.

6. The method of claim 1, further comprising:
   if the use mode is not the horizontal mode, obtaining information indicating whether a call/message/notification signal occurs in the electronic device including the fingerprint sensor; and
   if the call/message/notification signal occurs in the electronic device, decreasing the power of the fingerprint sensor.

7. The method of claim 1, wherein decreasing the power of the fingerprint sensor includes decreasing a power of a fingerprint processing device processing sensor data of the fingerprint sensor in addition to the fingerprint sensor.

8. The method of claim 1, wherein determining whether the sensor data is a fingerprint form of data includes:
   reconfiguring the sensor data as an image; and
   obtaining information indicating whether the sensor data is the fingerprint form of data by using the reconfigured image.

9. The method of claim 1, wherein obtaining information indicating whether the sensor data is a fingerprint form of data includes:
   reconfiguring the sensor data as an image;
   extracting a feature from the reconfigured image; and
   obtaining information indicating whether the sensor data is the fingerprint form of data by using the extracted feature.

10. The method of claim 1, wherein decreasing the power of the fingerprint sensor includes:
    obtaining information indicating whether a specific application is executed, wherein the specific application is set to be executed on the horizontal mode; and
    decreasing the power of the fingerprint sensor while the specific application is executed and the use mode is the horizontal mode.

11. An electronic device comprising:
    a fingerprint sensor configured to obtain sensor data by performing a sensing operation on the target and transmit the obtained sensor data to a fingerprint processing device, when a target having a predetermined permittivity is detected;
    a power control unit configured to control power supply for the fingerprint sensor; and
    the fingerprint processing device configured to:
      receive sensor data from the fingerprint sensor,
      obtain information indicating whether the received sensor data is a fingerprint form of data,
      obtain information indicating whether a use mode of the electronic device equipped with the fingerprint sensor is a horizontal mode by using one of an acceleration sensor and a magnetic sensor if the received sensor data is the fingerprint form of data, and
      decrease a power of the fingerprint sensor if the use mode is the horizontal mode.

12. The electronic device of claim 11, further comprising;
    a communication processing unit configured to process a call/message/notification signal; and
    an application management unit configured to manage an execution of an application and information relating to the application,
    wherein the fingerprint processing device obtains information indicating whether the sensor data is a pseudo input on the basis of whether the fingerprint sensor is used for executing an application being executed or whether a call/message/notification signal occurs.

13. The electronic device of claim 11, further comprising:
    a gesture determination unit configured to obtain information indicating whether a gesture recognized by using at least one of an acceleration sensor and a magnetic sensor corresponds to a predetermined gesture, wherein the fingerprint processing device obtains information indicating whether the sensor data is a pseudo input on the basis of a determination result of the recognized gesture from the gesture determination unit.

14. An electronic device comprising:
a first processor;
a second processor;
a sensor module configured to detect a specified operation; and
a fingerprint sensor configured to:
  detect fingerprint input if the specified operation is detected by the sensor module; and
  transmit fingerprint data associated with the fingerprint input to the second processor,
wherein the second processor is configured to:
  receive sensor data from the fingerprint sensor,
  obtain information indicating whether the received sensor data is a fingerprint form of data, and
  obtain information indicating whether a use mode of the electronic device is a horizontal mode by using one of an acceleration sensor and a magnetic sensor; and
wherein the first processor is configured to decrease a power of the fingerprint sensor if the use mode is the horizontal mode.

15. The electronic device of claim 14, wherein the second processor is configured to transmit the fingerprint data to the first processor if the use mode is not the horizontal mode, and
wherein the first processor is configured to obtain a validity of the fingerprint data.

16. The electronic device of claim 15, wherein the first processor is further configured to obtain information indicating that the fingerprint does not match to a registered fingerprint if validity of the fingerprint data is under a first reference value, and obtain a next ranking validity if the fingerprint data does not match to the registered fingerprint data.

17. The electronic device of claim 15, wherein the first processor is further configured to convert validity of the fingerprint data to a set value if the validity is under a first reference value, and execute at least one application whose security is set to low if the converted value is equal to or greater than a second reference value.

18. The electronic device of claim 14, wherein the second processor is further configured to wake up the first processor if the use mode is not the horizontal mode.

19. The electronic device of claim 18, wherein the first processor is further configured to switch the electronic device from a sleep state to a wake up state if the use mode of the electronic device is not the horizontal mode.

* * * * *